(12) United States Patent
Natsumeda

(10) Patent No.: US 10,719,577 B2
(45) Date of Patent: Jul. 21, 2020

(54) SYSTEM ANALYZING DEVICE, SYSTEM ANALYZING METHOD AND STORAGE MEDIUM

(71) Applicant: NEC Corporation, Minato-ku, Tokyo (JP)

(72) Inventor: Masanao Natsumeda, Tokyo (JP)

(73) Assignee: NEC CORPORATION, Tokyo (JP)

(*) Notice: Subject to any disclaimer, the term of this patent is extended or adjusted under 35 U.S.C. 154(b) by 467 days.

(21) Appl. No.: 15/528,825

(22) PCT Filed: Dec. 1, 2015

(86) PCT No.: PCT/JP2015/005967
§ 371 (c)(1),
(2) Date: May 23, 2017

(87) PCT Pub. No.: WO2016/088362
PCT Pub. Date: Jun. 9, 2016

(65) Prior Publication Data
US 2017/0315961 A1    Nov. 2, 2017

(30) Foreign Application Priority Data

Dec. 5, 2014   (JP) .................................. 2014-246936
Feb. 17, 2015  (JP) .................................. 2015-028450

(51) Int. Cl.
*G06F 17/18*     (2006.01)
*G01D 9/00*      (2006.01)
(Continued)

(52) U.S. Cl.
CPC ............... *G06F 17/18* (2013.01); *G01D 9/00* (2013.01); *G01D 9/005* (2013.01); *G05B 23/024* (2013.01); *G06N 5/04* (2013.01)

(58) Field of Classification Search
CPC ........................................................ G06F 17/18
(Continued)

(56) References Cited

U.S. PATENT DOCUMENTS 8,788,291 B2 *  7/2014  Srinivasan ............. G06Q 50/24
                                                                705/3
9,928,215 B1 *  3/2018  Lu ........................... G06F 17/18
(Continued)

FOREIGN PATENT DOCUMENTS

JP   H07-159289 A   6/1995
JP   H08-202444 A   8/1996
(Continued)

OTHER PUBLICATIONS

International Search Report for PCT Application No. PCT/JP2015/005967, dated Feb. 9, 2016.
(Continued)

*Primary Examiner* — Ricky Ngon

(57) ABSTRACT

A system analyzing device according to the present invention includes: a collection unit that collects a plurality of pieces of sensor data of a monitored system; a storage unit that stores a correlation modes based on at least one of a plurality of pieces of sensor data; and a standard contribution acquisition unit that acquires, for a predicted value of an objective variable of a regression equation thereof, a standard contribution indicating a ratio of contribution of each of the data included as explanatory variables.

21 Claims, 23 Drawing Sheets

(51) Int. Cl.
*G05B 23/02* (2006.01)
*G06N 5/04* (2006.01)

(58) Field of Classification Search
USPC .......................................................... 702/190
See application file for complete search history.

(56) References Cited

U.S. PATENT DOCUMENTS

| | | | |
|---|---|---|---|
| 2006/0074599 | A1 | 4/2006 | Emigholz et al. |
| 2007/0255442 | A1 | 11/2007 | Nakamura et al. |
| 2011/0276828 | A1* | 11/2011 | Tamaki ............. G05B 23/0254 714/26 |
| 2011/0288836 | A1* | 11/2011 | Lacaille ............. G05B 23/0254 703/2 |
| 2012/0179635 | A1* | 7/2012 | Vasudevan .............. G06F 17/18 706/12 |
| 2014/0279816 | A1* | 9/2014 | Macaro .................. G06F 17/18 706/52 |
| 2014/0304213 | A1* | 10/2014 | Sano .................. G06K 9/00355 706/52 |
| 2018/0067834 | A1* | 3/2018 | Sakurai ................ G05B 23/021 |
| 2018/0137218 | A1* | 5/2018 | Subramaniyan ........ G06F 17/18 |

FOREIGN PATENT DOCUMENTS

| | | |
|---|---|---|
| JP | 2007-213194 A | 8/2007 |
| JP | 2007-250748 A | 9/2007 |
| JP | 2008-512791 A | 4/2008 |
| JP | 2009-054843 A | 3/2009 |
| JP | 4468269 B2 | 5/2010 |
| JP | 2011-150496 A | 8/2011 |
| JP | 2012-226390 A | 11/2012 |
| JP | 5108116 B2 | 12/2012 |
| JP | 2013-008111 A | 1/2013 |
| JP | 2014-096050 A | 5/2014 |
| WO | 2011/104760 A1 | 9/2011 |
| WO | 2014/132612 A1 | 9/2014 |

OTHER PUBLICATIONS

English translation of Written opinion for PCT Application No. PCT/JP2015/005967.
Japanese Office Action for JP Application No. 2016-562301 dated Aug. 6, 2019 with English Translation.

* cited by examiner

Fig. 10

Table 10a:

| Regression Equation | Model Destruction | Permissible Range of Prediction Error | Prediction Error of Re-predicted Value Based on Explanatory Variable Data Item | | Model Destruction Evaluation Result Based on Explanatory Variable Data Item | | Partial Abnormality | | | |
|---|---|---|---|---|---|---|---|---|---|---|
| | | | First | Second | First | Second | $u_1$ | $u_2$ | $u_3$ | $u_4$ |
| $u_1=f_{134}(u_3,u_4)$ | O | -1.0 ~ 1.0 | - | - | | | - | - | - | - |
| $u_1=f_{124}(u_2,u_4)$ | O | -0.5 ~ 0.5 | 0.8 | 0.3 | O | | 0 | 1 | - | 0 |
| $u_2=f_{214}(u_1,u_4)$ | O | -0.5 ~ 0.5 | 0.8 | 0.8 | O | O | 0 | 1 | - | 0 |
| $u_2=f_{234}(u_3,u_4)$ | O | -1.0 ~ 1.0 | 1.2 | 1.2 | O | O | - | 1 | 0 | 0 |
| $u_3=f_{314}(u_1,u_4)$ | O | -1.0 ~ 1.0 | 1.2 | 1.2 | O | O | 0 | - | 1 | 0 |
| $u_3=f_{324}(u_2,u_4)$ | O | -1.0 ~ 1.0 | 1.2 | 1.2 | O | O | - | 0 | 1 | 0 |
| $u_4=f_{412}(u_1,u_2)$ | O | -0.5 ~ 0.5 | 0.3 | 0.8 | | O | 0 | 1 | - | 0 |
| $u_4=f_{413}(u_1,u_3)$ | O | -1.0 ~ 1.0 | 0.8 | 1.2 | O | O | 0 | - | 1 | 0 |
| $u_4=f_{423}(u_2,u_3)$ | O | -1.0 ~ 1.0 | 1.2 | 1.2 | | O | - | 0 | 0 | 1 |

Table 10b:

| Data Item Name | Abnormality Statistical Value |
|---|---|
| $u_1$ | 0 |
| $u_2$ | 0.67 |
| $u_3$ | 0.6 |
| $u_4$ | 0.13 |

SYSTEM ANALYZING DEVICE, SYSTEM ANALYZING METHOD AND STORAGE MEDIUM

This application is a National Stage Entry of PCT/JP2015/005967 filed on Dec. 1, 2015, which claims priority from Japanese Patent Applications 2014-246936 filed on Dec. 5, 2014 and 2015-028450 filed on Feb. 17, 2015, the contents of all of which are incorporated herein by reference, in their entirety.

TECHNICAL FIELD

The present invention relates to a system analyzing device, a system analyzing method, and a storage medium for analyzing a state of a system.

BACKGROUND ART

A system analyzing device that executes process for analyzing a state of a system based on a sensor value acquired from a component of the system has been used.

For example, PTL 1 discloses a technique for generating a correlation model that is highly capable of detecting anomalies based on an actual measurement data of a plurality of types of performance values of a monitored device.

PTL 2 discloses a technique for extracting a correlation model for evaluating or predicting a prescribed event based on the data transmitted from a mobile machine.

PTL 3 discloses a technique for automatically visualizing a hierarchical relationship among items to be measured based on a measurement data of a plurality of characteristic values measured during a manufacturing process of a product.

Such analytical process is carried out for the purpose of safely and efficiently operating the system. One of the analytical process is a process for determining whether a state of the system is normal or anomalous through multivariable analysis of the sensor value. When the state of the system is determined to be anomalous, such analytical process notifies an operator or the system of information useful for identifying an anomaly factor. For example, only notifying of a sensor that shows an effect of the anomaly as the information useful for identifying the anomaly factor is effective for quickening an initial motion for identifying the anomaly factor.

Here, for example, the system is a unit or a mechanism composed of elements such as an ICT (Information and Communication Technology) system, a chemical plant, a power generation plant, and a power facility that affect one another.

Sensor values are various values acquired from components of the system. For example, the sensor value is a measured value acquired through a sensor provided in the components of the system. As such measured values, there are a valve opening, a liquid surface height, a temperature, a flowrate, pressure, a current, a voltage, etc. For example, the sensor value may be a predicted value calculated by using such a measured value. Further, for example, the sensor value may be a control signal generated from an information processing device so as to change the system to a desired operated state. Hereinafter, various values acquired from the components of the system will be simply referred to as sensor values without discriminating types.

In particular, in a system in which an effect of an occurrence of a failure on the economy, a human life, etc., is large, a function for notifying of information useful for identifying factors on anomalies not generated in the system in the past is important. The reason is that the larger an effect of a system failure is, the higher a possibility of a generated anomaly to become an unknown anomaly is for the system analysis device, because countermeasures are taken in advance to prevent the failure.

Examples of system analyzing techniques for notifying of information useful for identifying anomaly factors without being premised on the occurrence of similar anomalies in the past are described in PTLs 4-7.

The related technique disclosed in PTL 4 analyzes a system by using a plurality of regression equations. This related technique determines, for each regression equation, whether a prediction error has exceeded a threshold set for the regression equation. Then, the related technique outputs regression equations of which prediction errors have exceeded the threshold as candidates of an anomaly occurrence causes in descending order of the prediction errors.

The related technique disclosed in PTL 5 analyzes a system by using a Mahalanobis-Taguchi method. Then, this related technique outputs contribution of each data item to a Mahalanobis distance as an anomaly.

The related technique disclosed in PTL 6 analyzes a system by using principal component analysis. Then, this related technique outputs contribution of each data item to a Q statistical amount or Hoteling T2 dispersion as an anomaly.

The related technique disclosed in PTL 7 detects an anomaly of a process in a manufacturing system composed of a plurality of manufacturing devices. This related technique identifies an anomaly detection factor analysis rule applied to the process from a feature value of a process data acquired during process execution. Then, when a predicted value acquired by the anomaly detection factor analysis rule indicates an anomaly, this related technique notifies of the anomaly occurrence together with contribution of each data item to the anomaly.

Here, the "data item" is information relating to each of a plurality of types of sensor values acquired from the components of the system. For example, the "data item" may indicate a set of the sensor values relating to the type. Further, for example, the "data item" may indicate identification information for identifying a relating sensor value.

CITATION LIST

Patent Literature

[PTL 1] WO 2014/132612
[PTL 2] Japanese Unexamined Patent Publication (Kokai) No. 2012-226390
[PTL 3] Japanese Unexamined Patent Publication (Kokai) No. 2011-150496
[PTL 4] Japanese Patent Publication No. 5108116
[PTL 5] Japanese Unexamined Patent Publication (Kokai) No. 2007-213194
[PTL 6] Japanese Patent Publication No. 4468269
[PTL 7] Japanese Unexamined Patent Publication (Kokai) No. 2009-54843

SUMMARY OF INVENTION

Technical Problem

In order to avoid a system shutdown or an accident, it is preferable to detect anomaly in the system state, which may be a sign of possible failure, as quickly as possible and identity a cause of the anomaly. In this instance, it is highly likely that an effect of an anomaly appears in a plurality of the sensor values. This is for the reason that an element such as a device constituting the system operates in conjunction with other elements so as to achieve an objective of the system, such as information processing, production of chemical products, or energy conversion. Thus, the sensor value acquired from the component of the system similarly changes in conjunction with the other sensor values.

In other words, preferably, a system analyzing device is enabled to accurately detect information useful for identifying an anomaly factor even when a change in the sensor value caused by an anomaly is small, and the change appears in a plurality of sensors.

The related technique disclosed in PTL 4 provides a result of arranging the regression equations of which prediction errors have exceeded the threshold in the descending order of the prediction errors as information useful for identifying an anomaly factor. However, when even one item unrelated to the anomaly is included in the data items included in the regression equations, a provided result includes the data item unrelated to the anomaly as a data item related to the anomaly. This may be a cause for a difficulty of identifying data items affected by the anomaly as the number of data items included in the regression equations or the number of regression equations of which prediction errors have exceeded the threshold becomes greater. PTL 4 describes a narrowing-down process based on graphical modeling or a correlation function. However, such process indicates a propagating direction of a phenomenon without discriminating between a normal state and an anomalous state. Therefore, the process does not directly contribute to narrowing-down of the data items affected by the anomaly.

The related techniques disclosed in PTLs 5-6 monitor a system by one model including all data items. The related technology disclosed in PTL 7 detects an anomaly of a process by one rule applicable to one process. Thus, in the related technologies disclosed in PTLs 5-7, anomaly detection sensitivity is limited by a data item of the largest sensor noise. As a result, the related technologies may not extract all sensors in which an effect of the anomaly has appeared even when the effect of the anomaly has appeared in a plurality of sensors.

None of PTLs 1-3 discloses a technique for identifying an anomaly factor when a change in the sensor value caused by an anomaly is small and such a change appears in a plurality of sensors.

The present invention has been made to solve the above-mentioned problems. In other words, an object of the present invention is to provide a system analyzing technique that is capable of accurately extracting information useful for identifying an anomaly factor even when a change in the sensor value caused by an anomaly is small, and such a change appears in a plurality of sensors.

Solution to Problem

A system analyzing device according to the present invention includes: a collector that collects a plurality of sensor data from a monitored system; a storage that stores a correlation model based on at least some of a plurality of the sensor data; and a standard contribution acquirer that acquires standard contribution indicating a ratio of contribution of each of sensor data included in exemplary variables with respect to a predicted value of an objective variable of a regression equation of the correlation model.

A system analysis method according to the present invention, for causing a computer device, includes: collecting a plurality of sensor data from a monitored system; storing a correlation model based on at least some of a plurality of the sensor data; and acquiring standard contribution indicating a ratio of contribution of each of sensor data included in exemplary variables with respect to a predicted value of an objective variable of a regression equation of the correlation model.

A non-transitory computer-readable storage medium according to the present invention embodying a system analysis program. The program causes a computer to perform a method. The method includes: collecting a plurality of sensor data from a monitored system; storing a correlation model based on at least some of a plurality of the sensor data; and acquiring standard contribution indicating a ratio of contribution of each of sensor data included in exemplary variables with respect to a predicted value of an objective variable of a regression equation of the correlation model.

Advantageous Effects of Invention

The present invention can provide a system analyzing technique that is capable of accurately extracting information useful for identifying an anomaly factor even when a change in the sensor value caused by an anomaly is small, and such a change appears in a plurality of sensors.

BRIEF DESCRIPTION OF DRAWINGS

FIG. 10 is a diagram illustrating a specific example of the anomaly factor extraction operation according to the second example embodiment of the present invention.

DESCRIPTION OF EMBODIMENTS

Figure 1:
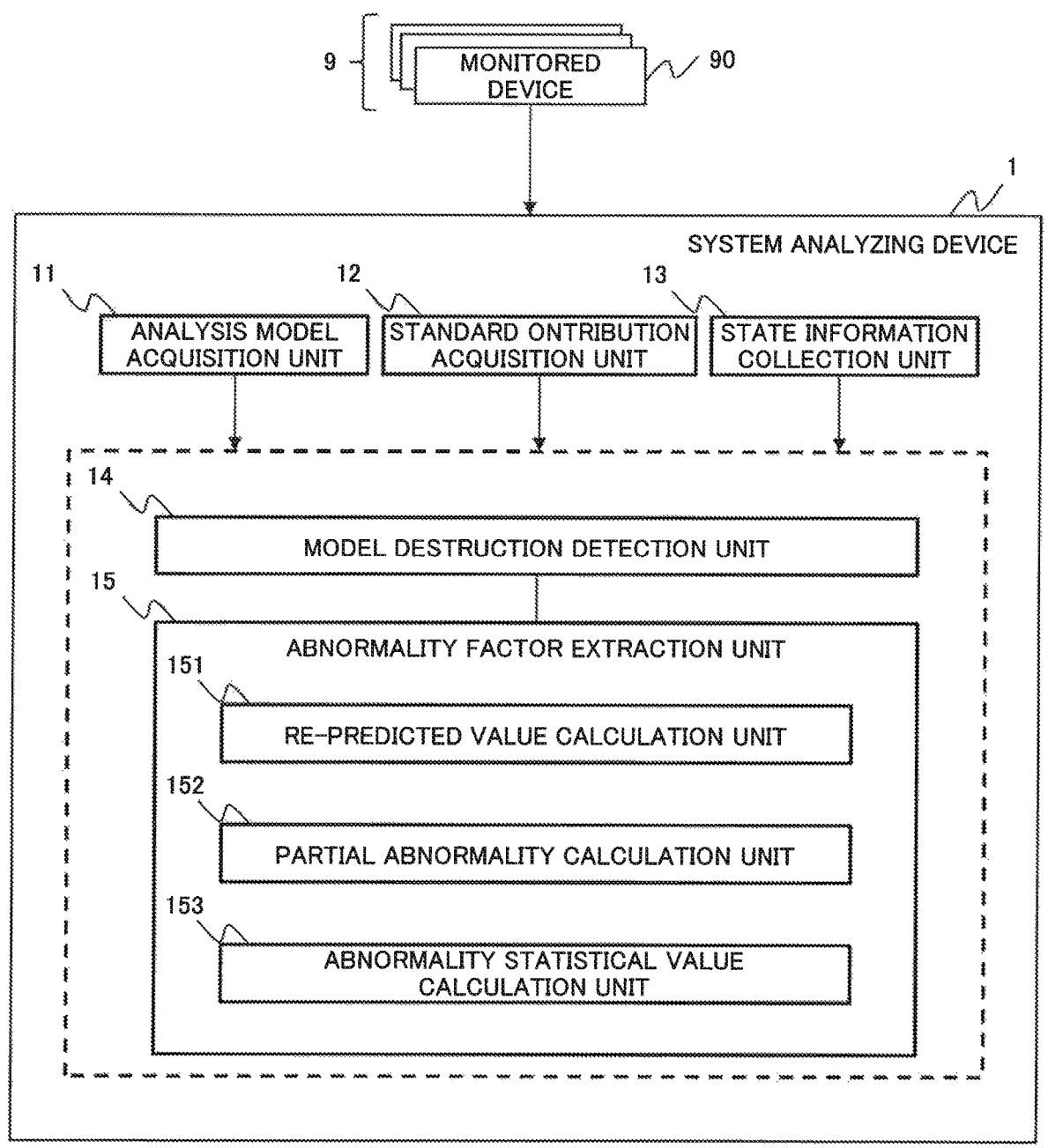
FIG. 1 is a functional block diagram of a system analyzing device according to a first example embodiment of the present invention.

Hereinafter, the example embodiments of the present invention will be described referring to the drawings.

First Example Embodiment

FIG. 1 is a functional block diagram of a system analyzing device 1 according to a first example embodiment of the present invention. In FIG. 1, the system analyzing device 1 includes an analysis model acquisition unit 11, a standard contribution acquisition unit 12, a state information collection unit 13, a model breakdown detection unit 14, and an anomaly factor extraction unit 15. The anomaly factor extraction unit 15 includes a re-predicted value calculation unit 151, a partial anomaly calculation unit 152, and an anomaly statistical value calculation unit 153. The system analyzing device 1 is connected to a monitored system 9.

The system analyzing device 1 is device which outputs an anomaly factor of the monitored system 9 by analyzing the monitored system 9. In FIG. 1, a broken-line rectangle indicates that each functional block surrounded by the broken line is operated by using information acquired by the analysis model acquisition unit 11, the standard contribution acquisition unit 12, and the state information collection unit 13. In FIG. 1, the direction of an arrow connecting the rectangles indicating the functional blocks is an example, not limiting the direction of a signal between the functional blocks.

The monitored system 9 is a system monitored by the system analyzing device 1. The monitored system 9 includes at least one monitored device 90. For example, an example of the monitored system 9 is a power generation plant system. In this case, the monitored device 90 is, for example, a turbine, a feed water heater, a condenser or the like. For example, the monitored device 90 may include an element that connects devices, such as a piping or a signal line. The monitored system 9 may be an entire system as in the case of the abovementioned power generation plant system or a unit to realize a partial function in a certain system.

Each monitored device 90 measures a sensor value acquired at its own device for each predetermined timing, and transmits a result to the system analyzing device 1. Hereinafter, not only a solid hardware device such as a usual measuring instrument but also a software sensor, a control signal, etc., will be referred to as sensors. The sensor value is a value acquired from a sensor. An example of the sensor value is a measured value measured by a measuring instrument installed in a facility, such as a valve opening, a liquid surface height, a temperature, a flowrate, pressure, a current, or a voltage. Another example of the sensor value is a predicted value calculated from the measured value. Yet another example of the sensor value is a value of the control signal. Hereinafter, each sensor value will be represented by a numerical value such as an integer or a decimal.

In the present example embodiment, it is assumed that one data item is allocated for each sensor relating to the sensor value acquired from each monitored device 90. A set of sensor values collected from the monitored devices 90 at timings which are regarded as the same is referred to as state information. A set of data items relating to the sensor values included in the state information is referred to as a data item group. In other words, the state information includes a plurality of data items. Here, "collected at timings regarded as similar" may mean measurement at the same time or time within a predetermined range at the monitored devices 90. Alternatively, "collected at timings regarded as similar" may mean collection by a series of collection process carried out at the system analyzing device 1. A storage device (not illustrated) that stores the sensor value acquired by the monitored device 90 may be provided between the monitored device 90 and the system analyzing device 1. Such a storage device may be, for example, a data server, a DCS (Distributed Control System), a process computer, or the like. In such a case, the monitored device 90 acquires the sensor value at an arbitrary timing, and stores the sensor value in the storage device. Then, the system analyzing device 1 may read the sensor value stored in the storage device at a predetermined timing.

Figure 2:
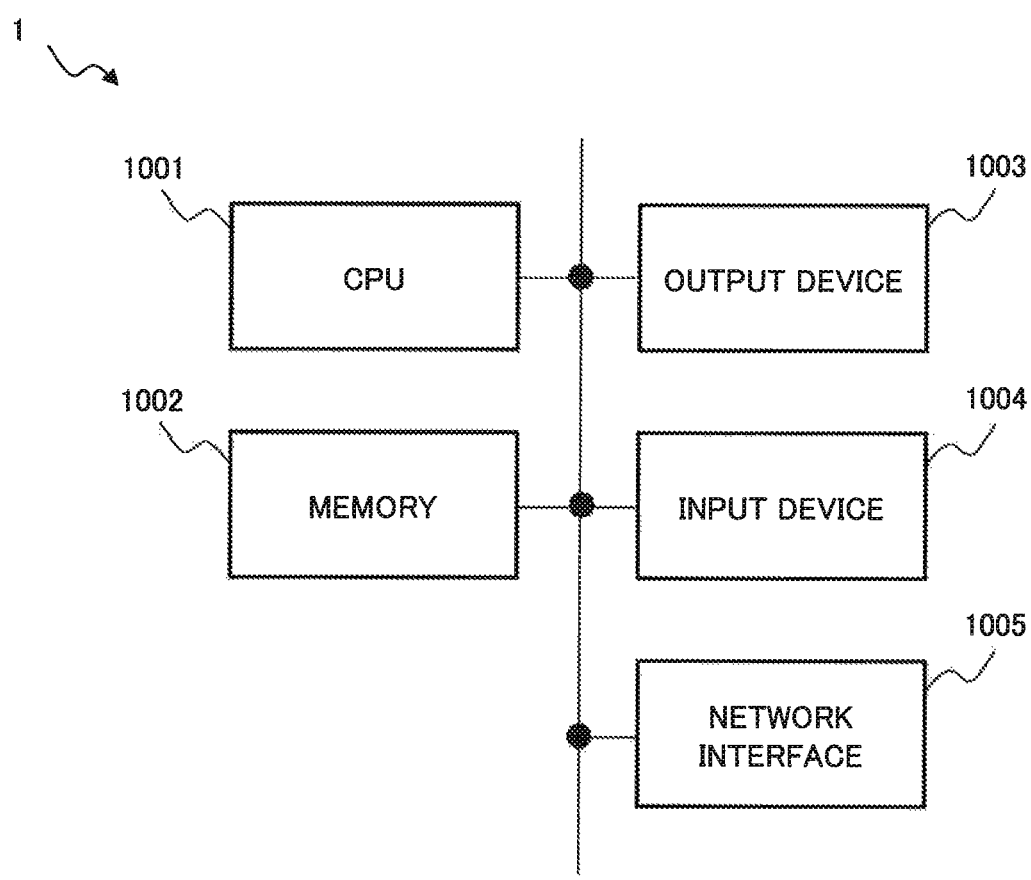
FIG. 2 is a diagram illustrating an example of a hardware configuration of the system analyzing device according to the first example embodiment of the present invention.

The system analyzing device 1 can be configured by a computer device including hardware elements illustrated in FIG. 2. In FIG. 2, the system analyzing device 1 includes a CPU (Central Processing Unit) 1001, a memory 1002, an output device 1003, an input device 1004, and a network interface 1005. The memory 1002 is configured by a RAM (Random Access Memory), a ROM (Read Only Memory), an auxiliary storage device (hard disk or the like), or the like. The output device 1003 is configured by a device such as a display device or a printer that outputs information. The input device 1004 is configured by a device such as a keyboard or a mouse that receives an input of a user's operation. The network interface 1005 is an interface for connection to a network. In this case, each functional block of the system analyzing device 1 is configured by the CPU 1001 that reads and executes a computer program stored in the memory 1002, and controls the output device 1003, the input device 1004, and the network interface 1005. Note that the hardware configurations of the system analyzing device 1 and each functional block are not limited to those described above.

Next, each functional block of the system analyzing device 1 will be described in detail.

The analysis model acquisition unit 11 acquires an analysis model of the monitored system 9. The analysis model is a model that includes at least one many-body correlation model based on at least parts of a plurality of data items constituting the state information of the monitored system 9. Here, a correlation model means information including a regression equation defining a relationship among the data items and the permissible range of prediction error of the regression equation. The many-body correlation model is a correlation model that includes a regression equation configured by using at least three data items among such correlation models. Such an analysis model may be generated based on the time sequence of the state information acquired for the monitored system 9.

For example, the analysis model acquisition unit 11 may acquire an analysis model stored in the memory 1002. The analysis model acquisition unit 11 may acquire an analysis model inputted from the outside via the input device 1004, the network interface 1005, a portable recording medium, or the like.

The standard contribution acquisition unit 12 acquires a ratio of contribution (standard contribution) of each data item included as an explanatory variable to a predicted value of an objective variable of the regression equation for each many-body correlation model. For example, the standard contribution may be calculated in advance by using the time sequence of the state information used for generating the analysis model. Hereinafter, the data item included as the explanatory variable in the regression equation may also be referred as an explanatory variable data item. The data item included as the objective variable in the regression equation may also be referred as an objective variable data item.

For example, the standard contribution acquisition unit 12 may acquire information stored in the memory 1002 as standard contribution of each explanatory variable data item for each many-body correlation model. The standard contribution acquisition unit 12 may acquire standard contribution inputted from the outside via the input device 1004, the network interface 1005, the portable recording medium or the like.

The state information collection unit 13 collects the state information from the monitored system 9.

The model breakdown detection unit 14 detects whether model breakdown has occurred in each many-body correlation model by applying the analysis model to the collected state information. Specifically, the model breakdown detection unit 14 applies the sensor value of the data item constituting the collected state information to the regression equation of each many-body correlation model included in the analysis model. There is a case in which, by applying the state information, a model breakdown occurs in the many-body correlation model. The model breakdown is a phenomenon in which a difference (prediction error) between a predicted value and an actually measured value of the regression equation exceeds a permissible range. The model breakdown detection unit 14 detects whether such model breakdown has occurred in each many-body correlation model by applying the state information.

The anomaly factor extraction unit 15 calculates anomaly statistical values for respective data items by using the re-predicted value calculation unit 151 described below, the partial anomaly calculation unit 152 described below, and the anomaly statistical value calculation unit 153. The anomaly factor extraction unit 15 extracts data items which become anomaly factor candidates of the monitored system 9 based on the anomaly statistical values for respective data items. Then, the anomaly factor extraction unit 15 notifies of information indicating the extracted data items. For example, the anomaly factor extraction unit 15 may output names of the data item which become anomaly factor candidates to an output device 1003, etc.

The number of data items to be extracted and notified as the anomaly factor candidates may be arbitrarily set as the number of data items to be preferably checked at the time of an anomaly by an operator. From the standpoint of increasing a possibility of finding causes of failures and to understand the condition of all the failures, a greater number of data items to be extracted and notified as the anomaly factor candidates is more preferable. From the standpoint of shortening an investigating period of time when an erroneous report occurs, a smaller number of data items to be extracted and notified is more preferable.

The re-predicted value calculation unit 151 calculates, regarding each many-body correlation model in which the model breakdown has occurred, a re-predicted value for each explanatory variable data item included in the regression equation of the many-body correlation model. The re-predicted value is calculated based on the state information and the standard contribution of the data item. Here, there are a case where the model breakdown occurs in a relevant many-body correlation model and a case where model breakdown does not occur depending on the re-predicted values.

The partial anomaly calculation unit 152 calculates anomalies (partial anomalies) for respective data items for each many-body correlation model based on whether the model breakdown has occurred in the many-body correlation model by each re-predicted value.

For example, it is assumed that, in this regression equation, model breakdown has occurred for re-predicted values of all explanatory variable data items. In this case, the partial anomaly calculation unit 152 may calculate the partial anomalies of the objective variable data items to be higher than partial anomalies of other data items in the regression equation. Further, for example, it is assumed that, in this regression equation, the model breakdown has occurred in at least one re-predicted value while no model breakdown has occurred in at least one re-predicted value. In this case, the partial anomaly calculation unit 152 may calculate the partial anomalies of explanatory variable data items causing the model breakdown by the re-predicted values so as to be higher than partial anomalies of the other data items in the regression equation.

The anomaly statistical value calculation unit 153 calculates an anomaly statistical value by totaling the partial anomalies for respective data items.

Figure 3:
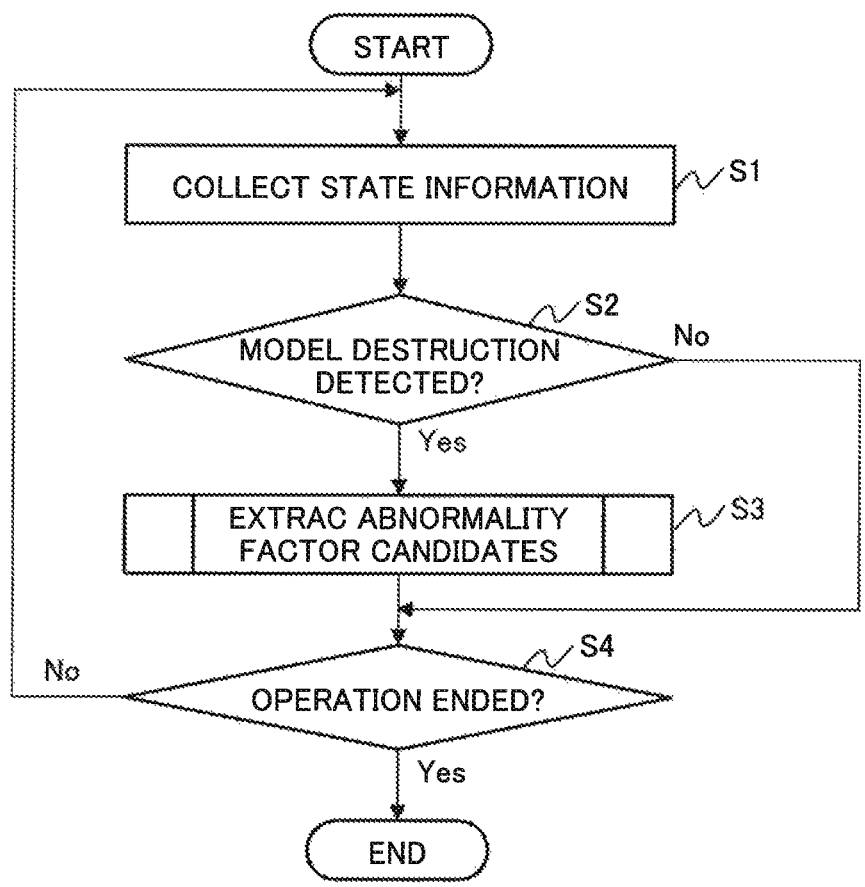
FIG. 3 is a flowchart schematically illustrating an operation of the system analyzing device according to the first example embodiment of the present invention.

An operation of the system analyzing device 1 configured as described above will be described referring to the drawings. An outline of the operation of the system analyzing device 1 is illustrated in FIG. 3. Hereinafter, it is assumed that the analysis model of the monitored system 9 has been acquired by the analysis model acquisition unit 11 in advance. It is assumed that, for each many-body correlation model included in the analysis model, the standard contribution of each of the explanatory variable data items include in the regression equation has been acquired by the standard contribution acquisition unit 12 in advance.

In FIG. 3, first, the state information collection unit 13 collects the state information from the monitored system 9 (step S1).

Then, a model breakdown detection unit 14 detects whether the model breakdown has occurred in each many-body correlation model included in the analysis model by using the collected state information (step S2).

When the model breakdown occurrence detects, the anomaly factor extraction unit 15 extracts and outputs data items which become anomaly factor candidates based on a state of the model breakdown occurrence (step S3). This step will be described in detail below.

The system analyzing device 1 continues the above operation until an end of the operation (Yes in step S4).

In step S4, the system analyzing device 1 may determine whether to end the operation based on an input from the input device 1004. Alternatively, the system analyzing device 1 may make determination based on whether a timing is a predetermined timing. Otherwise, the system analyzing device 1 may make determination based on whether various pieces of information acquired from the monitored system 9 satisfy a predetermined condition. Not limited to these, the system analyzing device 1 may carry out the determination process in step S4 by other methods.

Figure 4:
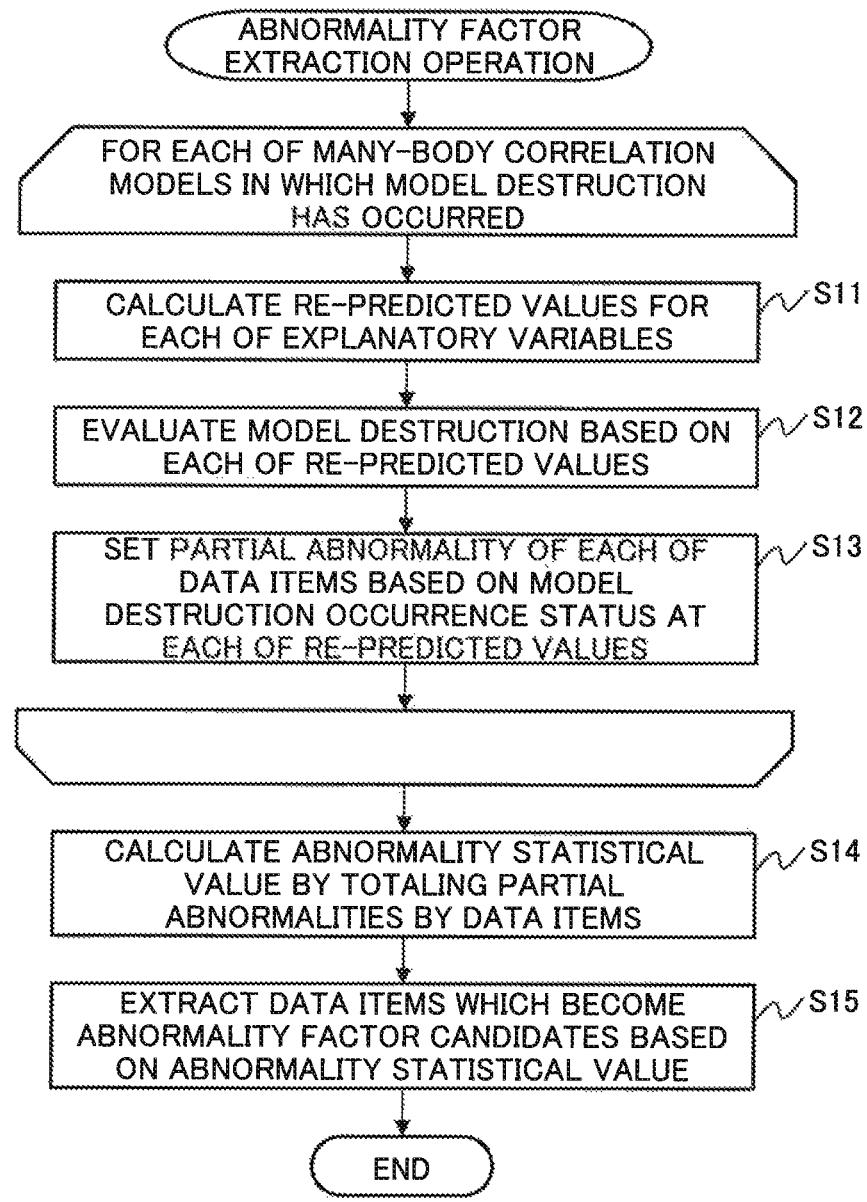
FIG. 4 is a flowchart illustrating an anomaly factor extraction operation of the system analyzing device according to the first example embodiment of the present invention in detail.

Next, the anomaly factor extraction operation in step S3 is illustrated in detail in FIG. 4.

In FIG. 4, first, the system analyzing device 1 repeats an operation of steps S11 to S13 for each many-body correlation model in which the model breakdown has occurred.

Here, first, the re-predicted value calculation unit 151 calculates a re-predicted value for each explanatory variable data item included in the regression equation of this many-body correlation model (step S11). The re-predicted value is calculated by using the state information of a relevant data item used when the model breakdown occurred, and the standard contribution of the relevant data item.

Then, the partial anomaly calculation unit 152 evaluates, for each re-predicted value, whether the model breakdown occurs in this many-body correlation model with the re-predicted value (step S12).

Specifically, the partial anomaly calculation unit 152 may evaluate whether a difference between the re-predicted value of each explanatory variable data item and a sensor value relating to the objective variable data item in the state information used when the model breakdown occurred is within a permissible range of prediction error of the many-body correlation model.

Then, the partial anomaly calculation unit 152 calculates the partial anomalies of the objective variable data items and the partial anomalies of the explanatory variable data items based on a state of the model breakdown occurrence by each re-predicted value in the regression equation of this many-body correlation model (step S13).

After completion of calculation of the partial anomalies for respective data items for each regression equations of all the many-body correlation models in which the model breakdown has occurred, the anomaly statistical value calculation unit 153 executes the following step. In other words, the anomaly statistical value calculation unit 153 totals the partial anomalies of the data items calculated in the regression equations of the many-body correlation models for respective data items in all the regression equations.

Then, the anomaly statistical value calculation unit 153 makes a statistical value calculated by the totaling the anomaly statistical value (step S14).

Then, the anomaly factor extraction unit 15 extracts and outputs the data items which become anomaly factor candidates for the monitored system 9 based on the anomaly statistical value (step S15). For example, the anomaly factor extraction unit 15 may output data items up to a predetermined number in descending order of anomaly statistical values.

Then, the system analyzing device 1 ends the anomaly factor extraction operation.

Next, the effects of the first example embodiment of the present invention will be described.

The system analyzing device according to the first example embodiment of the present invention can accurately extract information useful for identifying an anomaly factor even when a change in a sensor value caused by an anomaly is small and the change appears in a plurality of sensors.

The reasons will be described.

A first reason is that in the present example embodiment, as the analysis model, the analysis model including at least one many-body correlation model based on at least parts of the data items constituting the state information indicating the state of a monitored system is used. In the present example embodiment, using such the analysis model enables the model breakdown of the many-body correlation model to be re-evaluated for each explanatory variable data item included in the regression equation of the many-body correlation model. As a result, in the present example embodiment, which data item is anomalous can be evaluated for each regression equation of the many-body correlation model, and data items affected by the anomaly and data items not affected by the anomaly can be suitably discriminated from each other. Thus, according to the present example embodiment, information useful for identifying an anomaly factor can be accurately extracted.

The second reason is that an analysis model described above can include a plurality of regression equations (many-body correlation models) for one type of an objective variable. In the present example embodiment, using such an analysis model enables dealing with a case where there are data items reduce anomaly detection accuracy. For example, a data item of a large sensor noise included in the sensor value reduces the anomaly detection accuracy. It is now assumed that, in the analysis model, there is a regression equation including a data item that reduces the anomaly detection accuracy as an explanatory variable with a given data item setting as an objective variable. Even in such a case, the analysis model according to the present example embodiment can include a regression equation including no data item that reduces the anomaly detection accuracy as the explanatory variable with the same data item setting as the objective variable. As a result, the present example embodiment can prevent anomaly detection leakage caused by inclusion of the data item that reduces the anomaly detection accuracy in the regression equation. In other words, because the number of the regression equations for one type of the objective variable is not limited to one in the analysis mode, the present example embodiment can prevent anomaly detection leakage even when a change in the sensor value caused by an anomaly is small. Further, because the number of the regression equations for one type of the objective variable is not limited to one, a contribution rate of the regression equation to a determination result of whether the data item serving as the objective variable in the regression equation is affected by an anomaly is small. Consequently, the present example embodiment can suitably discriminate the data item affected by the anomaly from the data item not affected by the anomaly, even when there is the data item that reduces anomaly factor identifying accuracy in same the data item that reduces the anomaly detection accuracy. Therefore, the present example embodiment can accurately extract the information useful for identifying an anomaly factor.

The third reason is that, in the present example embodiment, the partial anomalies are calculated based on the re-predicted values using the standard contribution for the individual explanatory data items in the individual regression equations, and further the anomaly statistical value is calculated by totaling the partial anomalies for respective data items. Like this, the present example embodiment uses the anomaly statistical value further totaling, for a plurality of the many-body correlation models, the partial anomalies evaluating which data item has high possibility to be anomalous for each regression equation of the many-body correlation model. As a result, the present example embodiment can more accurately extract the data item which becomes a candidate of the anomalous factor compared with a related technique for detecting an anomaly for each regression equation unit and a related technique for monitoring the data items all of which are included in one model.

Second Example Embodiment

Next, a second example embodiment of the present invention will be described in detail referring to the drawings. Throughout the drawings referred to in the present example embodiment, components identical to and steps operating similar to those of the first example embodiment are assigned same reference signs, and detailed descriptions thereof are omitted in the present example embodiment.

Figure 5:
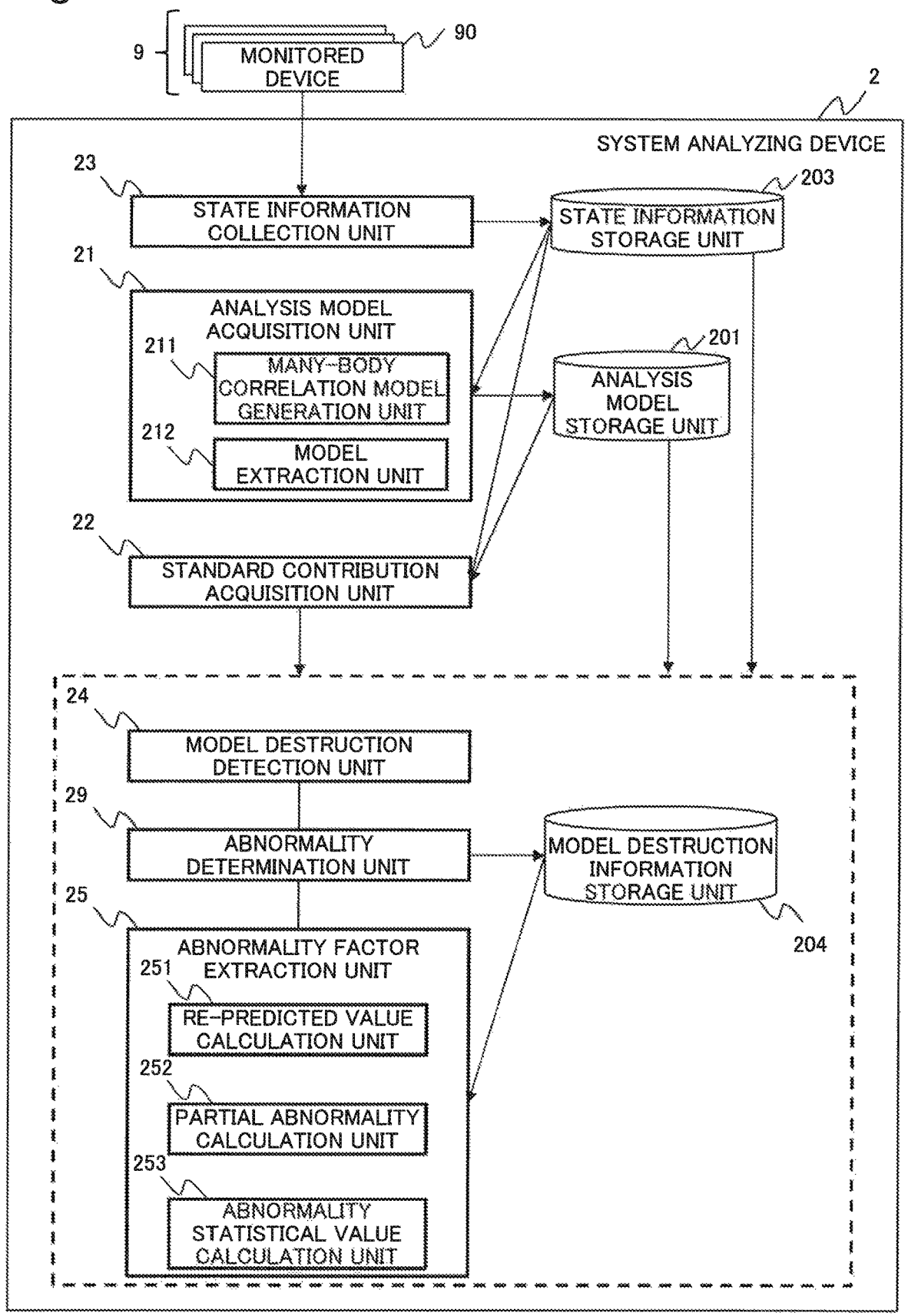
FIG. 5 is a functional block diagram of a system analyzing device according to a second example embodiment of the present invention.

A functional block configuration of a system analyzing device 2 according to the second example embodiment of the present invention is illustrated in FIG. 5. In FIG. 5, the system analyzing device 2 includes an analysis model acquisition unit 21, a standard contribution acquisition unit 22, a state information collection unit 23, a model breakdown detection unit 24, an anomaly factor extraction unit 25, and an anomaly determination unit 29. The analysis model acquisition unit 21 includes a many-body correlation model generation unit 211, and a model extraction unit 212. The anomaly factor extraction unit 25 includes a re-predicted value calculation unit 251, a partial anomaly calculation unit 252, and an anomaly statistical value calculation unit 253. The system analyzing device 2 includes an analysis model storage unit 201, a state information storage unit 203, and a model breakdown information storage unit 204. The analysis model storage unit 201 constitutes an example embodiment of a part of an analysis model acquisition unit according to the present invention. The state information storage unit 203 constitutes an example embodiment of a part of the state information collection unit according to the present invention. The model breakdown information storage unit 204 constitutes an example embodiment of a part of the model breakdown detection unit according to the present invention. The system analyzing device 2 is connected to the monitored system 9. The monitored system 9 is not described in detail in the present example embodiment as the system is similar in configuration to the monitored system 9 according to the first example embodiment of the present invention. In FIG. 5, the direction of an arrow connecting rectangles indicating the functional blocks is an example, not limiting the direction of a signal between the functional blocks. The system analyzing device 2 and the functional blocks can be configured by the same hardware elements as those of the first example embodiment of the present invention described above referring to FIG. 2. The hardware configurations of the system analyzing device 2 and the functional blocks are not limited to those described above.

The system analyzing device 2 is a device which constructs an analysis model of the monitored system 9 while acquiring state information of the monitored system 9 at a predetermined timing, and analyzes a state of the monitored system 9 by using the constructed analysis model.

The state information collection unit 23 collects the state information of the monitored system 9 at a predetermined timing, and stores the state information in the state information storage unit 203. Hereinafter, time-sequential data of the state information will also be referred to as state sequence information.

The state information storage unit 203 stores the state information collected by the state information collection unit 23 along a time sequence. In other words, the state information storage unit 203 stores the state information collected by the state information collection unit 23 as the state sequence information. The state information storage unit 203 may store, for example, information indicating collection time and the state information in a manner associated with one another. More specifically, the state information is a set of collected sensor values. For example, the state information may be information in which the collected sensor values are arranged in a predetermined order. The state information storage unit 203 includes a storage area for storing at least state sequence information of a predetermined period.

The analysis model acquisition unit 21 generates an analysis model of the monitored system 9 based on the state sequence information of the predetermined period stored in the state information storage unit 203 by using the many-body correlation model generation unit 211 and the model extraction unit 212. Functional blocks included in the analysis model acquisition unit 21 will be described in detail below. The generated analysis model includes at least one many-body correlation model. Each many-body correlation model includes a regression equation configured by using at least three data items, and the permissible range of prediction error of the regression equation. In other words, the analysis model is a set of at least one many-body correlation model. The analysis model acquisition unit 21 stores the generated analysis model in the analysis model storage unit 201.

As the predetermined period of the state sequence information used by the analysis model acquisition unit 21 to generate the analysis model, an arbitrary period in which no failure occurred in the monitored system 9 is set by the operator. From the standpoint of increasing anomaly detection sensitivity, the predetermined period is preferably setting as short as possible so as not to be affected by a change of the monitored system 9 over time. For example, when a maintenance cycle of the monitored system 9 is one year, the predetermined period may be set sufficiently shorter than the cycle, such as one month, one week, or one day. In this instance, the predetermined period preferably includes the effect of sensor values by a factor causing great changes in the greatest number of sensor values among factors of state changes of the system which are likely to occur normally. On the other hand, from the standpoint of reducing erroneous detection caused by the state change of the monitored system 9, a period as long as possible is preferably used so as to comprehensively include changes in a sensor value caused by main internal or external factors. For example, when the monitored system 9 is strongly affected by seasons, the predetermined period may be set to nine months or one year.

The analysis model storage unit 201 stores analysis model information indicating the analysis model generated by the analysis model acquisition unit 21. The analysis model information may be, for example, a set of pieces of model information about the many-body correlation models included in the analysis model. The model information may include, for example, identifiers of the many-body correlation modes, information of regression equation of the many-body correlation models, and information indicating the permissible range of prediction error of the regression equation. The information of the regression equation may include, for example, information of a data item used as the objective variable, information of a data item used as the explanatory variable, information on a relational equation between the data items, and the like. Further, the model information may include an index (superiority) indicating superiority of the regression equation.

Information certainly included in the model information depends on alarm conditions described below, a method for calculating anomalies of the data items, or the like. The alarm condition is a condition (alarm condition) when an anomaly is notified by an anomaly determination unit 29 described below. The anomaly of the data item is a partial anomaly calculated by a partial anomaly calculation unit 252 described below, an anomaly statistical value calculated by an anomaly statistical value calculation unit 253 described below, or the like. For example, when the alarm conditions or the anomaly calculation method concerns superiority of a regression equation, the superiority of the regression equation should be included in the model information.

The standard contribution acquisition unit 22 calculates a statistical amount of a ratio of contribution (contribution) to a predicted value of each explanatory variable data item for each regression equation of a many-body correlation model included in the analysis model based on the state sequence information stored in the state information storage unit 203. Hereinafter, the statistical amount of contribution will be referred to as standard contribution. The statistical amount used as the standard contribution is preferably a statistical amount enabling an average value of contribution to be acquired. For example, the statistical amount may be an average value or a median value of contribution. For example, the statistical amount may be a weighted average value acquired by adding predetermined weight to each numerical value of contribution, a weighted median value acquired by adding predetermined weight to each numerical value of contribution, or the like.

As a period of the state sequence information used for calculating the standard contribution, an arbitrary period including no failures is set. Now, it is discussed that the standpoint of preventing interpretation performance from being lost during anomaly factor data item extraction by increasing consistency with an analyzing result based on the analysis model. From this standpoint, the state sequence information of a predetermined period used for generating the analysis model is preferably used for calculating standard contribution. Using the state sequence information of the predetermined period used for generating the analysis model for calculating the standard contribution is preferable from the standpoint of general applicability as the number of parameters to be set is small. In this case, the standard contribution acquisition unit 22 can calculate the standard contribution during generation of the analysis model by the analysis model acquisition unit 21.

Now, it is discussed that the standpoint of increasing accuracy of anomaly factor data item extraction. From this standpoint, for the data item relating to an objective variable of a many-body correlation model in which model breakdown has occurred, the state sequence information of a period during which the data item has a value close to a value of the state information which caused the model breakdown is preferably used for calculating standard contribution. The "close value" is a value that satisfies a predetermined condition for recognizing closeness to the value of the data item relating to such the objective variable. The model breakdown is detected by the model breakdown detection unit 24 described below. This case is based on the premise that a sufficient amount of state information having such a close value has been stored in the state information storage unit 203. For example, it is assumed that an actually measured value of a data item x relating to the objective variable of the many-body correlation model in which the model breakdown has occurred is x1 at the time of the model breakdown. In this case, the standard contribution acquisition unit 22 preferably may extract the state sequence information of a period in which the value of the data item x is close to x1 among the pieces of state information stored in the state information storage unit 203. Such a period may be a plurality of periods. It is assumed that the length of an extraction period has been set in advance by the operator. Then, the standard contribution acquisition unit 22 calculates standard contribution of each explanatory variable data item in the many-body correlation model in which the model breakdown has occurred by using the state sequence information of the extraction period. In this case, the standard contribution acquisition unit 22 may calculate the standard contribution after the detection time of the model breakdown by the model breakdown detection unit 24 described below.

The state sequence information used for calculating the standard contribution may not be extracted from one continuous period. In this case, regarding the number of pieces of state information used for calculating the standard contribution, a suitable number may be set for each system based on the result of system analysis. For example, the number of pieces of state information used for calculating the standard contribution may be a preset predetermined number. Alternatively, the number of pieces of state information used for calculating the standard contribution may be the number of pieces of state information in which prediction accuracy of the period used for calculating the standard contribution is within a preset range for each regression equation of the many-body correlation model in which the model breakdown has occurred.

It is discussed that the standpoint of preventing a reduction in accuracy of anomaly factor data item extraction at occurrence of the model breakdown in a status in which a slight change has occurred in relationship among the data items included in the many-body correlation model. From this standpoint, the state sequence information over a predetermined period immediately before, which does not include the model breakdown time, is preferably used for calculating the standard contribution. In this case, the length of the predetermined period immediately before may be set in advance. In this case, also, the standard contribution acquisition unit 22 may calculate the standard contribution after the detection time of the model breakdown by the model breakdown detection unit 24 described below.

The model breakdown detection unit 24 detects presence or absence of a model breakdown for each many-body correlation model included in the analysis model when pieces of new state information are collected. As described above, the model breakdown is a phenomenon in which a prediction error of the regression equation of the many-body correlation model exceeds a permissible range.

In the present example embodiment, the model breakdown occurrence is used as an index indicating that the effect of a change of a sensor value unrelated to a normal change is included in a change of the sensor value relating to a data item setting as an objective variable of the regression equation. The normal change is a change of the sensor value accompanying a state change of the system which is likely to occur normally.

The model breakdown detection unit 24 detects presence or absence of the model breakdown for each many-body correlation model included in the analysis model by using, for example, the state sequence information including latest state information stored in the state information storage unit 203 and the analysis model. Specifically, the model breakdown detection unit 24 calculates a predicted value at least at the latest time for the objective variable of the regression equation of the many-body correlation model. The model breakdown detection unit 24 calculates a prediction error that is a difference between the calculated predicted value of the objective variable and the actual sensor value included in the latest state information. Then, the model breakdown detection unit 24 may detect presence or absence of the model breakdown by determining whether the calculated prediction error satisfies the permissible range. Then, the model breakdown detection unit 24 outputs the detection result of the model breakdown as model breakdown information.

The model breakdown information indicates a status of model breakdown of each many-body correlation model included in the analysis model. Specifically, the model breakdown information may include information enabling a many-body correlation model in which model breakdown has occurred to be identified. Conversely, the model breakdown information may include information enabling a many-body correlation model in which model breakdown has not occurred to be identified. In addition, the model breakdown information may include various types of information acquired from the many-body correlation model in which model breakdown has occurred (or not occurred). Such information may be, for example, information on data items included in the regression equation of the many-body correlation model, a calculated prediction error, or the like. Alternatively, the model breakdown information may include a combination of such pieces of information.

Information certainly included in the model breakdown information depends on alarm conditions, or a method for calculating anomalies of the data items. For example, it is assumed that the alarm conditions or the method for calculating the anomalies of the data items concerns the number of many-body correlation models in which model breakdown has occurred (model breakdown number). In this case, the model breakdown information should include information enabling a model breakdown number to be identified. For example, when the model breakdown information includes information on presence or absence of model breakdown for each many-body correlation model included in the analysis model, the model breakdown number can be identified. When the model breakdown information includes a set of identifiers of many-body correlation models in which model breakdown has occurred, the model breakdown number can be identified.

For example, it is assumed that the alarm conditions or the anomaly calculation method of the data items concerns superiority of a regression equation of the many-body correlation model in which model breakdown has occurred. In this case, the model breakdown information should include information enabling the superiority of the regression equation of the many-body correlation model in which model breakdown has occurred to be identified. For example, the model breakdown information may include the superiority itself of the regression equation of the many-body correlation model in which model breakdown has occurred. Alternatively, when the model breakdown information includes a set of identifiers of many-body correlation models in which model breakdown has occurred, the superiority of the regression equation of the many-body correlation model indicated by each identifier can be identified.

Further, for example, it is assumed that the alarm conditions or the anomaly calculation method of the data items concerns a prediction error of the many-body correlation model in which model breakdown has occurred. In this case, the model breakdown information should include information enabling the prediction error of the many-body correlation model in which model breakdown has occurred to be identified. For example, the model breakdown information may include the prediction error itself of the many-body correlation model in which model breakdown has occurred. Alternatively, when the model breakdown information includes a set of identifiers of many-body correlation models in which model breakdown has occurred, the prediction error of the many-body correlation model in which model breakdown has occurred indicated by each identifier can be identified.

The anomaly determination unit 29 determines whether a model breakdown status of the analysis model satisfies the alarm conditions based on model breakdown information outputted from the model breakdown detection unit 24. When it is determined that the alarm conditions are satisfied as a determination result, the anomaly determination unit 29 determines that a state of the monitored system 9 is anomalous, and notifies of the determination result. A notification destination may be, for example, the output device 1003, the monitored system 9, or the like. In addition, for example, when the alarm conditions are satisfied, the anomaly determination unit 29 may store the model breakdown information outputted from the model breakdown detection unit 24 in the model breakdown information storage unit 204.

For the alarm conditions, for example, the following equation (1) can be used.

$$Na > Ta \qquad (1)$$

Here, Na represents the number of many-body correlation models in which model breakdown has occurred among the many-body correlation models included in the analysis model. Ta represents the number of permitted model breakdowns. For example, Ta=3 is assumed. In this instance, when the number of many-body correlation models in which model breakdown has occurred among the many-body correlation models included in the analysis model is four or more, the anomaly determination unit 29 determines that a state of the monitored system 9 is anomalous, and notifies of an occurrence of the anomaly.

The model breakdown information storage unit 204 stores the abovementioned model breakdown information. Further, the model breakdown information storage unit 204 may store information relating to model breakdown. The information relating to model breakdown may be, for example, measuring time of state information which has caused model breakdown when the anomaly determination unit 29 determines the anomaly, or the like.

The anomaly factor extraction unit 25 is configured to operate as follows when the state of the monitored system 9 is determined to be anomalous by the anomaly determination unit 29. When the model breakdown information is registered in the model breakdown information storage unit 204 by the anomaly determination unit 29 as described above, the anomaly factor extraction unit 25 is configured to operate at the time of addition of new model breakdown information to the model breakdown information storage unit 204. Specifically, the anomaly factor extraction unit 25 calculates anomaly statistical values for respective data items by using the re-predicted value calculation unit 251 described below, the partial anomaly calculation unit 252 described below, and the anomaly statistical value calculation unit 253 described below. A configuration of each functional block included in the anomaly factor extraction unit 25 will be described below in detail. The anomaly factor extraction unit 25 extracts data items which become anomaly factor candidates of the monitored system 9 in descending order of anomaly statistical values for respective data items. For example, the anomaly factor extraction unit 25 may extract data items having anomaly statistical values equal to or higher than a threshold as data items which become anomaly factor candidates. In addition, for example, the anomaly factor extraction unit 25 may extract a predetermined number of data items as anomaly factor candidates in descending order of the anomaly statistical values.

Next, configurations of the many-body correlation model generation unit 211 and the model extraction unit 212 included in the analysis model acquisition unit 21 will be described in detail.

The many-body correlation model generation unit 211 selects, among the data item group included in the state information, one arbitrary data item as an objective variable, and selects at least two arbitrary data items as explanatory variables. The many-body correlation model generation unit 211 constructs a regression equation by using at least three data items for all combinations of the selected objective variable and at least the two explanatory variables. The many-body correlation model generation unit 211 calculates the permissible range of a prediction error of the regression equation. Then, the many-body correlation model generation unit 211 generates a many-body correlation model including the constructed regression equation and the permissible range of prediction error of the regression equation. The number of data items included as explanatory variables in the regression equation of the many-body correlation model is preferably small, most preferably two, from the standpoint of preventing a reduction in detection sensitivity caused by a sensor noise and facilitating narrowing-down of anomaly factor data items. On the other hand, from the standpoint of enabling high prediction accuracy to be maintained even when the state of the system changes, the number of data items included as explanatory variables in the regression equation of the many-body correlation model is preferably larger.

The many-body correlation model generation unit 211 may use, as such a regression equation of the many-body correlation model, for example, a regression equation constructed by using four data items in the following equation (2).

$$\hat{u}(t) = f(x, y, z) = \sum_{i=1}^{N} a_i x(t)^i + \sum_{i=1}^{M} b_i y(t)^i \sum_{i=1}^{K} c_i z(t)^i + d \quad (2)$$

Here, t represents an index of state information. A serial integer in which a value increases from old to new when the pieces of state information are arrayed in an old order is provided to the state information index t. In addition, x(t) represents a value of a data item x when the state information index is t. In the equation (2), hatted u(t) on the left side of a first equal sign is equivalent to an objective variable, and becomes a predicted value of a data item u when the state information index is t. In addition, $x(t)^i$, $y(t)^i$, and $z(t)^i$ on the right side of a second equal sign are equivalent to explanatory variables, and represent values acquired by multiplying sensor values of data items x, y and z by i when the state information index is t. Further, f(x, y, z) between the first equal sign and the second equal sign indicates that the regression equation is a function using the three data items x, y, and z as the explanatory variables. N, K, and M are arbitrary integers.

The many-body correlation model generation unit 211 determines $a_i$, $b_i$, $c_i$, d, K, N, and M as parameters in the equation (2) so that superiority F of the regression equation can be highest. For the superiority F of the regression equation, for example, prediction accuracy of the egression equation in the following equation (3) can be used. In the equation (3), u(t) represents a value of a data item u when the state information index is t. In addition, u with a bar represents an average value of objective variables in a predetermined period included in the state sequence information. The predetermined period is a learning period for determining the parameters, and the state information is between N0 to N1 (N0≤N1). Here, N0 represents an index indicating the oldest time of the state information used for constructing the regression equation. N1 represents an index indicating the latest time of the state information used for constructing the regression equation.

$$F = \left[ 1 - \sqrt{\frac{\sum_{t=N0}^{N1} \{u(t) - \hat{u}(t)\}^2}{\sum_{t=N0}^{N1} \{u(t) - \bar{u}(t)\}^2}} \right] \quad (3)$$

The superiority of the regression equation has two standpoints of high prediction accuracy and a low generalization error. In the example of the equation (3), superiority is determined from the standpoint of the high prediction accuracy. On the other hand, the superiority can be determined from the standpoint of the low generalization error. In such a case, for example, the superiority F of the regression equation can be calculated by using an information criterion. The superiority of the regression equation may be calculated by combining calculation methods based on these standpoints.

For example, a parameter in which the superiority F is highest can be determined by determining $a_i$, $b_i$, $c_i$, and d at groups of K, N, and M so that the superiority F can be highest, and then selecting a group of K, N, and M in which the superiority F is highest. In the present example embodiment, as a method for determining the parameters $a_i$, $b_i$, $c_i$, and d, PLS (Partial Least Squares) is used. Specifically, first, the many-body correlation model generation unit 211 sets maximum values of K, N, and M, and formulates a regression equation for each combination of K, N, and M. Then, the many-body correlation model generation unit 211 determines parameters $a_i$, $b_i$, $c_i$, and d for each regression equation by using PLS regression. For example, the number of components of the PLS regression can be determined as follows. The many-body correlation model generation unit 211 should determine, when the number of components of the PLS regression is sequentially increased from 1, the number of components before a change from a decrease to an increase of a maximum value of a prediction error at the state sequence information used for generating the analysis model. Finally, the many-body correlation model generation unit 211 should calculate superiority F for each regression equation, and selects parameters $a_i$, $b_i$, $c_i$, d, K, N, and M of the regression equation having highest superiority F. Accordingly, a desired regression equation is acquired. Here, maximum values of K, N, and M can be arbitrarily set by the operator.

The method for determining the parameters $a_i$, $b_i$, $c_i$, and d is not limited to the PLS. It is now assumed that relationship among the data items does not change. As long as this assumption holds, for the method for determining the parameters, a method which enables substantially the same value to be stably acquired while the value of each parameter is not affected greatly by a sensor noise, and in which an explanatory variable data item having a small absolute value of contribution is not included in the regression equation of the many-body correlation model can be employed.

A first reason for using the PLS in the present example embodiment is that the parameters can be stably acquired even when multicollinearity occurs. When the multicollinearity occurs, by a least square method, the parameters may not be stably acquired because the parameter values greatly change when a noise superimposed on a true sensor value changes only slightly. When regression analysis is carried out by using the sensor value in the system, a phenomenon of multicollinearity is highly likely to occur. This is because an operation of an element such as a device constituting the system in conjunction with the other element may cause a change of the sensor value acquired from the components of the system similarly in conjunction with the other sensor values.

A second reason for using the PLS in the present example embodiment is that principal components among the data items are extracted as latent variables (components of PLS regression). This feature enables generation of a many-body correlation model including a regression equation in which an explanatory variable data item having a small absolute value of contribution is not included.

A third reason for using the PLS in the present example embodiment is that the number of data items when the regression equation is formulated does not change even after the parameters have been determined. Accordingly, at the time of formulation, the number of data items to be included in the regression equation can be established to be at least three. Thus, a model extraction unit 212 described below may not need to check the number of data items included in the regression equation, and the system configuration can be simplified.

Thus, the many-body correlation model generation unit 211 constructs a regression equation for all combinations in which one arbitrary data item among the data item group included in the state information is set as an objective variable and at least two arbitrary data items are set as explanatory variables.

For example, the many-body correlation model generation unit 211 generates, as the permissible range of prediction error of the constructed regression equation of the many-body correlation model, the range that satisfies both of an equation (4) and an equation (5) below.

$$r_i \leq T_1 \quad (4)$$

$$r_i \geq T_2 \quad (5)$$

Here, $T_1$ presents an upper limit threshold at the prediction error. $T_2$ represents a lower limit threshold at the prediction error. In addition, $r_i$ represents a prediction error at the i-th time of an objective variable calculated by using the regression equation of the many-body correlation model. Here, i represents an identifier of time in the state sequence information. More specifically, i represents a serial number when the pieces of state information from given reference time to relevant time are arrayed in ascending or descending order. For example, i may represent the i-th time from a monitoring start.

The many-body correlation model generation unit 211 may determine the upper limit threshold $T_1$ and the lower limit threshold $T_2$ in the equation (4) and the equation (5) by using, for example, an equation (6) and an equation (7) below.

$$T_1 = \max\{|R_{N0}|, \ldots, |R_{N1}|\} \quad (6)$$

$$T_2 = -T_1 \quad (7)$$

Here, max { } represents a function for outputting a maximum value from inputted numerical values. |x| represents an operator for extracting an absolute value of x. $R_i$ (i=N0–N1) represents a prediction error of the i-th time of the objective variable calculated from the state sequence information used for constructing the regression equation of the many-body correlation model. N0 represents an index indicating the oldest time of the state information used for constructing the regression equation. N1 represents an index indicating the latest time of the state information used for constructing the regression equation.

In other words, in the equation (6), as the upper limit value $T_1$ of the permissible range, a maximum value of an absolute value of the prediction error (hereinafter, prediction error in calculation period) calculated over the period of the state sequence information used for constructing the regression equation is applied. In the equation (7), as the lower limit value $T_2$ of the permissible range, a value acquired by multiplying the maximum value of the absolute value of the prediction error during the same calculation period by –1 is applied.

Not limited to the equation (6) and the equation (7), the many-body correlation model generation unit 211 may determine the upper limit value $T_1$ and the lower limit value $T_2$ by using an average value and standard deviation of the prediction errors $R_{N0}$-$R_{N1}$ during the abovementioned calculation period. For example, the many-body correlation model generation unit 211 may set a value acquired by adding a value three times the standard deviation to the average value of the prediction error as the upper limit value $T_1$. In this case, the many-body correlation model generation unit 211 may set a value acquired by subtracting the value three times the standard deviation from the average value of the prediction error as the lower limit value $T_2$.

This way, the many-body correlation model generation unit 211 determines the permissible range of prediction errors for each regression equation constructed for all the combinations in which one arbitrary data item among the data item group included in the state information is set as an objective variable and at least two arbitrary data items are set as explanatory variables. Then, the many-body correlation model generation unit 211 generates a many-body correlation model group including each regression equation and the permissible range of prediction errors. The generated many-body correlation model group becomes a candidate of a many-body correlation model used as the analysis model.

A model extraction unit 212 extracts a many-body correlation model to be used as the analysis model from the many-body correlation model group generated by the many-body correlation model generation unit 211. For example, the model extraction unit 212 may extract at least one many-body correlation model from the many-body correlation model group based on superiority of the regression equation.

Specifically, the model extraction unit 212 may extract a many-body correlation model that satisfies a predetermined superiority model condition as a superior many-body correlation model from the many-body correlation model group generated by the many-body correlation model generation unit 211. The model extraction unit 212 may set a superior many-body correlation model group which is a set of extracted superior many-body correlation models as an analysis model. The model extraction unit 212 stores analysis model information including model information of each extracted superior many-body correlation model in an analysis model storage unit 201.

For example, the model extraction unit 212 may use the following equation (8) as the superior model condition. $F_{th}$ represents a threshold at superiority F of a regression equation.

$$F > F_{th} \tag{8}$$

Here, for the threshold $F_{th}$ at the superiority F of the regression equation, an arbitrary value can be set by the operator. From the standpoint of widening the target range of anomaly detection, the threshold $F_{th}$ is preferably set low. On the other hand, from the standpoint of reducing erroneous detection caused by a system state change or the like, the threshold $F_{th}$ is preferably set high. For example, it is assumed that the superiority F takes a value of 0 to 1. In this case, from the standpoint of reducing erroneous detection, for example, the threshold $F_{th}$ is preferably set to a value from 0.7 to 1.

For example, the model extraction unit 212 may extract at least one many-body correlation model from the many-body correlation model group based on superiority of a mutual correlation model. Here, the mutual correlation model means a regression equation including two data items.

Specifically, first, the model extraction unit 212 generates mutual correlation models for all combinations of the data items using similar procedure as that of the generation process of the many-body correlation model group carried out by the many-body correlation model generation unit 211. The model extraction unit 212 calculates superiority F of a regression equation for each mutual correlation model. Then, the model extraction unit 212 extracts a superior mutual correlation model that is a mutual correlation model satisfying a predetermined superior model condition. For example, the model extraction unit 212 may use the equation (8) as the superior model condition. The model extraction unit 212 may extract the many-body correlation model group that includes the data items included in the superior mutual correlation model in a regression equation as the superior many-body correlation model group.

For example, it is assumed that many-body correlation models having the same combination of the data items included in the regression equation are included in the many-body correlation model group generated by the many-body correlation model generation unit 211. In this case, the model extraction unit 212 may extract parts of the many-body correlation models having the same combination of the data items included in the regression equation as superior many-body correlation models. For example, the model extraction unit 212 may extract one of the many-body correlation models having the same combination of the data items included in the regression equation as a superior many-body correlation model. For example, the model extraction unit 212 may extract a many-body correlation model to be included in the superior many-body correlation model group from a group of many-body correlation models having the same combination of the data items included in the regression equation based on superiority of the regression equation. In this case, for the superiority of the regression equation, the superiority F of the regression equation may be used. As an example, the model extraction unit 212 may extract, from the many-body correlation models having the same combination of the data items included in the regression equation, one having the highest superiority F of the regression equation as a many-body correlation model to be included in the superior many-body correlation model group.

Nest, configurations of the re-predicted value calculation unit 251, the partial anomaly calculation unit 252, and the anomaly statistical value calculation unit 253 included in the anomaly factor extraction unit 25 will be described in detail.

The re-predicted value calculation unit 251 carries out the following process for each many-body correlation model in which model breakdown has occurred by referring to new model breakdown information added to a model breakdown information storage unit 204. In other words, the re-predicted value calculation unit 251 calculates, regarding a regression equation of each many-body correlation model in which model breakdown has occurred, a predicted value of an objective variable of the regression equation based on state information of data items and standard contribution for each explanatory variable data item.

For example, the re-predicted value calculation unit 251 may use the following equation (9) for calculating the re-predicted value. In the equation (9), the re-predicted value is acquired by dividing a value of a component concerning one data item by contribution of the data item in the regression equation.

$$\hat{u}_{kri} = \frac{g_r(x_i)}{q_{ri}} \tag{9}$$

Here, a data item $x_i$ represents an explanatory variable data item included in a regression equation r of the many-body correlation model. Hatted $u_{kri}$ represents a re-predicted value of an objective variable data item $u_k$ by the explanatory variable data item $x_i$. In addition, $g_r$ represents a function for taking out a value of a component concerning a specific data item in the regression equation r. Thus, $g_r(x_i)$ indicates a value of a component concerning the data item $x_i$ in the regression equation r. Further, $q_{ri}$ represents standard contribution of the explanatory variable data item $x_i$. The regression equation r of the many-body correlation model in which the data item $u_k$ is an objective variable can be represented by the following equation (10) when it is rewritten by using $g_r$.

$$\hat{u}_{kr} = \sum_{i=1}^{N} g_r(x_i) + c \tag{10}$$

Here, the hatted $u_{kr}$ represents a predicted value of the data item $u_k$ based on the regression equation r of the many-body correlation model. Further, c represents a constant term nondependent on the data item.

A specific method for calculating a re-predicted value in the re-predicted value calculation unit 251 will be described. Here, the regression equation of the many-body correlation model in the equation (2) is taken as an example. An index of state information relating to time when an anomaly is determined by an anomaly determination unit 29 is represented by t. In this case, re-predicted value of each data item in the equation (2) are represented by an equation (11), an equation (12), and an equation (13) below.

$$\hat{u}_x(t) = \frac{\sum_{i=1}^{N} a_i x(t)^i}{q_x} \quad (11)$$

$$\hat{u}_y(t) = \frac{\sum_{i=1}^{M} b_i y(t)^i}{q_y} \quad (12)$$

$$\hat{u}_z(t) = \frac{\sum_{i=1}^{K} c_i z(t)^i}{q_z} \quad (13)$$

Here, x, y, and z represent explanatory variable data items included in the regression equation. Hatted $u_x$, $u_y$, and $u_z$ represent re-predicted values for each of the explanatory variable data items x, y, and z. Further, $q_x$, $q_y$, and $q_z$ represent standard contributions of the explanatory variable data items x, y, and z.

A partial anomaly calculation unit 252 changes the way of allocating partial anomalies to data items included in many-body correlation models between the many-body correlation model set in a first model breakdown status and the many-body correlation model set in a second model breakdown status. Here, the first model breakdown status means a case where re-predicted values for explanatory variable data items in the many-body correlation model all become model breakdown. The second model breakdown status means a case where at least one of re-predicted values for explanatory variable data items in the many-body correlation model becomes model breakdown while at least one of the re-predicted values does not become model breakdown.

Specifically, the partial anomaly calculation unit 252 allocates partial anomalies in the many-body correlation model set in the first model breakdown status as follows. In this case, the partial anomaly calculation unit 252 allocates a numerical value of each partial anomaly so that a partial anomaly of the objective variable data item can be higher than that of the explanatory variable data item. In the present example embodiment, the partial anomaly to be allocated is binary. For example, in this case, the partial anomaly calculation unit 252 allocates 1 to the partial anomaly of the objective variable data item. The partial anomaly calculation unit 252 allocates 0 to the partial anomaly of the explanatory variable data item.

Further, the partial anomaly calculation unit 252 allocates partial anomalies in the many-body correlation model set in the second model breakdown status as follows. In this case, the partial anomaly calculation unit 252 allocates numerical values of partial anomalies so that a partial anomaly of the explanatory variable data item in which the re-predicted value becomes model breakdown can be higher than those of the objective variable data item and the explanatory variable data item in which the re-predicted value does not become model breakdown. For example, the partial anomaly calculation unit 252 allocates 1 to the partial anomaly of the explanatory variable data item in which the re-predicted value becomes model breakdown. The partial anomaly calculation unit 252 allocates 0 to the partial anomalies of the objective variable data item and the explanatory variable data item in which the re-predicted value does not become model breakdown.

An anomaly statistical value calculation unit 253 totals the partial anomalies acquired from the partial anomaly calculation unit 252 for all many-body correlation models in which model breakdown has been detected. Accordingly, an anomaly statistical value which is a statistical value of anomalies for respective data items is calculated. In the present example embodiment, an average value is used as the statistical value. However, a statistical amount used for the anomaly statistical value is not limited to an average value, but other statistical amounts may be used. In the present example embodiment, the anomaly statistical value calculation unit 253 deems a possibility of an anomaly factor to be higher as the anomaly statistical value is higher.

The other examples of the statistical amounts used for the anomaly statistical value may be a cumulative sum, a median value, etc. Hereinafter, unless otherwise specified, the data item is anomalous as the anomaly statistical value is higher.

An operation of the system analyzing device 2 configured as described above will be described referring to the drawings. In the description of the operation below, standard contribution is calculated by using state sequence information of a predetermined period use for generating an analysis model.

Figure 6:
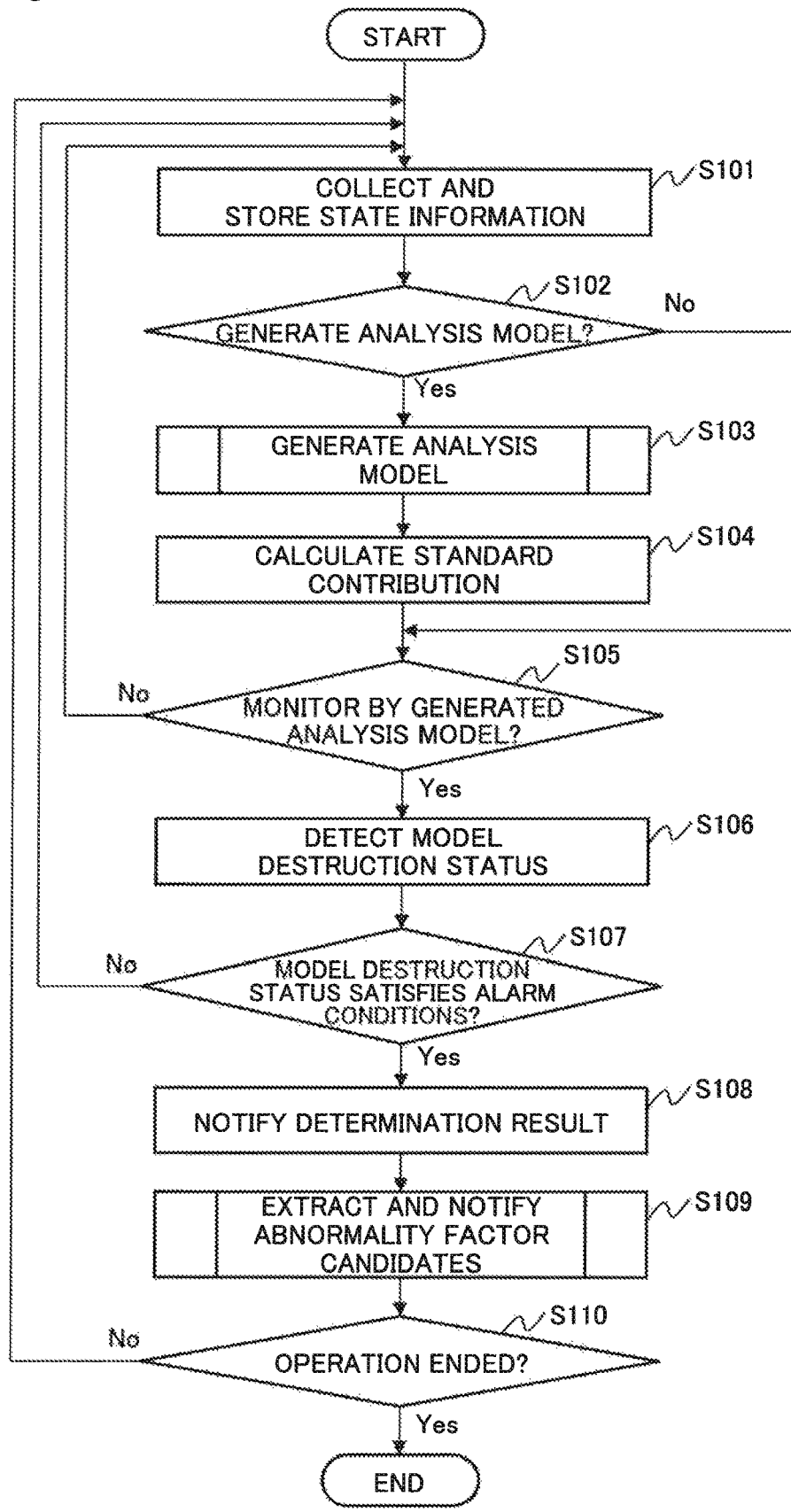
FIG. 6 is a flowchart schematically illustrating an operation of the system analyzing device according to the second example embodiment of the present invention.

An outline of an example of the operation of the system analyzing device 2 is illustrated in FIG. 6.

In FIG. 6, first, the state information collection unit 23 collects pieces of state information from the monitored system 9, and stores the state information in the state information storage unit 203 (step S101).

The state information collection unit 23 repeats the operation of step S101 until determination to end the operation is provided (Yes in step S110). The state information collection unit 23 carries out the operation of collecting pieces of state information to store the state information in the state information storage unit 203 for each predetermined period even during the operation of steps S102 to S109.

When a current timing is not a timing for generating an analysis model (No in step S102), the operation of the system analyzing device 2 proceeds to step S105.

On the other hand, a case where the current timing is a timing for generating an analysis model (Yes in step S102) will be described.

In this case, the analysis model acquisition unit 21 acquires state sequence information of a predetermined period used for generating the analysis model from the state information storage unit 203. Then, the analysis model acquisition unit 21 generates the analysis model by using the acquired state sequence information (step S103). This step will be described in detail below.

Then, the standard contribution acquisition unit 22 calculates standard contribution of each explanatory variable data item in a regression equation of each many-body correlation model included in the analysis model by using the state sequence information of the predetermined period used for generating the analysis model (step S104).

Then, unless determination to monitor a target system by using the current analysis model is provided (No in step S105), the system analyzing device 2 repeats the operation from step S101.

A case where determination to monitor the target system by using the current analysis model is provided (Yes in step S105) will be described. In this case, the model breakdown detection unit 24 detects a model breakdown occurrence for the analysis model indicated by analysis model information stored in the analysis model storage unit 201 by using new state information collected by the state information collection unit 23 (step S106).

As described above, the model breakdown detection unit 24 should determine whether a prediction error when the newly collected state information is applied exceeds a permissible range for each many-body correlation model included in the analysis model. Then, the model breakdown detection unit 24 generates model breakdown information indicating a model breakdown evaluation result of each many-body correlation model.

Then, the anomaly determination unit 29 determines whether a status of model breakdown satisfies an alarm condition based on the model breakdown information acquired from the model breakdown detection unit 24 (step S107).

When the status of model breakdown satisfies the alarm condition (Yes in step S107), the anomaly determination unit 29 notifies of the determination result (step S108). In this instance, the anomaly determination unit 29 may notify of the model breakdown information indicating the status of model breakdown together. Further, in this instance, the anomaly determination unit 29 stores the model breakdown information in the model breakdown information storage unit 204. Then, the operation of the system analyzing device 2 proceeds to step S109.

On the other hand, when the status of model breakdown does not satisfy the alarm condition (No in step S107), the anomaly determination unit 29 repeats the operation from step S101 without executing anything so that no system anomaly is detected.

Then, the system analyzing device 2 extracts at least one anomaly factor candidate data item based on the model breakdown information newly stored in the model breakdown information storage unit 204, and notifies of information indicating a group of the extracted anomaly factor candidate data items (step S109). This step will be described below in detail.

The system analyzing device 2 repeats the abovementioned operation until determination to end the operation is provided (Yes in step S110).

In steps S102, S105, and S110, the system analyzing device 2 may make the determination based on an input from an input device 1004. Alternatively, the system analyzing device 2 may make the determination based on whether a timing is a predetermined timing. Otherwise, the system analyzing device 2 may make the determination based on whether each type of information acquired from the monitored system 9 satisfies a predetermined condition. Not limited to these, the system analyzing device 2 may carry the determination process in these steps by other methods.

Figure 7:
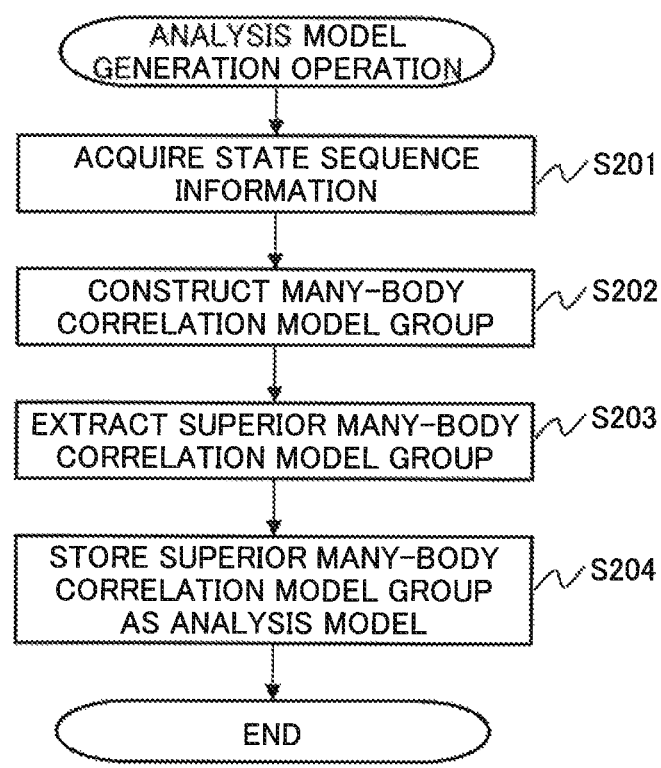
FIG. 7 is a flowchart illustrating an analysis model generation operation of the system analyzing device according to the second example embodiment of the present invention in detail.

An example of the analysis model generation operation in step S103 is illustrated in detail in FIG. 7.

In FIG. 7 first, the many-body correlation model generation unit 211 acquires the state sequence information of the predetermined period used for generating the analysis model from the state information storage unit 203 (step S201).

Then, the many-body correlation model generation unit 211 generates a group of many-body correlation models which are analysis model candidates by using the acquired state sequence information (step S202).

Here, as described above, the many-body correlation model generation unit 211 selects, among the data item group, one arbitrary data item as an objective variable, and selects at least two arbitrary data items different from the objective variable as explanatory variables. The number of data items to be selected as explanatory variables has been set to a number equal to or higher than two in advance. The many-body correlation model generation unit 211 constructs a regression equation using the objective variable data item and the explanatory variable data items for all combinations of the objective variable and the explanatory variables. The many-body correlation model generation unit 211 calculates the permissible range of prediction error of the constructed regression equation. Then, the many-body correlation model generation unit 211 should generate a many-body correlation model including the regression equation and the permissible range of prediction error. This way, the group of many-body correlation models is generated.

Then, the model extraction unit 212 extracts a group of superior many-body correlation models from the generated many-body correlation model group based on predetermined superior model condition (step S203).

Then, the model extraction unit 212 stores analysis model information indicating the acquired superior many-body correlation model group in the analysis model storage unit 201 (step S204).

Thus, the system analyzing device 2 ends the analysis model generation operation.

Figure 8:
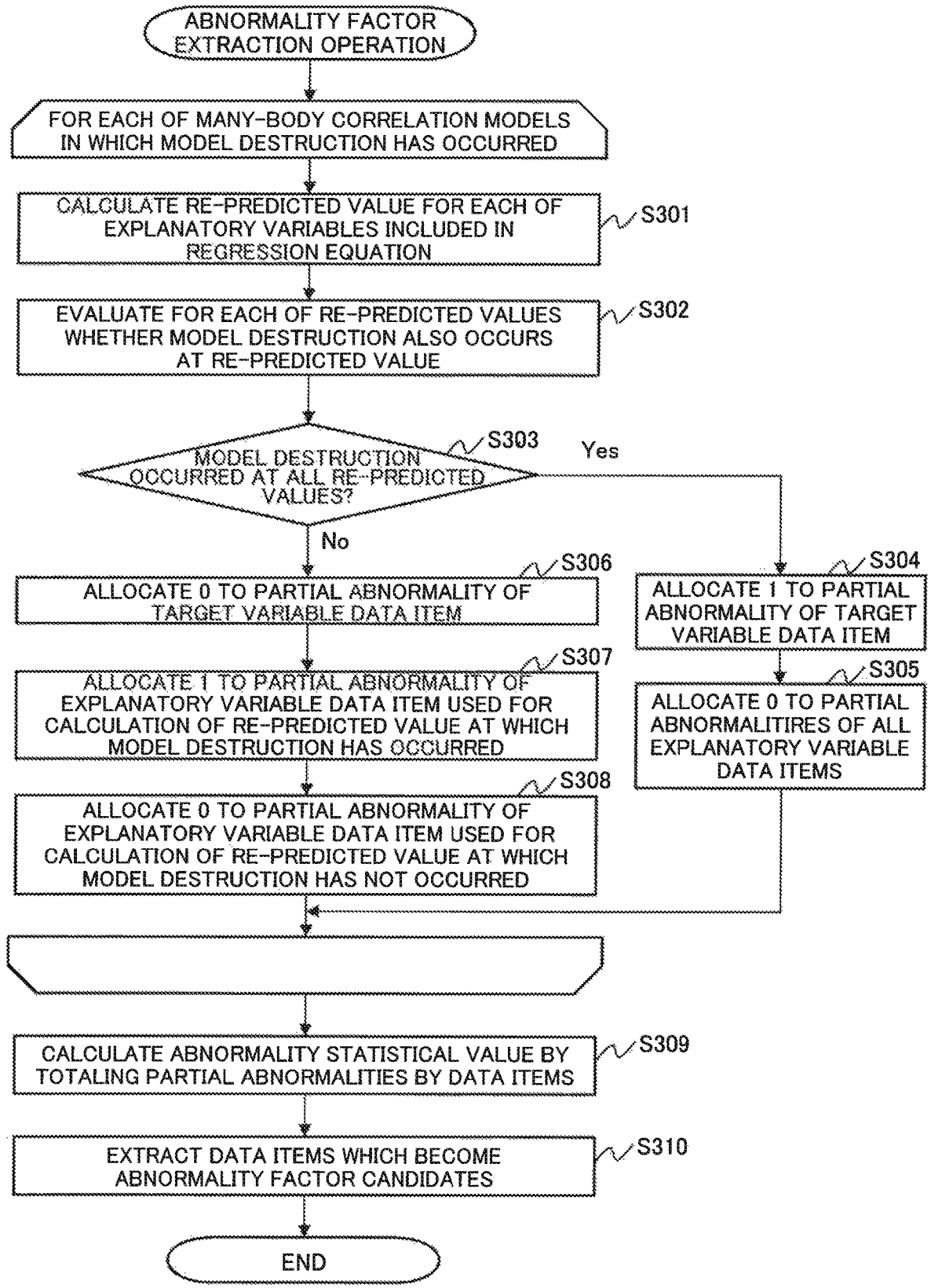
FIG. 8 is a flowchart illustrating an anomaly factor extraction operation of the system analyzing device according to the second example embodiment of the present invention in detail.

The anomaly factor extraction operation in step S109 illustrated in FIG. 6 is illustrated in detail in FIG. 8.

Here, the system analyzing device 2 repeats process of steps S301 to S308 for each regression equation of a many-body correlation model in which model breakdown has occurred.

First, the re-predicted value calculation unit 251 acquires the model breakdown information from the model breakdown information storage unit 204, and state information at the point of time when an anomaly is determined by the anomaly determination unit 29 from the state information storage unit 203. Then, the re-predicted value calculation unit 251 calculates a re-predicted value for each explanatory variable data item included in the regression equation of the many-body correlation model in which model breakdown has occurred (step S301).

Then, the partial anomaly calculation unit 252 evaluates, for each re-predicted value calculated by the re-predicted value calculation unit 251, whether a difference between the re-predicted value and a sensor value is within the permissible range of prediction error of the many-body correlation model. In other words, the partial anomaly calculation unit 252 evaluates, for each re-predicted value, whether model breakdown also occurs with the re-predicted value (step S302).

Here, a case where in the regression equation of the many-body correlation model, model breakdown occurs with all re-predicted values (first model breakdown occurrence status) (Yes in step S303) will be described. In this case, the partial anomaly calculation unit 252 allocates a partial anomaly of 1 to the objective variable data item (step S304). In addition, the partial anomaly calculation unit 252 allocates partial anomalies of 0 to all the explanatory variable data items (step S305).

On the other hand, a case where in the regression equation of the many-body correlation model, there is at least one re-predicted value in which model breakdown does not occur, and there is at least one re-predicted value in which model breakdown has occurred (second model breakdown occurrence status) (No in step S303) will be described. In this case, the partial anomaly calculation unit 252 allocates a partial anomaly of 0 to the objective variable data item (step S306). The partial anomaly calculation unit 252 allocates a partial anomaly of 1 to the explanatory variable data item used for calculating the re-predicted value in which model breakdown has occurred (step S307). In addition, the partial anomaly calculation unit 252 allocates a partial anomaly of 0 to the explanatory variable data item used for calculating the re-predicted value in which model breakdown has not occurred (step S308).

When the calculation of the partial anomalies for respective data items for each of the regression equations of all the many-body correlation models in which model breakdown has occurred is completed, the operation of the system analyzing device 2 proceeds to step S309.

In step S309, the anomaly statistical value calculation unit 253 calculates an anomaly statistical value by totaling the partial anomalies acquired from the partial anomaly calculation unit 252 for each data item over all the regression equations (step S309).

Then, the anomaly factor extraction unit 25 extracts and notifies of data items which become anomaly factor candidates based on the anomaly statistical value of each data item (step S310). For example, as described above, the anomaly factor extraction unit 25 may extract data items higher in anomaly statistical value than the threshold, and notify of the data items as anomaly factor candidates. Alternatively, for example, the anomaly factor extraction unit 25 may extract and notify of a predetermined number of data items as anomaly factor candidates in descending order of anomaly statistical values.

Thus, the system analyzing device 2 ends the anomaly factor extraction operation.

Next, the present example embodiment will be described by way of a specific example.

First, a specific example will be described regarding the analysis model generation operation according to the present example embodiment.

Here, it is assumed that prediction accuracy is used for the superiority F of the regression equation of the many-body correlation model. Further, it is assumed that a superior model condition at the many-body correlation model is "F>0.6". It is assumed that the number of data items included as the explanatory variables is two.

Figure 9:
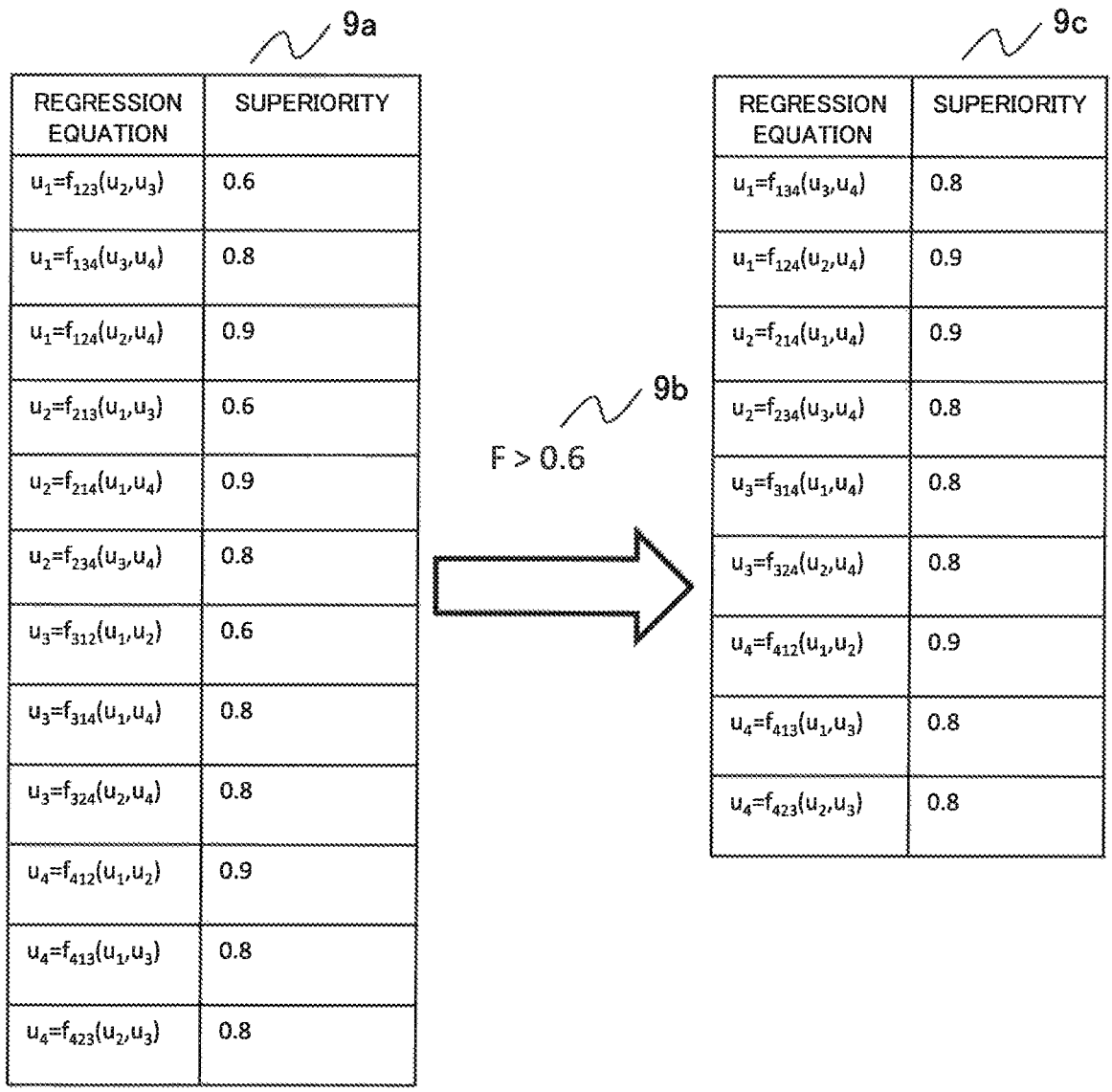
FIG. 9 is a diagram illustrating a specific example of the analysis model generation operation according to the second example embodiment of the present invention.

FIG. 9 is a diagram illustrating the analysis model generation operation according to the present example embodiment. In FIG. 9, a reference sign 9a indicates a many-body correlation model group generated by the many-body correlation model generation unit 211. A reference sign 9b indicates the superior model condition at the many-body correlation model. A reference sign 9c indicates a superior many-body correlation model group extracted by the model extraction unit 212 to be set as analysis models. Even though the many-body correlation model includes the permissible range of prediction error of the regression equation, the permissible range is omitted to be illustrated because the permissible range of prediction error of the regression equation is not used for extracting the superior many-body correlation models. Hereinafter, values not used for description will not be illustrated, either.

In this specific example, first, the many-body correlation model generation unit 211 acquires state sequence information from the state information storage unit 203 to generate the many-body correlation model group 9a. The many-body correlation model group 9a includes twelve many-body correlation models. A data item group included in the state sequence information used for generating the many-body correlation model group 9a includes a data item $u_1$, a data item $u_2$, a data item $u_3$, and a data item $u_4$. Regression equations of the twelve many-body correlation models constituting the many-body correlation model group 9a are $u_1=f_{123}(u_2, u_3)$, $u_1=f_{134}(u_3, u_4)$, $u_1=f_{124}(u_2, u_4)$, $u_2=f_{213}(u_1, u_3)$, $u_2=f_{214}(u_1, u_4)$, $u_2=f_{234}(u_3, u_4)$, $u_3=f_{312}(u_1, u_2)$, $u_3=f_{314}(u_1, u_4)$, $u_3=f_{324}(u_2, u_4)$, $u_4=f_{412}(u_1, u_2)$, $u_4=f_{413}(u_1, u_3)$, and $u_4=f_{423}(u_2, u_3)$. Here, $f_j(\ )$ represents a function for calculating a predicted value of an objective variable data item on the left from explanatory variable data items included in the bracket. Note that j represents an identifier for identifying a regression equation. For explanatory variables of such a function, regarding data items in the bracket, values (sensor values) of the data items included in the state sequence information stored in the state information storage unit 203 are applied. The explanatory variables are not limited to the values themselves of the data items, but conversion values calculated by using the data items may be applied.

Then, the model extraction unit 212 extracts superior many-body correlation models that satisfy the superior model condition 9b from the many-body correlation model group 9a, and acquires the superior many-body correlation model group 9c which is an analysis model. The superior model condition 9b in the present example is "superiority F of regression equation>0.6" as illustrated in FIG. 9. Thus, the model extraction unit 212 extracts, among the twelve many-body correlation models constituting the many-body correlation model group 9a, many-body correlation models in which the superiority F of the regression equation exceeds 0.6 as superior many-body correlation models. In the present example, it is assumed that many-body correlation models associates with the following nine regression equations are extracted: $u_1=f_{134}(u_3, u_4)$, $u_1=f_{124}(u_2, u_4)$, $u_2=f_{214}(u_1, u_4)$, $u_2=f_{234}(u_3, u_4)$, $u_3=f_{314}(u_1, u_4)$, $u_3=f_{324}(u_2, u_4)$, $u_4=f_{412}(u_1, u_2)$, $u_4=f_{413}(u_1, u_3)$, and $u_4=f_{423}(u_2, u_3)$. This way, the superior many-body correlation model group 9c including the nine many-body correlation models is generated as the analysis model.

Next, a specific example will be described regarding the anomaly factor extraction operation according to the present example embodiment.

In the specific example below, it has been assumed that the effect of an anomaly appears in the data item $u_2$ and the data item $u_3$.

FIG. 10 is a diagram illustrating the specific example of the anomaly factor extraction operation according to the present example embodiment. In FIG. 10, a data set 10a indicates, regarding the abovementioned nine many-body correlation models included in the analysis model, prediction errors of re-predicted values, model breakdown evaluation results based on the re-predicted values, and partial anomalies. A data set 10b indicates anomaly statistical values for each of the data items. In the data set 10a illustrated in FIG. 10, model breakdown evaluation results are written in a column of "model breakdown". In this column, regression equations in which model breakdown has occurred have "◯" marks. In "first" and "second" columns of "prediction error of re-predicted value based on explanatory variable data item", numerical values of prediction errors of re-predicted values calculated for a first explanatory variable data item and a second explanatory variable data item are written. However, items in which calculation is not preferable because model breakdown has not occurred in the many-body correlation models have "-" marks. Here, for convenience of description, the explanatory variable data items in the function $f_j(\ )$ are referred to as a first explanatory variable data item and a second explanatory variable data item sequentially from the left in the bracket. In "first" and "second" columns of "model breakdown evaluation result based on explanatory variable data item", presence or absence of model breakdown based on each re-predicted value is written. In this column, regression equations in which model breakdown has occurred based on re-predicted values have "○" marks. In the column of "partial anomaly", 0 or 1 partial anomalies are written. However, items in which calculation is not preferable because model breakdown has not occurred in the many-body correlation models have "-" marks.

For example, a many-body correlation model including the regression equation $u_1=f_{134}(u_3, u_4)$ does not have a "○" mark in the column of "model breakdown" because model breakdown has not occurred. Thus, "-" is written in the places of "prediction error of re-predicted value based on explanatory variable data item" and "partial anomaly" relating to $u_1=f_{134}(u_3, u_4)$.

For example, a many-body correlation model including the regression equation $u_1=f_{124}(u_2, u_4)$ has a "○" mark in the column of "model breakdown" because model breakdown has occurred. Thus, the re-predicted value calculation unit 251 calculates, for $u_1=f_{124}(u_2, u_4)$, re-predicted values to be written in the "first" and "second columns" of "prediction error of re-predicted value based on explanatory variable data item". Here, regarding this many-body correlation model, the prediction error of the re-predicted value based on the first explanatory variable data item is outside the permissible range. The prediction error of the re-predicted value based on the second explanatory variable data item is not outside the permissible range. In other words, while model breakdown has not occurred at least one re-predicted value, model breakdown has occurred at least one re-predicted value, setting a second model breakdown occurrence status. Thus, the partial anomaly calculation unit 252 allocates a partial anomaly of 1 to the first explanatory variable data item $u_2$ in which the re-predicted value has become model breakdown. The partial anomaly calculation unit 252 allocates partial anomalies of 0 to the other explanatory variable data item $u_1$ and the objective variable data item $u_4$.

A many-body correlation model including the regression equation $u_2=f_{214}(u_1, u_4)$ has a "○" mark in the column of "model breakdown" because model breakdown has occurred. Thus, the re-predicted value calculation unit 251 calculates, for $u_2=f_{214}(u_1, u_4)$, re-predicted values to be written in the "first" and "second columns" of "prediction error of re-predicted value based on explanatory variable data item". Regarding this many-body correlation model, the prediction error of the re-predicted value based on the first explanatory variable data item and the prediction error of the re-predicted value based on the second explanatory variable data item are both outside the permissible range. In other words, model breakdown has occurred at all the re-predicted values, setting a first model breakdown occurrence status. Thus, the partial anomaly calculation unit 252 allocates a partial anomaly of 1 to the objective variable data item $u_2$. The partial anomaly calculation unit 252 allocates partial anomalies of 0 to all the explanatory variable data items $u_1$ and $u_4$.

As indicated in the data set 10a, partial anomalies have been calculated for the data items included in the other many-body correlation models this way.

Then, the anomaly statistical value calculation unit 253 calculates anomaly statistical values as written in the data set 10b illustrated in FIG. 10. The anomaly statistical value written in the data set 10b is an average value acquired by totaling the partial anomalies written in the data set 10a for respective data items. The anomaly statistical value calculation unit 253 calculates such average values targeting numerical values of the partial anomalies for respective data items. For example, regarding the data item $u_2$, partial anomalies of 1 are allocated in four many-body correlation models, and a partial anomaly of 0 is allocated in one many-body correlation model. Thus, the anomaly statistical value calculation unit 253 calculates an anomaly statistical value of the data item $u_2$ to be about 0.67. Similarly, the anomaly statistical value calculation unit 253 calculates anomaly statistical values for the other data items as written in the data set 10b. In this example, acquisition of high anomaly statistical values has been checked for the data item $u_2$ and the data item $u_3$ in which the effect of the anomaly has appeared. On the other hand, acquisition of low anomaly statistical values has been checked for the data items $u_1$ and $u_4$ in which the effect of the anomaly has not appeared.

Thus, in the present specific example, the anomaly statistical values enabling clear discrimination between the data item in which the effect of the anomaly has appeared and the data item in which the effect of the anomaly has not appeared are calculated.

Then, for example, the anomaly factor extraction unit 25 should set a threshold at the anomaly statistical values, and extract and output data items having anomaly statistical values higher than the threshold as anomaly factor candidates. Hereby, the present specific example can perform a notification urging a focus on higher anomaly statistical values.

Next, the effects of the second example embodiment of the present invention will be described.

The system analyzing device according to the second example embodiment of the present invention can accurately extract information useful for identifying anomaly factors even when a change in a sensor value caused by an anomaly is small and the change appears in a plurality of sensors.

Five reasons thereof will be described.

The first reason is that the analysis acquisition unit generates the many-body correlation model as the analysis model. As a result, according to the present example embodiment, the model breakdown of the many-body correlation model can be re-evaluated for each explanatory variable data item included in the regression equation of the many-body correlation model. Thus, the present example embodiment enables more suitable discrimination between the data item affected by the effect of the anomaly and the data item not affected by the anomaly. In other words, according to the present example embodiment, information useful for identifying anomaly factors can be accurately extracted.

The second reason is that the many-body correlation model generation unit can configure the regression equation so that the number of data items included in the regression equation of the many-body correlation model can be smaller. As a result, according to the present example embodiment, the amount of noise included in the sensor value of the data item to be superimposed on the predicted value can be reduced compared with a case where the number of data items included in the regression equation is large. Thus, according to the present example embodiment, a many-body correlation model high in anomaly detection accuracy can be configured, and anomaly detection leakage can be prevented. In other words, according to the present example embodiment, information useful for identifying anomaly factors can be accurately extracted even when a change in the sensor value caused by an anomaly is small.

The third reason is that the many-body correlation model generation unit can configure a plurality of regression equations for one type of an objective variable as an analysis model. As a result, according to the present example embodiment, there is a possibility that even when data items causing a reduction in anomaly detection accuracy are present, a regression equation including no data item causing a reduction in anomaly detection accuracy can be constructed at a regression equation for predicting one type of objective variable data items. The data items causing a reduction in anomaly detection accuracy are data items of large sensor noises included in the sensor values and the like. Thus, according to the present example embodiment, anomaly detection leakage caused by the inclusion of the data items causing a reduction in anomaly detection accuracy in the regression equation can be prevented. In other words, according to the present example embodiment, since the number of regression equations constructed at one type of the objective variables is not limited to one, anomaly detection leakage can be prevented even when a change in the sensor value caused by an anomaly is small. Further, since the number of regression equations at one type of the objective variables is not limited to one, a ratio of contribution of a certain regression equation to a determination result as to whether the data item serving as the objective variable in the regression equation has been affected by the anomaly is reduced. Therefore, similarly to the data items causing a reduction in anomaly detection accuracy, even when there are data items causing a reduction in anomaly factor identification accuracy, the present example embodiment enables suitable discrimination between the data item affected by the effect of the anomaly and the data item not affected by the anomaly. Thus, according to the present example embodiment, information useful for identifying anomaly factors can be accurately extracted.

The fourth reason is that the re-predicted value calculation unit and the partial anomaly calculation unit calculate, for the individual explanatory variable data items in the individual regression equations, partial anomalies based on the status of model breakdown occurrence by the re-predicted values using the standard contribution. In addition, the anomaly statistical value calculation unit calculates the anomaly statistical values by totaling the partial anomalies for respective data items. Thus, according to the present example embodiment, which data items are anomalous can be evaluated for each of the regression equations of the many-body correlation models, and totaled. As a result, the present example embodiment enables suitable discrimination between the data item affected by the effect of the anomaly and the data item not affected by the anomaly. In other words, according to the present example embodiment, information useful for identifying anomaly factors can be accurately extracted even when a change in the sensor value caused by the anomaly appears in a plurality of sensors.

The fifth reason is that the many-body correlation model generation unit determines the parameters for the regression equation of the many-body correlation model such that an explanatory variable data item having a small absolute value of contribution is not included in the regression equation of the many-body correlation model. Thus, according to the present example embodiment, the re-predicted value of the objective variable can be stably calculated based on the standard contribution of the individual explanatory variable data items in the individual regression equations. Accordingly, the abovementioned fourth reason is assured.

In the present example embodiment, as the example of the regression equation of the many-body correlation model, the example of using the values of the data items for the objective variables and the explanatory variables has mainly been described. The objective variables and the explanatory variables are not limited to these, in the regression equation, and values acquired by converting the values of the data items into numerical values may be used. Examples acquired by converting the values of the data items into numerical values are a difference, an exponential, an average value of state sequence information in a predetermined time length, etc.

In the present example embodiment, the example where the period of the state sequence information used for generating the analysis model is one period continuous in time has mainly been described. However, the present example embodiment is not limited thereto, and the period of the state sequence information used for generating the analysis model may not always be continuous. For example, state sequence information included in a plurality of periods which not continuous to each other may be used for generating the analysis model.

In the present example embodiment, as the example of the regression equation generation method in the equation (2), the example where the many-body correlation model generation unit determines each parameter so that the value of the prediction accuracy indicating superiority can be largest has been described. However, the present example embodiment is not limited thereto, and the many-body correlation model generation unit may use other superiorities according to purposes. For example, a reciprocal of an information criterion such as AIC (Akaike's Information Criterion) or BIC (Bayesian Information criterion) may be applied as the superiority of the regression equation. In this case, also, the many-body correlation model generation unit may determine each parameter so that such a superiority can be largest.

In the present example embodiment, the following method has been described as the determination method of the number of components of the PLS regression when the parameters $a_i$, $b_i$, $c_i$, d, N, M, and K of the regression equation in the equation (2) are determined. In other words, the example of the number of components before the change from the decrease to the increase of the maximum value of the prediction error at the state sequence information used for generating the model when the number of components of the PLS regression is sequentially increased from 1 has been described. Not to limited to this, the many-body correlation model generation unit may determine the number of components of the PLS regression by using a technique such as World's R criterion, Krzanowski's W criterion, Osten's F criterion, or the like.

In the present example embodiment, as example of the determination method of the parameters $a_i$, $b_i$, $c_i$, and d of the regression equation while N, M, and K are fixed, the example of using the PLS regression has been described. Not to limited to this, the many-body correlation model generation unit may determine these parameters by using another method such as Principle Component Regression (PCR) that can prevent multicollinearity between the explanatory variables.

Alternatively, the many-body correlation model generation unit may determine, by using a loss function with a normalization parameter used for Lasso (least absolute shrinkage and selection operator), ridge regression, etc., these parameters so that the loss function with the normalization parameter can be smallest. Otherwise, the many-body correlation model generation unit may determine, when there is no effect of multicollinearity between the explanatory variables, the parameters $a_i$, $b_i$, $c_i$, and d by using the least square method so that the numerator in the second term of the equation (3) can be minimum.

In the present example embodiment, when the many-body correlation model group is generated, all the data items can be used, whether the data items are objective variable data items or explanatory variable data items. However, the present example embodiment is not limited thereto, and data items usable only as objective variable data items or data items usable only as explanatory variable data items may be defined.

In the present example embodiment, the example where the many-body correlation model generation unit generates the many-body correlation model group in which the numbers of data items included in the respective regression equations as explanatory variable data items are all equal has been described. However, the present example embodiment is not limited thereto, and in the many-body correlation model group generated by the many-body correlation model generation unit, the numbers of data items included as explanatory variable data items may not be always equal. In other words, the number of data items included as explanatory variable data items in a certain regression equation may be different from the number of data items included as explanatory variable data items in at least one other regression equation. For example, the many-body correlation model generation unit may combine a many-body correlation model in which the number of explanatory variable data items is two with a many-body correlation model in which the number of explanatory variable data items is three. In this case, the model extraction unit should extract a superior many-body correlation model from the many-body correlation models in which the numbers of explanatory variable data items are three and two. The number of data items included as the explanatory variable in the regression equation of the many-body correlation model may be arbitrarily set by the operator.

In the present example embodiment, the example where the system analyzing device monitors the state of the monitored system by using one analysis model has been described. One analysis model means an analysis model that includes the many-body correlation model group generated based on the same state sequence information. However, the present example embodiment is not limited thereto, and the analysis model acquisition unit may generate a plurality of analysis models by using state sequence information varied from one to the other in collection period. In such a case, the system analyzing device may monitor the state of the monitored system by appropriately switching a plurality of the analysis models.

In the present example embodiment, the example where the system analyzing device constructs the analysis model only once has mainly been described. However, the present example embodiment is not limited thereto, and the system analyzing device may successively reconstruct analysis models.

In the present example embodiment, the example where the system analyzing device monitors the state of the monitored system by using all the regression equations included in the analysis model for model breakdown detection has been described. However, the present example embodiment is not limited thereto, and the system analyzing device may monitor, for example, a part of the state of the monitored system by using a part of the regression equations included in the analysis model.

In the present example embodiment, the example where the standard contribution is the ratio for respective data items included as the explanatory variables to the predicted value has been described. However, the present example embodiment is not limited thereto, and the standard contribution may be calculated by another method in which, in a predetermined period, a re-predicted value based on one arbitrary explanatory variable data item included in the many-body correlation model and a predicted value of the many-body correlation model are equal in accuracy. For the predetermined period, for example, various periods described above can be used as periods for calculating the standard contribution. For example, the standard contribution may be calculated as "component concerning one arbitrary explanatory variable data item/all components excluding constant term" in the regression equation of the many-body correlation model. "/" represents division. When this definition of the standard contribution is used, the re-predicted value calculation unit should calculate a re-predicted value of the objective variable data item based on a value of the constant term of the many-body correlation model, the standard contribution of the explanatory variable data item, and a sensor value.

In the present example embodiment, as the regression equation of the many-body correlation model, the example of the regression equation in the equation (2) has been described. In the equation (2), a value of a past (past value) of the data item nay be used as the explanatory variable. In this case, there is a case in which the regression equation of the many-body correlation model also includes a past value of the objective variable as the explanatory variable. In such a case, for example, the standard contribution acquisition unit calculates standard contribution by processing a value of a component relating to the past value of the objective variable similarly to the constant term. In other words, the past value of the objective variable included as the explanatory variable in the many-body correlation model is not targeted for re-prediction, because it is not deemed as an explanatory variable data item.

In the present example embodiment, the example where the standard contribution is the statistical value of "component concerning one arbitrary explanatory variable data item/predicted value" has been described. However, when the ratio of a component concerning a data item targeted for re-prediction is reduced in the regression equation of the many-body correlation model, the accuracy of re-prediction may be reduced. In such a case, the standard contribution is preferably a statistical value of "component concerning one arbitrary explanatory variable data item/sum total of components concerning data item to be targeted for re-prediction". When the past value of the objective variable is not included as the explanatory variable in the regression equation of the many-body correlation model, the sum total of components concerning the data item to be targeted for re-prediction is equivalent to all the components excluding the constant term. When the past value of the objective variable is included as the explanatory variable in the regression equation of the many-body correlation model, the sum total of components concerning the data item to be targeted for re-prediction is equivalent to all the components excluding the component of the past value of the objective variable and the constant term. When this definition of the standard contribution is used, the re-predicted value calculation unit may calculate a re-predicted value of the objective variable data item based on a value of the constant term of the many-body correlation model, a value of component concerning past value of the objective variable, the standard contribution of the explanatory variable data item, and the sensor value. The re-predicted value in this instance is represented by the following equation (14).

$$\hat{u}_{kri} = \frac{g_y(x_i)}{q_{ri}} + g_r(u_k) + c \quad (14)$$

Here, the data item $x_i$ represents an explanatory variable data item included in a regression equation r of the many-body correlation model. A data item $u_k$ represents an objective variable data item included in the regression equation r of the many-body correlation model. Hatted $u_{kri}$ represents a re-predicted value of an objective variable data item $u_k$ based on the explanatory variable data item $x_i$. In addition, $g_r$ represents a function for taking out a value of a component concerning a specific data item in the regression equation r. Thus, $g_r(x_i)$ indicates a value of a component concerning the data item $x_i$ in the regression equation r. Thus, $g_r(u_k)$ indicates a value of a component concerning the data item $u_k$, that is, a value of a component concerning a past value of the objective variable in the regression equation r. Further, $q_{ri}$ represents standard contribution of the explanatory variable data item $x_i$. c represents a constant term of the regression equation r.

In the present example embodiment, as the example of the alarm condition used by the anomaly determination unit, the example of the condition "when the number of correlation models in which model breakdown has occurred exceeds the predetermined number" has been described. However, the present example embodiment is not limited thereto, and the anomaly determination unit may use other alarm conditions. For example, the alarm condition may be a condition "when a cumulative value of the superiority of the regression equation of the correlation model in which model breakdown has occurred exceeds a predetermined value (alarm threshold)". In addition, for example, the alarm condition may be a condition "the abovementioned cumulative value of the superiority exceeds the alarm threshold over a predetermined period set in advance", or the like. Thus, the anomaly determination unit can apply, as the alarm conditions, various conditions based on model breakdown information.

In the present example embodiment, as the method for evaluating whether model breakdown also occurs in the re-predicted value, the example where the partial anomaly calculation unit evaluates whether the difference between the re-predicted value and the sensor value is within the permissible range of prediction error of the many-body correlation model has mainly been described. However, the present example embodiment is not limited thereto, and the partial anomaly calculation unit may evaluate whether model breakdown also occurs in the re-predicted value by using the permissible range of prediction error for the re-predicted value (threshold for re-predicted value) calculated for each data item. In other words, even in the case of the same data item, when the many-body correlation models are different, a threshold for a re-predicted value may be set for each. In such a case, the partial anomaly calculation unit may calculate the threshold for the re-predicted value by the same method as that in the case of the permissible range of prediction error of the many-body correlation model at the predetermined period used for calculating the standard contribution.

In the present example embodiment, the example where the partial anomaly calculation unit allocates, as partial anomalies, 1 out of binary values of 0 and 1 to a high partial anomaly, and 0 to a low partial anomaly has mainly been described. However, the present example embodiment is not limited thereto, and the partial anomaly calculation unit may allocate values (continuous values or discrete values) other than the binary values as partial anomalies. For example, the partial anomaly calculation unit may allocate values acquired by multiplying the binary partial anomalies described in the present example embodiment by weight as partial anomalies. As the weight, for example, the deviation of the predicted value at the time of a model breakdown occurrence, the superiority of the regression equation, or the like may be applied. The deviation of the predicted value may be, for example, larger one of "prediction error/lower limit of permissible range of prediction error" and "prediction error/upper limit of permissible range of prediction error". For example, when the deviation of the predicted value at the time of the model breakdown occurrence is used as the weight for multiplication, a partial anomaly becomes 0 or the deviation. From the standpoint of accurately extracting information useful for identifying an anomaly factor in general, as definition of the partial anomaly, the definition of the binary values as the present example embodiment is preferred. On the other hand, from the standpoint of focusing on a specific system to extract more accurate information, multiplying the partial anomaly by the weight is preferred. For the weight by which the partial anomaly is multiplied, arbitrary definition can be set by the operator based on knowledge about the target system.

In the present example embodiment, the example where the anomaly statistical value calculation unit calculates, as the anomaly statistical value, the average value among the partial anomalies for respective data items has been described. However, the present example embodiment is not limited thereto, and the anomaly statistical value may be an index concerning the high level of possibility of an anomaly factor. For example, the anomaly statistical value calculation unit may calculate a total value of the partial anomalies for respective data items as the anomaly statistical value. From the standpoint of facilitating extraction of data items the number of which included in the many-body correlation model of the analysis model is large as anomaly factors, the total value is preferably used as the anomaly statistical value. On the other hand, from the standpoint of facilitating extraction of data items the number of which included in the many-body correlation model of the analysis model is small as anomaly factors, the average value is preferably used as the anomaly statistical value.

In the present example embodiment, the example where the anomaly statistical value calculation unit calculates, as the anomaly statistical value, the anomaly statistical value indicating the higher value concerning the data item more likely to an anomaly factor has been described. However, the present example embodiment is not limited thereto, and the anomaly statistical value may be an index concerning the high level of possibility of an anomaly factor. For example, the anomaly statistical value calculation unit may calculate, as the anomaly statistical value, an anomaly statistical value indicating a lower value concerning the data item more likely to an anomaly factor.

Third Example Embodiment

Next, a third example embodiment of the present invention will be described in detail referring to the drawings. Throughout the drawings referred to in the present example embodiment, components identical to and steps operating similar to those of the first and second example embodiments are assigned same reference signs, and detailed descriptions thereof are omitted in the present example embodiment.

Figure 11:
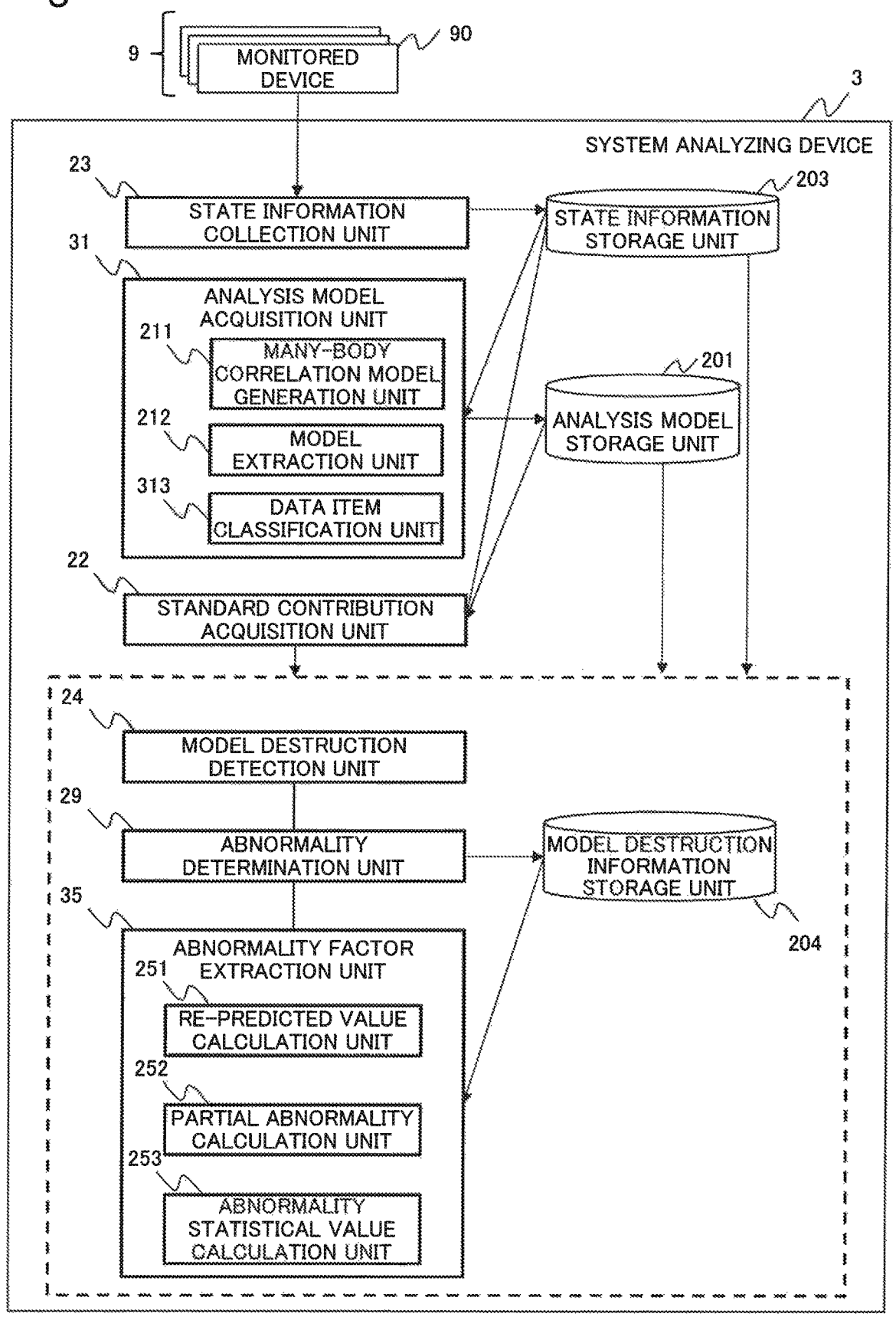
FIG. 11 is a functional block diagram of a system analyzing device according to a third example embodiment of the present invention.

A functional block configuration of a system analyzing device 3 according to the third example embodiment of the present invention is illustrated in FIG. 11. In FIG. 11, the system analyzing device 3 is different from a system analyzing device 2 according to the second example embodiment of the present invention in the point in which an analysis model acquisition unit 31 instead of the analysis model acquisition unit 21, and an anomaly factor extraction unit 35 instead of the anomaly factor extraction unit 25 are included. The analysis model acquisition unit 31 includes a data item classification unit 313 in addition to the same components as those of the analysis model 21 according to the second example embodiment of the present invention. The system analyzing device 3 is connected to the monitored system 9. In the present example embodiment, details on the monitored system 9 are omitted as it is similar in configuration to the monitored system 9 according to the first example embodiment of the present invention. In FIG. 11, the direction of an arrow connecting rectangles indicating the functional blocks is an example, not limiting the direction of a signal between the functional blocks. The system analyzing device 3 and each functional block can include the same hardware components as those of first example embodiment of the present invention described above referring to FIG. 2. The hardware configurations of the analyzing device 3 and each functional block are not limited to the abovementioned configurations.

The data item classification unit 313 classifies data item groups included in state information. The classification is carried out so that data items included as objective variables or explanatory variables in at least one regression equation of a superior many-body correlation model included in an analysis model can belong to the same group. The data item classification unit 313 may apply, as the data item classification method, a technique disclosed in Japanese Patent Application No. 2014-65120. Hereinafter, the group of data items which are similarly classified will also be referred to as a data item group. The data item classification unit 313 stores information on the data item group in the analysis model storage unit 201 in addition to analysis model information.

The anomaly factor extraction unit 35 acquires the information on the data item group from the analysis model storage unit 201. Then, the anomaly factor extraction unit 35 extracts and outputs, for each data item group, data items which become anomaly factor candidates. Specifically, the anomaly factor extraction unit 35 calculates, for a many-body correlation model in which model breakdown occurs among many-body correlation models regarding each data item group, partial anomalies for respective explanatory variable data items by using the re-predicted value calculation unit 251 and the partial anomaly calculation unit 252. Here, the many-body correlation models regarding each data item group are many-body correlation models of a regression equation regarding data items included in the data item group. Then, the anomaly factor extraction unit 35 calculates, by using the anomaly statistical value calculation unit 253, an anomaly statistical value by totaling the partial anomalies for respective data items for each data item group. Then, the anomaly factor extraction unit 35 extracts data items which become anomaly factor candidates based on the anomaly statistical value for each data item group. Then, the anomaly factor extraction unit 35 outputs, for respective data item groups, the extracted data items which become anomaly factor candidates for respective data item groups.

For example, the anomaly factor extraction unit 35 may prioritize the data item groups. In this case, the anomaly factor extraction unit 35 may output the data items extracted as the anomaly factor candidates based on the anomaly statistical value sequentially from a data item group having a high priority. In this instance, as the priority of the data item groups, order with large (or small) number of many-body correlation models concerning the data item groups may be set. Alternatively, the priority of the data item groups may be order with importance set in advance by the operator.

Here, for example, the number of data item groups to be targeted for notification by the anomaly factor extraction unit 35 may be set to an arbitrary number by the operator. From the standpoint of increasing a possibility of finding causes of a failure and grasping the overall status of the failure, the greater number of data item groups to be targeted for notification is preferred. On the other hand, from the standpoint of shortening investigation time when an erroneous report occurs, the smaller number of data item groups to be targeted for notification is preferred.

An operation of the system analyzing device 3 thus configured will be described. An outline of the operation of the system analyzing device 3 is similar to that of the operation of the system analyzing device 2 according to the second example embodiment of the present invention described above referring to FIG. 6. However, details on the analysis model generation operation in step S103 and the anomaly factor extraction operation in step S109 are different.

Figure 12:
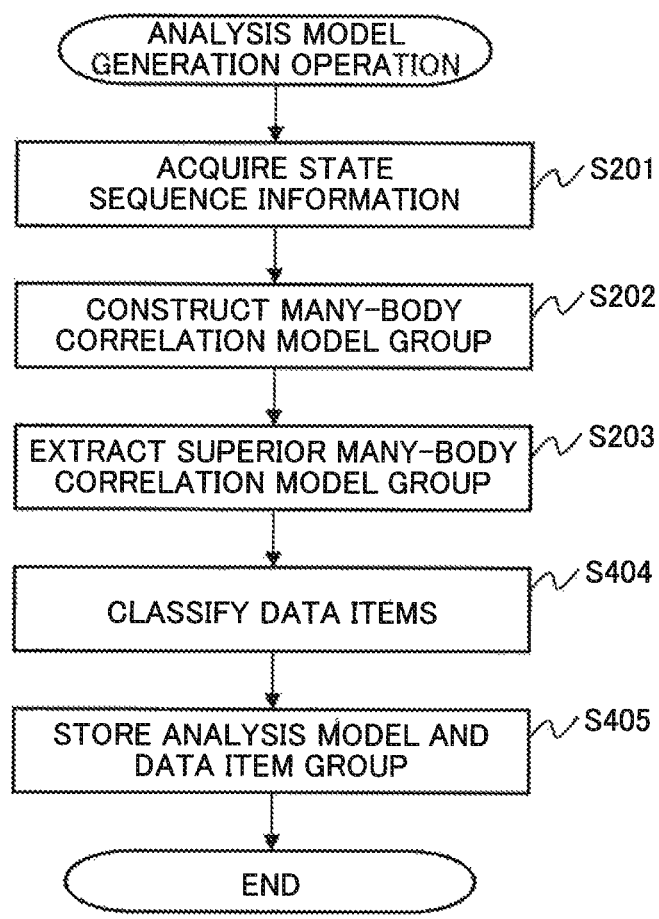
FIG. 12 is a flowchart illustrating an analysis model generation operation of the system analyzing device according to the third example embodiment of the present invention in detail.

The details on the analysis model generation operation in step S103 are illustrated in FIG. 12.

In FIG. 12, the system analyzing device 3 operates, in steps S201 to S203, similarly to the system analyzing device 2 according to the second example embodiment of the present invention to generate a superior many-body correlation model group.

Then, the data item classification unit 313 classifies the data item groups included in the state information (step S404). As described above, the classification is carried out so that data items included as objective variables or explanatory variables in at least one regression equation of a superior many-body correlation model included in an analysis model can belong to the same group.

Then, the data item classification unit 313 stores data item group information in the analysis model storage unit 201 together with analysis model information including the superior many-body correlation model group generated in step S203 (step S405).

With the above, the system analyzing device 3 ends the analysis model generation operation.

Next, the details on the anomaly factor extraction operation in step S109 will be described. The system analyzing device 3 executes the anomaly factor extraction operation according to the second example embodiment of the present invention described referring to FIG. 8 for each of data item groups. When priority has been set in the data item groups, the system analyzing device 3 preferably repeats the operation illustrated in FIG. 8 sequentially from the data item group of high priority until a predetermined number of groups targeted for notification.

With the above, the system analyzing device 3 ends the anomaly factor extraction operation.

Next, the effects of the third example embodiment of the present invention will be described.

The system analyzing device according to the third example embodiment of the present invention can notify of information useful for identifying an anomaly factor to be more easily grasped even when a change in a sensor value caused by an anomaly is small, and the change appears in a plurality of sensors.

The reason is described as follows. In the present example embodiment, the data item classification unit generates the data item group by classifying the data items constituting the state information indicating the monitored system. This classification is carried out so that the data items included as objective variables or explanatory variables in at least one regression equation of the superior many-body correlation model included in the analysis model can belong to the same group. In other words, the same data item group includes data items dependent on one another from the standpoint of the regression equation. Data items not dependent on one another from the standpoint of the regression equation are included in different data item groups. The anomaly factor extraction unit extracts and outputs data items which become anomaly factor candidates for respective data item groups. Thus, the present example embodiment can notify of the data items which become anomaly factor candidates by discriminating the data items not dependent on one another from the standpoint of the regression equation. Therefore, the present example embodiment, even when a failure affects a plurality data item groups, can notify of the overall status of the failure to be more easily grasped. For a certain reason, an anomaly statistical value in a specific data item group may not be accurately calculated. Even in such a case, because the present example embodiment can notify of data items having a high anomaly statistical value in the other data item group, a possibility of providing information useful for identifying an anomaly cause is increased.

In the present example embodiment, the example where the data item classification unit classifies the data items so that the data items included as objective variables or explanatory variables in at least one regression equation of the superior many-body correlation model included in the analysis model can belong to the same group. However, the present example embodiment is not limited thereto, and the data item classification unit may use other data item classification methods. For example, the data item classification unit may generate the data item group by using a result of classifying the data items based on expertise at a target system in advance by the operator.

As another example, the data item classification unit may generate the data item group by using a method used for classifying the data items in data mining such as K averaging or spectral clustering.

Fourth Example Embodiment

Next, a fourth example embodiment of the present invention will be described in detail referring to the drawings. Throughout the drawings referred to in the present example embodiment, components identical to and steps operating similar to those of the first and second example embodiments are assigned same reference signs, and detailed descriptions thereof are omitted in the present example embodiment.

Figure 13:
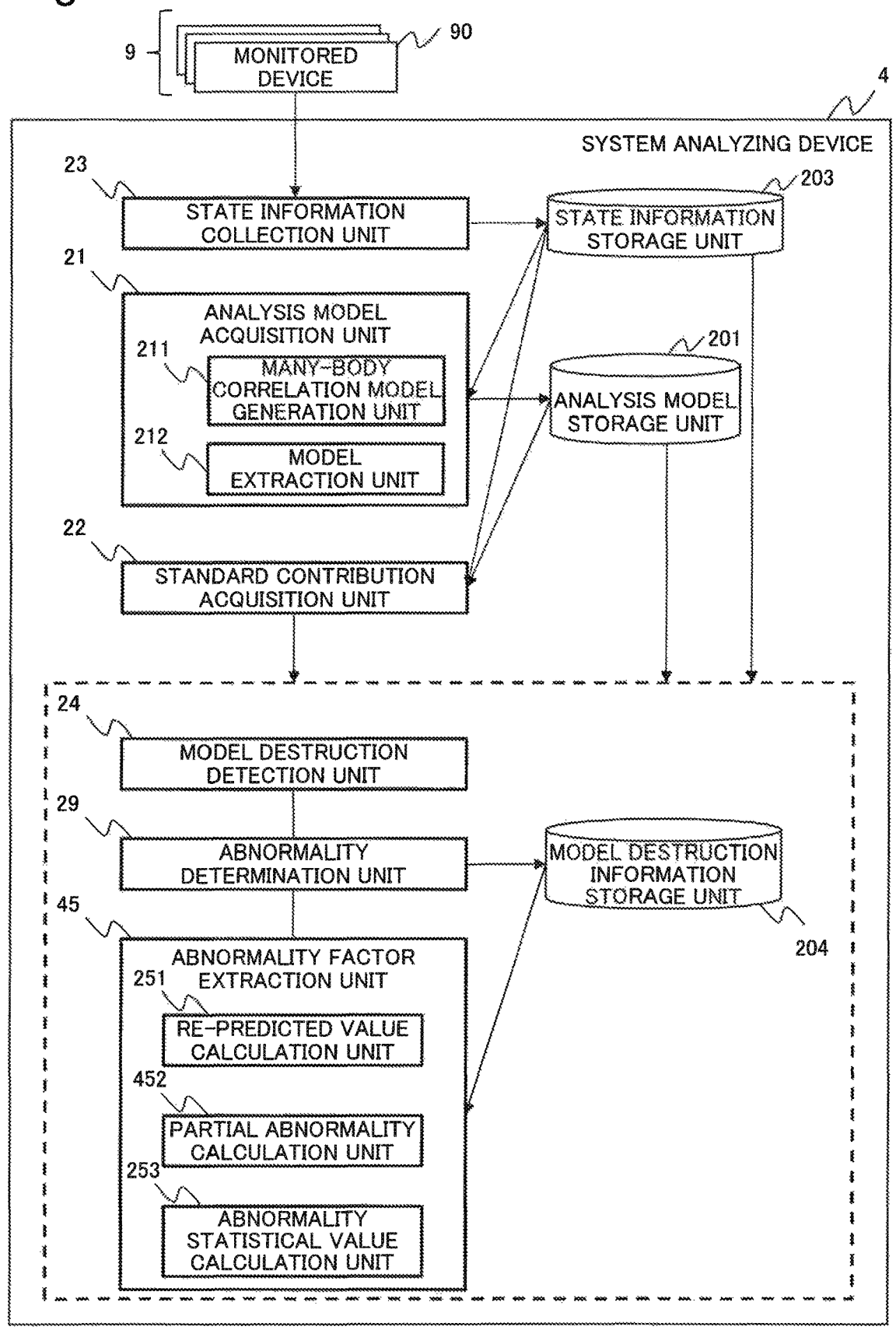
FIG. 13 is a functional block diagram of a system analyzing device according to a fourth example embodiment of the present invention.

A functional block configuration of a system analyzing device 4 according to the fourth example embodiment of the present invention is illustrated in FIG. 13. In FIG. 13, the system analyzing device 4 is different from the system analyzing device 2 according to the second example embodiment of the present invention in the point in which an anomaly factor extraction unit 45 instead of the anomaly factor extraction unit 25 is included. The anomaly factor extraction unit 45 is different from the anomaly factor extraction unit 25 in the point in which a partial anomaly calculation unit 452 instead of the partial anomaly calculation unit 252 is included. The system analyzing device 4 is connected to the monitored system 9. In the present example embodiment, details on the monitored system 9 are omitted as it is similar in configuration to the monitored system 9 according to the first example embodiment of the present invention. In FIG. 13, the direction of an arrow connecting rectangles indicating the functional blocks is an example, not limiting the direction of a signal between the functional blocks. The system analyzing device 4 and each functional block can include the same hardware components as those of first example embodiment of the present invention described above referring to FIG. 2. The hardware configurations of the analyzing device 4 and each functional block are not limited to the abovementioned configurations.

The partial anomaly calculation unit 452 adjusts the ratio of largest values of partial anomalies allocated between a many-body correlation model set in a first model breakdown occurrence status and a many-body correlation model set in a second model breakdown occurrence status. Specifically, the partial anomaly calculation unit 452 allocates partial anomalies so that the largest value of a partial anomaly in the many-body correlation model set in the first model breakdown occurrence status is larger than the largest value of a partial anomaly in the many-body correlation model set in the second model breakdown occurrence status. As described above, the first model breakdown occurrence status means a case where in the many-body correlation model, re-predicted values for explanatory variable data items all become model breakdown. The second model breakdown occurrence status means a case where in the many-body correlation model, at least one of the re-predicted values for the explanatory variable data items becomes model breakdown while at least one does not become model breakdown.

For example, the partial anomaly calculation unit 452 allocates partial anomalies in the many-body correlation model set in the first model breakdown occurrence status as follows. In this case, the partial anomaly calculation unit 452 allocates numerical values of partial anomalies so that a partial anomaly of an objective variable data item is higher than a partial anomaly of an explanatory variable data item.

The partial anomaly calculation unit 452 allocates partial anomalies in the many-body correlation model set in the second model breakdown occurrence status as follows. In this case, the partial anomaly calculation unit 452 makes a partial anomaly of an explanatory variable data item in which a re-predicted value becomes model breakdown be equal to or higher than partial anomalies of an objective variable data item and an explanatory variable data item in which a re-predicted value does not become model breakdown. Further, the partial anomaly calculation unit 452 allocates numerical values of partial anomalies in such a way that the partial anomaly of the explanatory variable data item in which the re-predicted value becomes model breakdown is lower than the partial anomaly allocated to the objective variable data item in the first model breakdown occurrence status.

As a specific example, in the many-body correlation model set in the first model breakdown occurrence status, the partial anomaly calculation unit 452 allocates a partial anomaly of 1 to the objective variable data item and a partial anomaly of 0 to the explanatory variable data item. Further, in the many-body correlation model set in the second model breakdown occurrence status, the partial anomaly calculation unit 452 allocates a partial anomaly of 0 to the explanatory variable data item in which the re-predicted value becomes model breakdown. Further, in the many-body correlation model set in the second model breakdown occurrence status, the partial anomaly calculation unit 452 allocates partial anomalies of 0 to the objective variable data item and the explanatory variable data item in which the re-predicted value does not become model breakdown. Hereby, the largest value of the partial anomaly in the first model breakdown occurrence status (partial anomaly 1 of an objective variable data item) is larger than the largest value of the partial anomaly in the second model breakdown occurrence status (partial anomaly 0 of explanatory variable data item in which re-predicted value becomes model breakdown).

As another specific example, in the many-body correlation model set in the first model breakdown occurrence status, the partial anomaly calculation unit 452 allocates a partial anomaly of 1 to the objective variable data item and a partial anomaly of 0 to the explanatory variable data item. Further, in the many-body correlation model set in the second model breakdown occurrence status, the partial anomaly calculation unit 452 allocates a partial anomaly of 0.5 to the explanatory variable data item in which the re-predicted value becomes model breakdown. Further, in the many-body correlation model set in the second model breakdown occurrence status, the partial anomaly calculation unit 452 allocates partial anomalies of 0 to the objective variable data item and the explanatory variable data item in which the re-predicted value does not become model breakdown. Hereby, the largest value of the partial anomaly in the first model breakdown occurrence status (partial anomaly 1 of an objective variable data item) is larger than the largest value of the partial anomaly in the second model breakdown occurrence status (partial anomaly 0.5 of explanatory variable data item in which re-predicted value becomes model breakdown).

Now, it is discussed that the standpoint of reducing a possibility of intrusion of normal data items into a result of narrowing-down anomaly factors. From this standpoint, a larger absolute value acquired by dividing the largest value of the partial anomaly in the first model breakdown occurrence status by the largest value of the partial anomaly in the second model breakdown occurrence status is preferred. For example, the largest value of the partial anomaly in the second model breakdown occurrence status is preferably set to 0.

Now, it is discussed that the standpoint of increasing a possibility of comprehension of all anomalous data items into the result of narrowing-down anomaly factors. From this standpoint, an absolute value closer to 1, which is acquired by dividing the largest value of the partial anomaly in the first model breakdown occurrence status by the largest value of the partial anomaly in the second model breakdown occurrence status, is preferred.

Values setting as partial anomalies can be arbitrarily defined by the operator or according to purposes. When a data in the anomalous state of the monitored system 9 has been accumulated, values to be allocated as partial anomalies may be determined based on a result of analyzing the data. For example, as in the abovementioned specific example, it is assumed that the partial anomaly calculation unit 452 allocates a partial anomaly of 1 to the objective variable data item and a partial anomaly of 0 to the explanatory variable data item in the first model breakdown occurrence status. It is also assumed that the partial anomaly calculation unit 452 allocates partial anomalies of 0 to the objective variable data item and the explanatory variable data item in which the re-predicted value does not become model breakdown in the second model breakdown occurrence status. Now, in the second model breakdown occurrence status, it is discussed that what value of partial anomaly is preferable to be allocated to the explanatory variable data item in which the re-predicted value becomes model breakdown is determined by analyzing the data when the monitored system 9 is anomalous. In this case, first, an upper limit value of a probability of intrusion of normal data items into the result of narrowing-down the anomaly factors and an upper limit value of a probability of non-inclusion of anomalous data items into the result of narrowing-down the anomaly factors are set. Then, in the second model breakdown occurrence status, the partial anomaly allocated to the explanatory variable data item in which the re-predicted value becomes model breakdown is changed from 0 to 1. Anomaly factors are extracted by using the changed partial anomalies, and a probability of intrusion of normal data items into the result of narrowing-down the anomaly factors and a probability of non-inclusion of anomalous data items into the result of narrowing-down the anomaly factors are calculated. It is assumed that, in changed partial anomalies, there is a partial anomaly whose probability of intrusion of normal data items into the result of narrowing-down the anomaly factors is lower than the set upper limit value, and whose probability of non-inclusion of anomalous data items into the result of narrowing-down the anomaly factors is lower than the set upper limit. In this case, a value allocated to a partial anomaly of the explanatory variable data item in which the re-predicted value becomes model breakdown in the second model breakdown occurrence status can be selected from these partial anomalies. When at least one of the abovementioned upper limits is not satisfied, the upper limit value is set again, or a data analysis condition is changed. Then, a partial anomaly to be allocated to the explanatory variable data item in which the re-predicted value becomes model breakdown in the second model breakdown occurrence status is searched for so as to satisfy both the set upper limits.

The partial anomaly calculation unit 452 may use a result of multiplying the abovementioned partial anomaly by weight as a partial anomaly. As the weight, for example, the deviation of the predicted value at the time of a model breakdown occurrence, the superiority of the regression equation, or the like may be applied. The deviation of the predicted value may be, for example, larger one of "prediction error/lower limit of permissible range of prediction error" and "prediction error/upper limit of permissible range of prediction error". For example, when the deviation of the predicted value at the time of the model breakdown occurrence is used as the weight for multiplication, a partial anomaly becomes 0 or the deviation. From the standpoint of accurately extracting information useful for identifying an anomaly factor in general, as definition of the partial anomaly, the definition of the binary values is preferred. On the other hand, from the standpoint of focusing on a specific system to extract more accurate information, multiplying the partial anomaly by the weight is preferred. For the weight by which the partial anomaly is multiplied, arbitrary definition can be set by the operator based on knowledge about the target system.

An operation of the system analyzing device 4 thus configured will be described. An outline of the operation of the system analyzing device 4 is similar to that of the operation of a system analyzing device 2 according to the second example embodiment of the present invention described above referring to FIG. 6. However, details on the anomaly factor extraction operation in step S109 are different.

Figure 14:
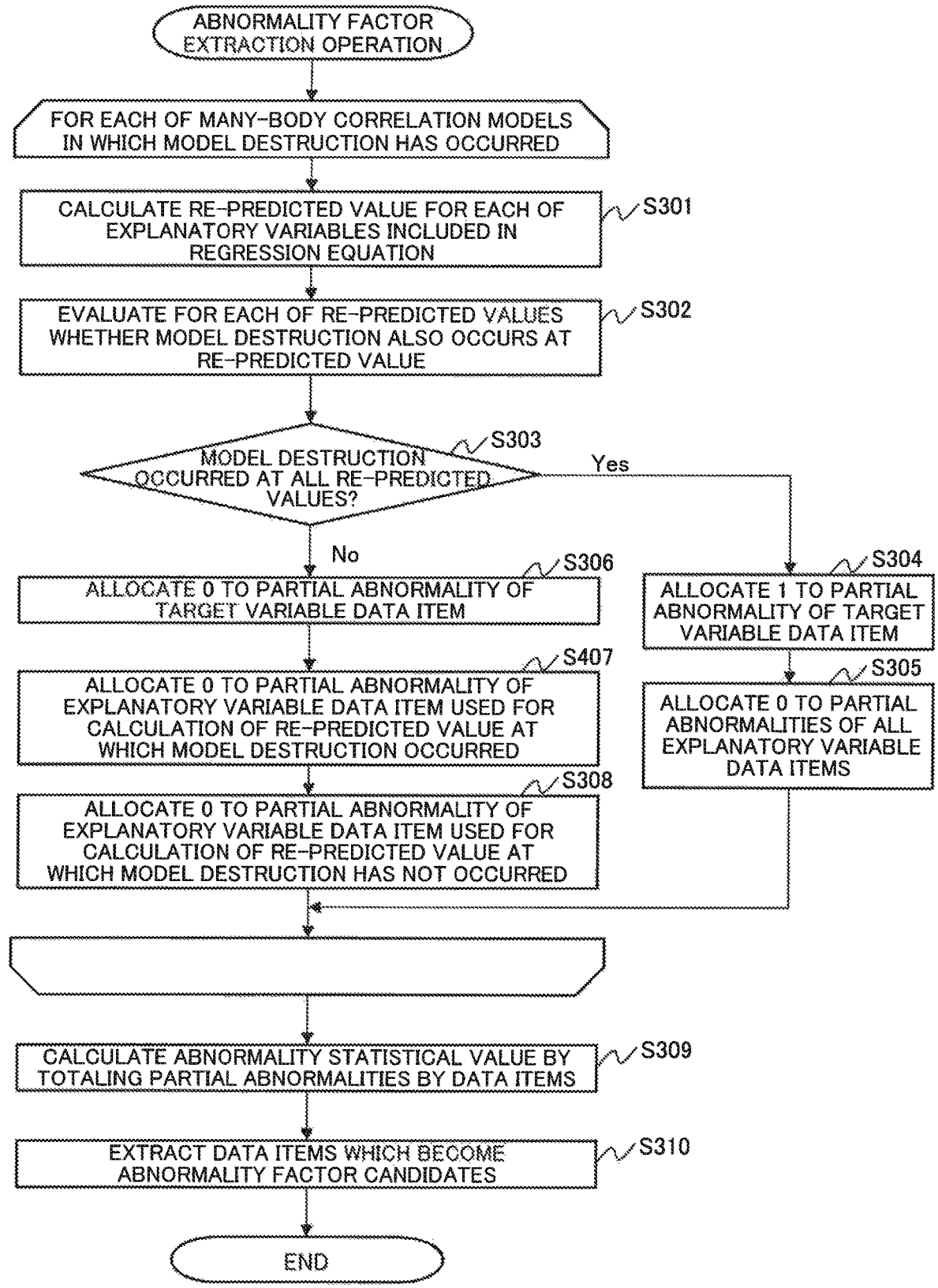
FIG. 14 is a flowchart illustrating an anomaly factor extraction operation of the system analyzing device according to the fourth example embodiment of the present invention in detail.

The details on the anomaly factor extraction operation according to the present example embodiment are illustrated in FIG. 14. Here, it is assumed that the partial anomaly calculation unit 452 allocates a partial anomaly of 1 to the objective variable data item and a partial anomaly of 0 to the explanatory variable data item in the first model breakdown occurrence status. It is assumed that the partial anomaly calculation unit 452 allocates a partial anomaly of 0 to the explanatory variable data item in which the re-predicted value becomes model breakdown in the second model breakdown occurrence status. It is assumed that the partial anomaly calculation unit 452 allocates partial anomalies of 0 to the objective variable data item and the explanatory variable data item in which the re-predicted value does not become model breakdown in the second model breakdown occurrence status.

In FIG. 14, the anomaly factor extraction operation of the system analyzing device 4 is different from the anomaly factor extraction operation according to the second example embodiment of the present invention described above referring to FIG. 8 in the point in which step S407 is executed instead of step S307.

In step S407, the partial anomaly calculation unit 452 allocates a partial anomaly of 0 to the explanatory variable data item used for calculating a re-predicted value in which model breakdown has occurred.

With the above, the system analyzing device 4 ends the anomaly factor extraction operation.

Next, the effect of the fourth example embodiment of the present invention will be described.

The system analyzing device according to the fourth example embodiment of the present invention can more accurately extract, according to operator's preference, information useful for identifying an anomaly factor even when a change in a sensor value caused by an anomaly is small, and the change appears in a plurality of sensors. In other words, according to the present example embodiment, information useful for identifying anomaly factors can be accurately extracted with adjusting the possibility of intrusion of normal data items and the possibility of comprehension of anomalous data items into the result of narrowing-down the anomaly factors according to the operator's preference.

The reason is described as follows. In the present example embodiment, in addition to a configuration roughly similar to that of the second example embodiment of the present invention, the partial anomaly calculation unit allocates partial anomalies so that the largest value of the partial anomaly in the second model breakdown occurrence status is smaller than the largest value of the partial anomaly in the first model breakdown occurrence status. Hereby, in the present example embodiment, a difference in largest value of the partial anomaly between the many-body correlation models different in model breakdown status by the re-prediction value is adjusted. As a result, the present example embodiment can adjust a degree with the possibility of intrusion of normal data items into the result of narrowing-down the anomaly factors and the possibility of comprehension of all anomalous data items into the result of narrowing-down the anomaly factors, thereby provides the abovementioned effect.

Fifth Example Embodiment

Next, a fifth example embodiment of the present invention will be described in detail referring to the drawings. Throughout the drawings referred to in the present example embodiment, components identical to and steps operating similar to those of the first and second example embodiments are assigned same reference signs, and detailed descriptions thereof are omitted in the present example embodiment.

Figure 15:
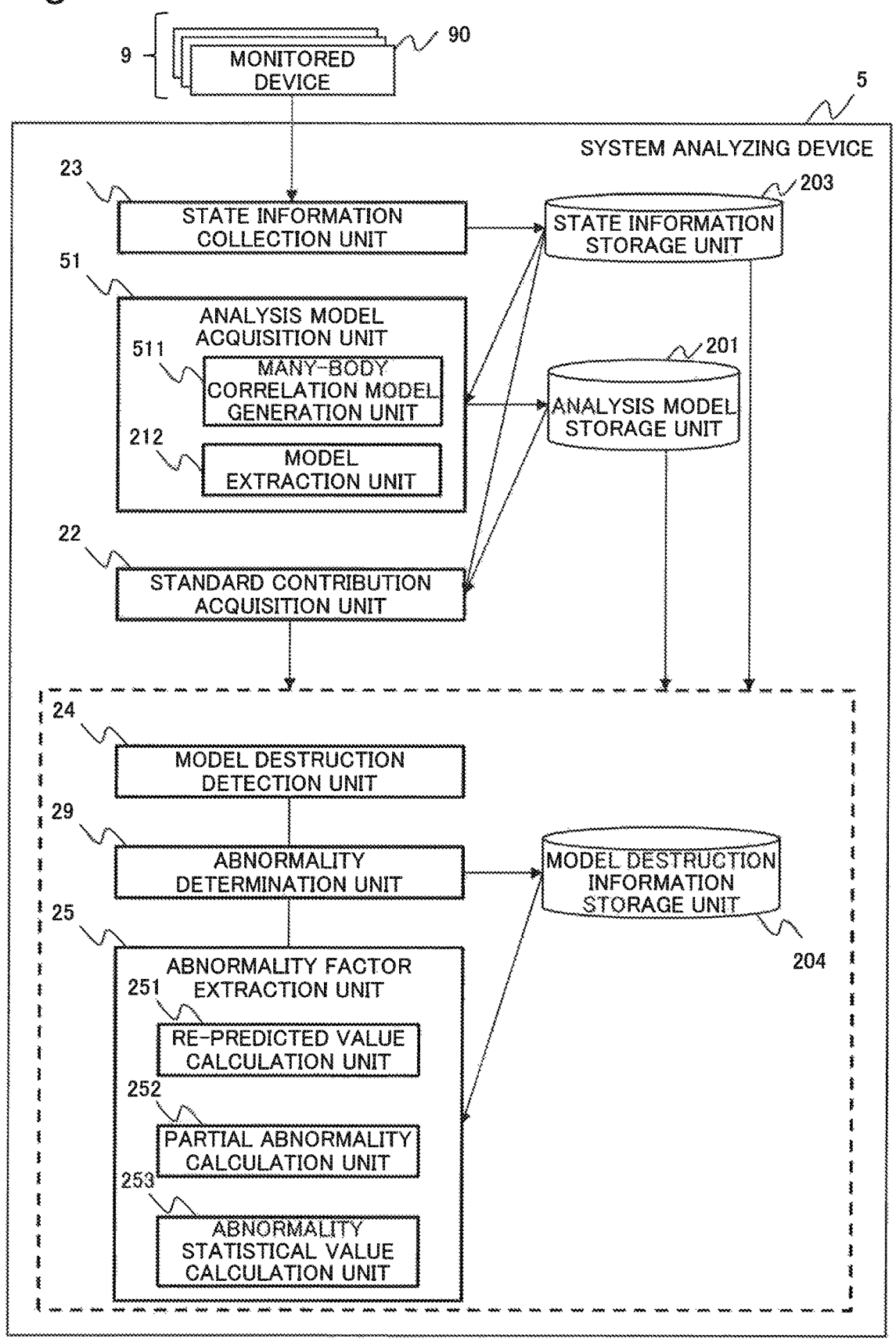
FIG. 15 is a functional block diagram of a system analyzing device according to a fifth example embodiment of the present invention.

A functional block configuration of a system analyzing device 5 according to the fifth example embodiment of the present invention is illustrated in FIG. 15. In FIG. 15, the system analyzing device 5 is different from a system analyzing device 2 according to the second example embodiment of the present invention in the point in which an analysis model acquisition unit 51 instead of the analysis model acquisition unit 21 is included. The analysis model acquisition unit 51 is different from the analysis model acquisition unit 21 in the point in which a many-body correlation model generation unit 511 instead of the many-body correlation model generation unit 211 is included. The system analyzing device 5 is connected to the monitored system 9. In the present example embodiment, details on the monitored system 9 are omitted as it is similar in configuration to the monitored system 9 according to the first example embodiment of the present invention. In FIG. 15, the direction of an arrow connecting rectangles indicating the functional blocks is an example, not limiting the direction of a signal between the functional blocks. The system analyzing device 5 and each functional block can include the same hardware components as those of first example embodiment of the present invention described above referring to FIG. 2. The hardware configurations of the analyzing device 5 and each functional block are not limited to the abovementioned configurations.

The many-body correlation model generation unit 511 is configured similarly to the many-body correlation model generation unit 211 except for configuration of a regression equation to include a representative data item described below.

The many-body correlation model generation unit 511 selects, from a data item group included in state information, the representative data item that becomes a representative in the data item group. The many-body correlation model generation unit 511 generates a many-body correlation model by using the representative data item and at least two arbitrary data items excluding the representative data item in the data item group included in the state information. The many-body correlation model generation unit 511 constructs a regression equation configured by using at least three data items for all combinations of the selected representative data item and at least the two data items excluding the representative data item. Here, the many-body correlation model generation unit 511 generates the many-body correlation model by switching data items so that all the data items become objective variables for the combination of the data items selected to configure each many-body correlation model.

The representative data item is preferably selected so that the inclusion thereof can increase overall prediction accuracy of all the many-body correlation models. For example, the many-body correlation model generation unit 511 may apply, as the representative data item selection method, a technique disclosed in Japanese Patent Application No. 2014-65120.

An operation of the system analyzing device 5 thus configured will be described. An outline of the operation of the system analyzing device 5 is similar to that of the operation of the system analyzing device 2 according to the second example embodiment of the present invention described above referring to FIG. 6. However, details on the analysis model generation operation in step S103 are different.

Figure 16:
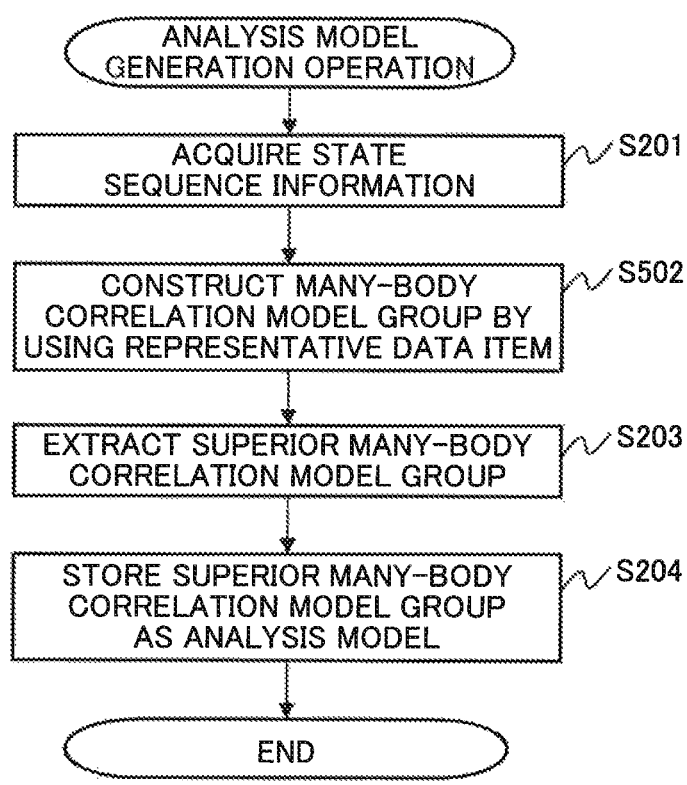
FIG. 16 is a flowchart illustrating an analysis model generation operation of the system analyzing device according to the fifth example embodiment of the present invention in detail.

The details on the analysis model generation operation according to the present example embodiment are illustrated in FIG. 16.

In FIG. 16, first, the many-body correlation model generation unit 511 acquires state sequence information of a predetermined period used for generating an analysis model from the state information storage unit 203 (step S201).

Then, the many-body correlation model generation unit 511 selects a representative data item by using the acquired state sequence information. The many-body correlation model generation unit 511 generates a group of many-body correlation models including a regression equation including the representative data item and at least two data items excluding the representative data item as analysis model candidates (step S502).

Then, the model extraction unit 212 extracts a superior many-body correlation model group from the generated many-body correlation model group based on the predetermined superior model condition (step S203).

Then, the model extraction unit 212 stores analysis model information indicating the acquired the superior many-body correlation model group in the analysis model storage unit 201 (step S204).

Then, the system analyzing device 5 ends the analysis model generation operation.

Next, the effect of the fifth example embodiment of the present invention will be described.

The system analyzing device according to the fifth example embodiment of the present invention can accurately extract, by smaller calculation resources, information useful for identifying an anomaly factor even when a change in a sensor value caused by an anomaly is small, and the change appears in a plurality of sensors.

The reason is described as follows. In the present example embodiment, in addition to a configuration roughly similar to that of the second example embodiment of the present invention, the many-body correlation model generation unit 511 generates the regression equation so as to include the representative data item. Hereby, according to the present example embodiment, the number of many-body correlation models which become analysis model candidates can be reduced by reducing the number of combinations of data items. As a result, the present example embodiment provides the abovementioned effect by enabling generation and analysis of the analysis model by smaller calculation resources.

Sixth Example Embodiment

Next, a sixth example embodiment of the present invention will be described in detail referring to the drawings. Throughout the drawings referred to in the present example embodiment, components identical to and steps operating similar to those of the first and second example embodiments are assigned same reference signs, and detailed descriptions thereof are omitted in the present example embodiment.

Figure 17:
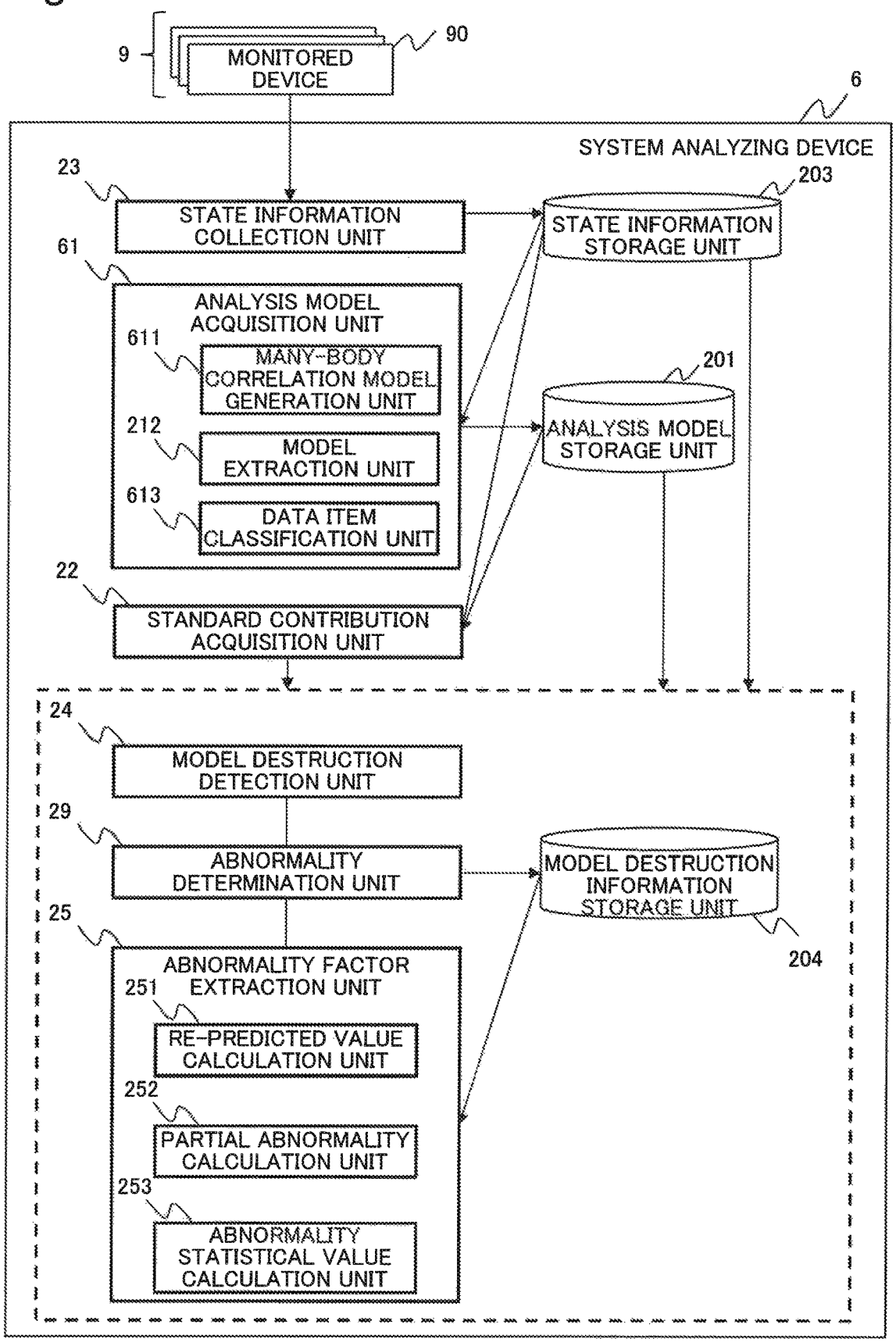
FIG. 17 is a functional block diagram of a system analyzing device according to a sixth example embodiment of the present invention.

A functional block configuration of a system analyzing device 6 according to the sixth example embodiment of the present invention is illustrated in FIG. 17. In FIG. 17, the system analyzing device 6 is different from the system analyzing device 2 according to the second example embodiment of the present invention in the point in which an analysis model acquisition unit 61 instead of the analysis model acquisition unit 21 is included. The analysis model acquisition unit 61 is different from the analysis model acquisition unit 21 in the point in which a many-body correlation model generation unit 611 instead of the many-body correlation model generation unit 211 is included. Further, the analysis model acquisition unit 61 includes a data item classification unit 613. The system analyzing device 6 is connected to the monitored system 9. In the present example embodiment, details on the monitored system 9 are omitted as it is similar in configuration to the monitored system 9 according to the first example embodiment of the present invention. In FIG. 17, the direction of an arrow connecting rectangles indicating the functional blocks is an example, not limiting the direction of a signal between the functional blocks. The system analyzing device 6 and each functional block can include the same hardware components as those of first example embodiment of the present invention described above referring to FIG. 2. The hardware configurations of the analyzing device 6 and each functional block are not limited to the abovementioned configurations.

The data item classification unit 613 classifies data item groups included in state information. The classification is carried out according to similarity of the data items. Hereinafter, a group of data items classified identical will also be referred to the as a data item group. Further, the data item classification unit 613 selects one representative data item which is a data item which becomes a representative in each of the data item group for each data item group. The representative data item is preferably selected so that the inclusion thereof can increase overall prediction accuracy of all the many-body correlation models in the representative data item and the same data item group.

The data item classification unit 613 stores information on the data item groups in the analysis model storage unit 201 in addition to analysis model information. In the information on the data item groups, identifiers of the data item groups, identifiers of data items and a representative data item are included.

The data item classification unit 613 can employ, as a classification method of the data items, a method for classifying the data items based on data features, such as k-nearest-neighbor method, spectral clustering, or the technique disclosed in Japanese Patent Application No. 2014-65120. The data item classification unit 613 can employ, as a classification method of the data items, a method for classifying the data items based on expertise at the monitored system 9, such as classifying of the data items for each of sub-systems of the monitored system 9. The data item classification unit 613 may employ a method combining those classification methods.

The data item classification unit 613 can employ, as a selection method of the representative data item in each data item group, a method for selecting the representative data item based on data features, for example, such as the technique disclosed in Japanese Patent Application No.

2014-65120. The data item classification unit 613 can employ, as a selection method of the representative data item in each data item group, a method for selecting the representative data item based on expertise at the monitored system 9. The data item classification unit 613 may employ a method combining those selection methods.

The many-body correlation model generation unit 611 is configured similarly to the many-body correlation model generation unit 211 except for configuration of a regression equation to include a representative data item in each data item group.

Specifically, the many-body correlation model generation unit 611 acquires data item groups and a representative data item in each data item group from the data item classification unit 613. The many-body correlation model generation unit 611 generates a many-body correlation model for each data item group as follows. Specifically, the many-body correlation model generation unit 611 constructs, targeting the data items included in the data item group, a regression equation configured by using at least three data items for all combinations of the representative data item and at least the two data items excluding the representative data item. Here, the many-body correlation model generation unit 611 generates the many-body correlation model by switching data items so that all the data items can become objective variables for the data items selected to configure each many-body correlation model.

An operation of the system analyzing device 6 thus configured will be described. An outline of the operation of the system analyzing device 6 is similar to that of the operation of the system analyzing device 2 according to the second example embodiment of the present invention described above referring to FIG. 6. However, details on the analysis model generation operation in step S103 are different.

Figure 18:
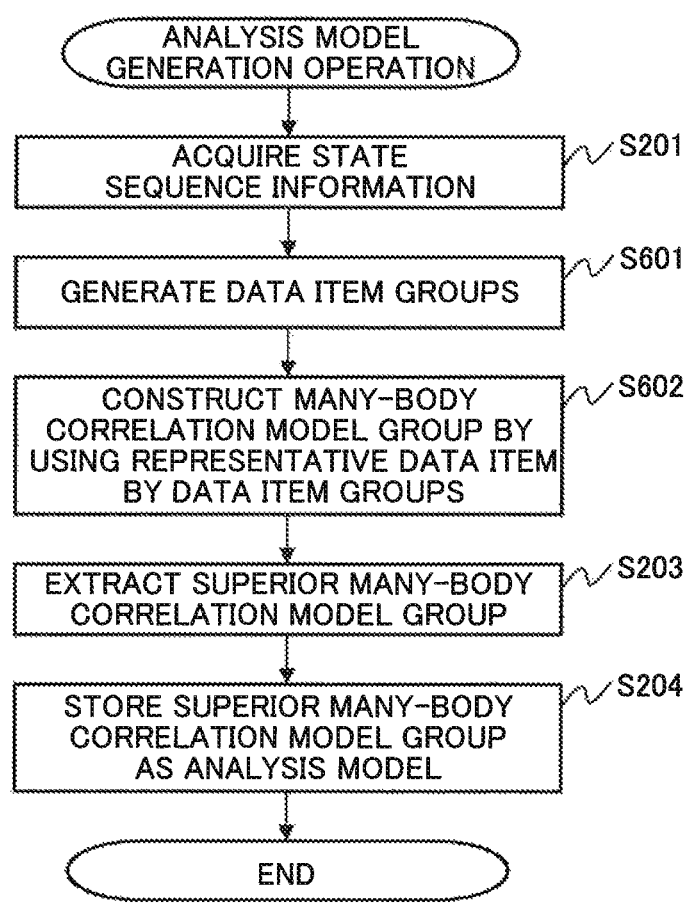
FIG. 18 is a flowchart illustrating an analysis model generation operation of the system analyzing device according to the sixth example embodiment of the present invention in detail.

The details on the analysis model generation operation according to the present example embodiment are illustrated in FIG. 18.

In FIG. 18, first, the analysis model acquisition unit 61 acquires state sequence information of a predetermined period used for generating an analysis model from the state information storage unit 203 (step S201).

Then, the data item classification unit 613 classifies, by using the acquired state sequence information, the data items by data item groups, and selects a representative data item in each data item group. Further, the data item classification unit 613 stores information on the data item group in the analysis model storage unit 201 in addition to analysis model information (step S601).

Then, the many-body correlation model generation unit 611 acquires the information on the data item groups from the data item classification unit 613. The information on the data item groups includes information indicating the data item groups, and information indicating the representative data item in each data item group. Then, the many-body correlation model generation unit 611 generates a group of many-body correlation models which become analysis model candidates for each data item group by using the acquired data item group information and the state sequence information. Specifically, the many-body correlation model generation unit 611 generates, for each data item group, a group of many-body correlation models including the representative data item and at least two data items excluding the representative data item as analysis model candidates (step S602).

Then, the model extraction unit 212 extracts a superior many-body correlation model group from a generated many-body correlation model group based on a predetermined superior model condition (step S203).

Then, the model extraction unit 212 stores analysis model information indicating the acquired superior many-body correlation model group in the analysis model storage unit 201 (step S204).

With the above, the system analyzing device 6 ends the analysis model generation operation.

Next, the effect of the sixth example embodiment of the present invention will be described.

The system analyzing device according to the sixth example embodiment of the present invention can accurately extract, by smaller calculation resources, information useful for identifying an anomaly factor even when a change in a sensor value caused by an anomaly is small, and the change appears in a plurality of sensors.

The reason is described as follows. In the present example embodiment, in addition to a configuration roughly similar to that of the second example embodiment of the present invention, the data item classification unit classifies the data items, and selects the representative data item in each data item group. Further, the many-body correlation model generation unit generates the many-body correlation model so as to include the representative data item in each data item group. In this configuration, in the present example embodiment, many-body correlation models are generated for neither of a combination of data items over the data item groups and a combination of data items including no representative data item. As a result, many-body correlation models for such combinations are not included in the analysis model. Further, in anomaly detection and anomaly factor identification calculation processes, the number of used many-body correlation models is reduced. As a result, a possibility of executing the process by smaller calculation resources can be increased. Thus, the present example embodiment provides the effect of the second example embodiment, namely, accurate detection of information useful for identifying anomaly factors even when a change in the sensor value caused by an anomaly is small, and the change appears in a plurality of sensors, by smaller calculation resources.

Seventh Example Embodiment

Next, a seventh example embodiment of the present invention will be described in detail referring to the drawings. Throughout the drawings referred to in the present example embodiment, components identical to and steps operating similar to those of the first to fifth example embodiments are assigned same reference signs, and detailed descriptions thereof are omitted in the present example embodiment.

Figure 19:
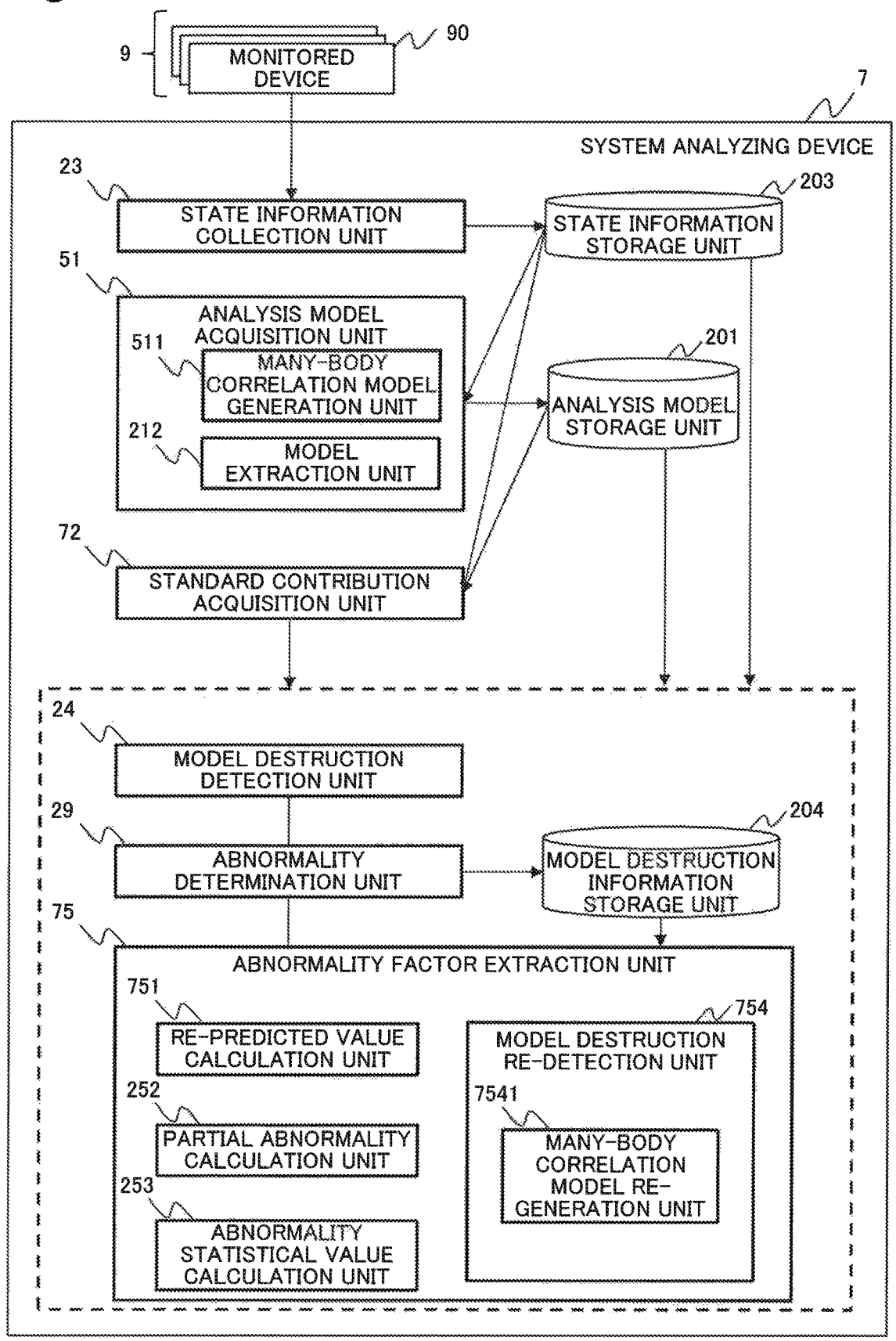
FIG. 19 is a functional block diagram of a system analyzing device according to a seventh example embodiment of the present invention.

A functional block configuration of a system analyzing device 7 according to the seventh example embodiment of the present invention is illustrated in FIG. 19. In FIG. 19, the system analyzing device 7 is different from the system analyzing device 5 according to the fifth example embodiment of the present invention in the point in which a standard contribution acquisition unit 72 instead of the standard contribution acquisition unit 22, and an anomaly factor extraction unit 75 instead of the anomaly factor extraction unit 25 are included. The anomaly factor extraction unit 75 is different from the anomaly factor extraction unit 25 in the point in which a re-predicted value calculation unit 751 instead of the re-predicted value calculation unit 251. Further, the anomaly factor extraction unit 75 includes a model breakdown re-detection unit 754. The system analyzing device 7 is connected to the monitored system 9. In the present example embodiment, details on the monitored system 9 are omitted as it is similar in configuration to the monitored system 9 according to the first example embodiment of the present invention. In FIG. 19, the direction of an arrow connecting rectangles indicating the functional blocks is an example, not limiting the direction of a signal between the functional blocks. The system analyzing device 7 and each functional block can include the same hardware components as those of first example embodiment of the present invention described above referring to FIG. 2. The hardware configurations of the analyzing device 7 and each functional block are not limited to the abovementioned configurations.

The standard contribution acquisition unit 72 acquires standard contribution of each explanatory variable data item in each many-body correlation model included in a re-generation model described below in addition to each many-body correlation model included in an analysis model.

The anomaly factor extraction unit 75 is configured to operate as follows when the anomaly determination unit 29 determines that a state of the monitored system 9 is anomalous. As described above, when the anomaly determination unit 29 registers model breakdown information in the model breakdown information storage unit 204, the anomaly factor extraction unit 75 is configured to operate when new model breakdown information is added to the model breakdown information storage unit 204. Specifically, the anomaly factor extraction unit 75 calculates anomaly statistical values for respective data items by using the model breakdown re-detection unit 754 described below, the re-predicted value calculation unit 751 described below, the partial anomaly calculation unit 252, and the anomaly statistical value calculation unit 253. Details on each functional block included in the anomaly factor extraction unit 75 will be described below. The anomaly factor extraction unit 75 extracts data items which become anomaly factor candidates of the monitored system 9 in descending order of the anomaly statistical values for respective data items. For example, the anomaly factor extraction unit 75 may extract data items having anomaly statistical values equal to or higher than a threshold as data items which become anomaly factor candidates. In addition, for example, the anomaly factor extraction unit 75 may extract a predetermined number of data items in descending order of the anomaly statistical values as anomaly factor candidates.

Next, configurations of the model breakdown re-detection unit 754 and the re-predicted value calculation unit 751 included in the anomaly factor extraction unit 75 will be described in detail.

The model breakdown re-detection unit 754 is configured by including a many-body correlation model re-generation unit 7541. The many-body correlation model re-generation unit 7541 generates a re-generation model based on the model breakdown information of the analysis model newly added to the model breakdown information storage unit 204.

The model breakdown re-detection unit 754 generates model breakdown information of the re-generation model at the detection time of the model breakdown of the analysis model. The model breakdown information generated for the re-generation model includes information similar in type to the model breakdown information stored in the model breakdown information storage unit 204.

The many-body correlation model re-generation unit 7541 selects a secondary representative data item suitable as a representative data item next to the representative data item based on the acquired analysis model information and the acquired model breakdown information of the analysis model. Then, the many-body correlation model re-generation unit 7541 generates a group of re-generation many-body correlation models including the secondary representative data item in a regression equation. Then, the many-body correlation model re-generation unit 7541 generates a group of re-generation superior many-body correlation models satisfying a predetermined superiority condition in the group of re-generation many-body correlation models as a re-regeneration model. Details on the generation process of the re-generation model are similarity described by replacing the representative data item with the secondary representative data item in the description of the analysis model generation process using the representative data item referring to FIG. 16 according to the fifth example embodiment of the present invention. The secondary representative data item is preferably a data item that enables overall prediction accuracy of the re-generation model to be increased by including a regression equation and is normal at the time of detecting the model breakdown.

The many-body correlation model re-generation unit 7541 may calculate, for example, a representative score and a breakdown score for each data item as an index for selecting a data item satisfying the abovementioned condition as a secondary representative data item.

First, the representative score will be described. The many-body correlation model re-generation unit 7541 calculates a representative score for each data item excluding the representative data item based on the analysis model information. The representative score is acquired by quantifying the degree of increasing overall prediction accuracy of the re-generation model by generating the re-generation model to include the data item. For example, as the representative score, the index for selecting the representative data item in the technique disclosed in Japanese Patent Application No. 2014-65120 may be used.

Further, for example, the many-body correlation model re-generation unit 7541 may calculate a representative score for each data item by using superiority F of a regression equation of a superior mutual correlation model. Specifically, the many-body correlation model re-generation unit 7541 acquires state sequence information of the same period as a learning period of the analysis model from the state information storage unit 203 based on information on the learning period of the analysis model included in the analysis model information. Then, the many-body correlation model re-generation unit 7541 configures a regression equation (mutual correlation model) including two data items by using the state sequence information. The generation process of the mutual correlation model is carried out using similar procedure as that of a mutual correlation model group generation process described above in the second example embodiment of the present invention for all combination of data items. Then, the many-body correlation model re-generation unit 7541 calculates superiority of the regression equation for the regression equation of the mutual correlation model. Then, the many-body correlation model re-generation unit 7541 extracts a group of superior mutual correlation models which is a group of mutual correlation models that satisfy a predetermined superior model condition. For example, the many-body correlation model re-generation unit 7541 may use the abovementioned superiority F of the regression equation as the superiority of the regression equation for extracting the superior mutual correlation model group, and the equation (8) as the superior model condition. Then, the many-body correlation model re-generation unit 7541 may calculate statistical values for respective data items based on the superiority F of the regression equation of the superior mutual correlation model, and use the statistical value as a representative score. In detail, the many-body correlation model re-generation unit 7541 accumulates the superiorities F of the regression equations of the mutual correlation models included in a superior mutual correlation model group for each data item. In other words, the many-body correlation model re-generation unit 7541 associates the superiority of the regression equation of each mutual correlation model included in the superior mutual correlation model group with a data item used for an objective variable and a data item used for an explanatory variable. Then, the many-body correlation model re-generation unit 7541 may add and accumulates the superiority F of the regression equation associated with each data item. Then, in this way, the many-body correlation model re-generation unit 7541 may set a cumulative value (statistical value) of the superiority F of the regression equation as a representative score for each data item.

Next, the breakdown score will be described. The many-body correlation model re-generation unit 7541 calculates a breakdown score for each data item excluding the representative data item based on the acquired model breakdown information of the analysis model. The breakdown score is acquired by quantifying certainty that the data item is considered to be affected by an anomaly. For example, the anomaly statistical value according to the fourth example embodiment may be used for the breakdown score. Specifically, the many-body correlation model re-generation unit 7541 executes the process of calculating the anomaly statistical value according to the fourth example embodiment, and sets the anomaly statistical value for each data item as a breakdown score. In this case, as the anomaly statistical value, for example, the anomaly statistical value according to the second example embodiment may be used.

The many-body correlation model re-generation unit 7541 selects a secondary representative data item by using the representative score and the breakdown score thus acquired. Specifically, the many-body correlation model re-generation unit 7541 selects a data item having a smallest breakdown score and a largest representative score of the data item as a secondary representative data item. When there is a plurality of such data items, for example, the many-body correlation model re-generation unit 7541 may randomly select a secondary representative data item among the data items.

The re-predicted value calculation unit 751 is configured similarly to the re-predicted value calculation unit 251 except for differences in standard contribution, model information, and model breakdown information used for calculating a re-predicted value.

Specifically, the re-predicted value calculation unit 751 acquires standard contribution of the re-generation model generated by the many-body correlation model re-generation unit 7541 from the standard contribution acquisition unit 72.

The re-predicted value calculation unit 751 acquires model information of the re-generation model generated by the many-body correlation model re-generation unit 7541 from the model breakdown re-detection unit 754.

The re-predicted value calculation unit 751 generates a calculation equation of re-predicted values based on the acquired standard contribution and model information of the re-generation model. Specifically, the re-predicted value calculation unit 751 generates, for each regression equation of the re-generation many-body correlation model included in the re-generation model, a threshold of re-predicted values and a calculation equation of re-predicted values for each data item included in the regression equation. The re-predicted value calculation unit 751 acquires the model breakdown information of the re-generation model from the model breakdown re-detection unit 754. Then, the re-predicted value calculation unit 751 executes process similar to that of the re-predicted value calculation unit 251 for each re-generation many-body correlation model in which model breakdown has occurred among the re-generation models. In other words, the re-predicted value calculation unit 751 calculates, regarding the regression equation of each re-generation many-body correlation model in which model breakdown has occurred, a predicted value of an objective variable of the regression equation, as a re-predicted value, for each explanatory variable data item based on state information and standard contribution of the data item.

An operation of the system analyzing device 7 thus configured will be described referring to FIG. 20.

Figure 20:
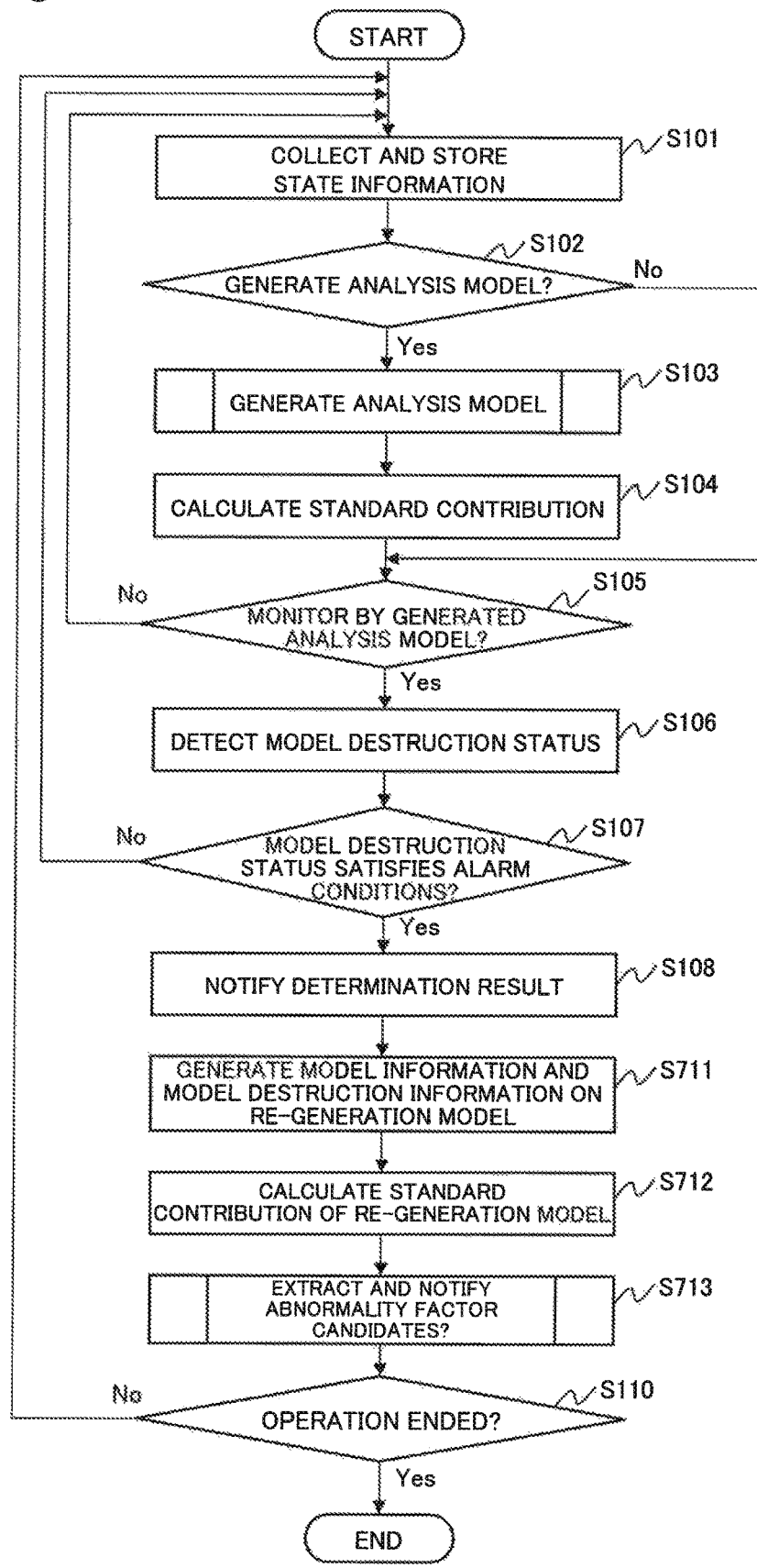
FIG. 20 is a flowchart schematically illustrating an operation of the system analyzing device according to the seventh example embodiment of the present invention.

In FIG. 20, first, the system analyzing device 7 operates similarly to that according to the fifth example embodiment of the present invention in steps S101 to S108. As described above in the fifth example embodiment of the present invention, details on the analysis model generation operation in step S103 is different from that in step S103 in the second example embodiment of the present invention, and as illustrated in FIG. 16.

Then, the many-body correlation model re-generation unit 754 generates model information of the re-generation model based on the model breakdown information of the analysis model newly stored in the model breakdown information storage unit 204. Then, the many-body correlation model re-generation unit 7541 generates model breakdown information of the re-generation model at the occurrence time of the model breakdown information of the analysis model newly stored in the model breakdown information storage unit 204 (step S711). This step will be described below in detail.

Then, the standard contribution acquisition unit 72 calculates standard contribution of each explanatory variable data item for each re-generation many-body correlation model included in the re-generation model (step S712).

Then, the anomaly factor extraction unit 75 extracts at least one anomaly factor candidate data item (step S713). The operation of this step is different from the anomaly factor candidate data item extraction operation in step S109 according to the fifth (second) example embodiment of the present invention in standard contribution, model information, and model breakdown information which are used at the time of extraction operation of anomaly factor. Specifically, in the fifth (second) example embodiment of the present invention, the anomaly factor extraction unit 25 executes step S109 by using the standard contribution of the analysis model, the model information of the analysis model, and the model breakdown information of the analysis model. On the other hand, in the present example embodiment, the anomaly factor extraction unit 75 executes this step by using the standard contribution of the re-generation model, the model information of the re-generation model, and the model breakdown information of the re-generation model. Except for this point, the operation of step S713 in the present example embodiment is similar in processing content to step S109 in the fifth example embodiment of the present invention. Thus, details on step S713 are omitted in the present example embodiment.

Then, the system analyzing device 7 repeats the above-mentioned operation until determination to end the operation (Yes in step S110) is received.

Figure 21:
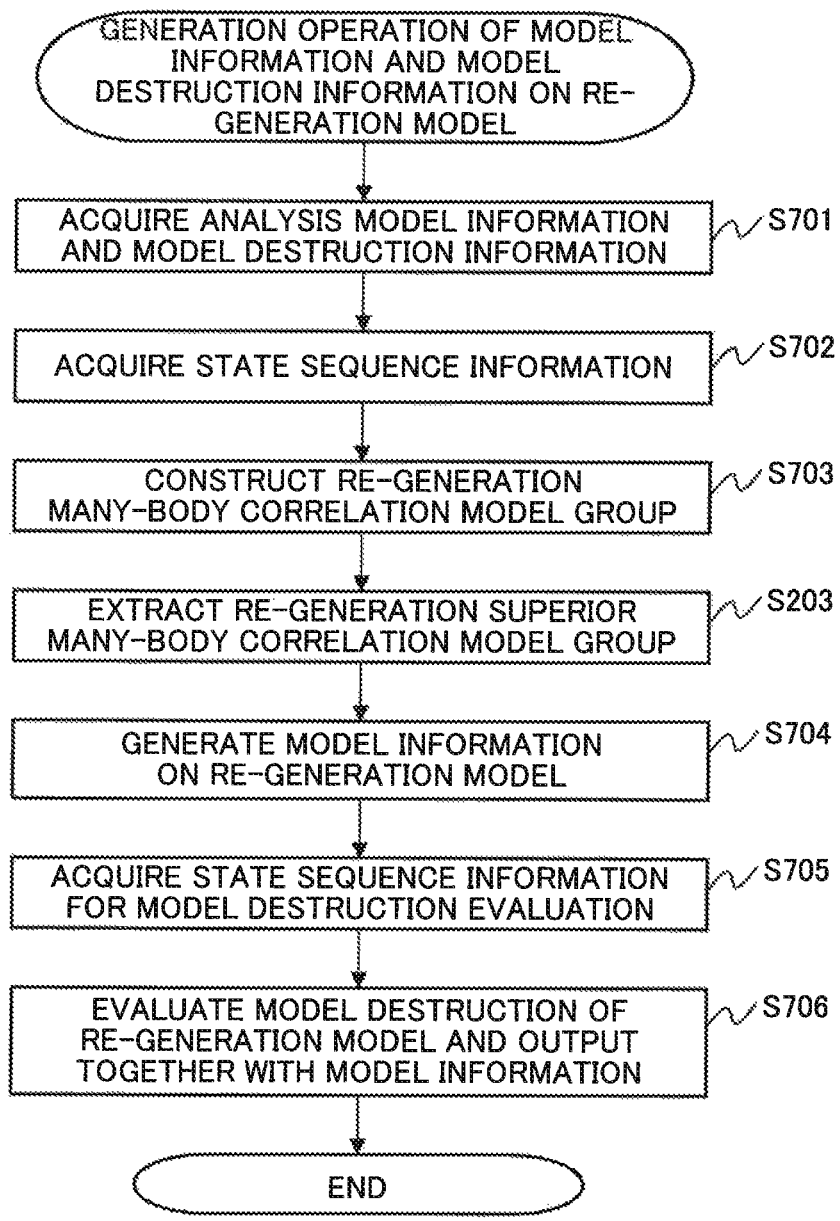
FIG. 21 is a flowchart illustrating a generation operation of model information and model breakdown information of a good-reproductivity many-body correlation model group of the system analyzing device according to the seventh example embodiment of the present invention in detail.

Details on the generation operation of the model breakdown information in the re-generation model in step S711 are illustrated in FIG. 21.

In FIG. 21, first, the model breakdown re-detection unit 754 acquires the analysis model information from the analysis model storage unit 201, and acquires the model breakdown information from the model breakdown information storage unit 204 (step S701). The model breakdown information acquired in this step is model breakdown information detected about the analysis model.

Then, the model breakdown re-detection unit 754 acquires a learning period used for generating the analysis model from the acquired analysis model information. Then, the model breakdown re-detection unit 754 acquires state sequence information relating to the learning period from the state information storage unit 203 (step S702).

Then, the many-body correlation model re-generation unit 7541 selects a secondary representative data item by using the state sequence information acquired by the model breakdown re-detection unit 754. Then, the many-body correlation model re-generation unit 7541 generates re-generation many-body correlation model groups including a regression equation including the selected secondary representative data item (step S703).

Then, the many-body correlation model re-generation unit 7541 executes step S203 similarly to that in the second example embodiment of the present invention for the re-generation many-body correlation model groups. Accordingly, the many-body correlation model re-generation unit 7541 extracts, from the re-generation many-body correlation model groups, a re-generation superior many-body correlation model group based on a predetermined superior model condition to set the group as a re-generation model (step S203).

Then, the many-body correlation model re-generation unit 7541 generates model information of the re-generation model (step S704).

Then, the model breakdown re-detection unit 754 acquires the model information of the re-generation model from the many-body correlation model re-generation unit 7541. In addition, the model breakdown re-detection unit 754 acquires the model breakdown occurrence time from the model breakdown information of the analysis model acquired in step S701. Then, the model breakdown re-detection unit 754 acquires state sequence information necessary for evaluating presence or absence of model breakdown of the re-generation model at model breakdown occurrence time of the analysis model as state sequence information for model breakdown evaluation from the state information storage unit 203 (step S705).

Then, the model breakdown re-detection unit 754 evaluates model breakdown at the same time as the model breakdown occurrence time of the analysis model by using the model information of the re-generation model and the state sequence information for model breakdown evaluation. Then, the model breakdown re-detection unit 754 generates, based on an evaluation result, model breakdown information of the re-generation model, and outputs the model breakdown information together with the model information of the re-generation model to the re-predicted value calculation unit 751 (step S706).

With the above, the system analyzing device 7 ends the operation of generating the model breakdown information for the re-generation model.

Next, the effect of the seventh example embodiment of the present invention will be described.

The system analyzing device according to the seventh example embodiment of the present invention can more accurately extract, by smaller calculation resources, information useful for identifying an anomaly factor even when a change in a sensor value caused by an anomaly is small, and the change appears in a plurality of sensors.

The reason is described as follows. The present example embodiment is configured as follows, in addition to a configuration roughly similar to that of the fifth example embodiment of the present invention. In other words, the anomaly factor extraction unit 75 selects the secondary representative data item. The secondary representative data item is a data item increased in overall prediction accuracy of the re-generation model by being included in the regression equation and simultaneously considered normal at the detection time of the model breakdown. Then, the anomaly factor extraction unit 75 generates the re-generation model so as to commonly include the secondary representative data item in the regression equation of the many-body correlation model. Then, the anomaly factor extraction unit 75 extracts data item concerning an anomaly factor by using the re-generation model. According to the present example embodiment, this configuration can increase a possibility that at least one of the data items included in each regression equation is a normal data item. As a result, in the present example embodiment, a possibility that a partial anomaly can be calculated more accurately is increased. The calculation of more accurate partial anomaly leads to calculation of more accurate anomaly statistical value. Thus, the present example embodiment provides the abovementioned effect.

The present example embodiment has been described by way of example where, when the model breakdown information on the analysis model is newly added to the model breakdown information storage unit, the anomaly factor extraction unit generates the re-generation model based on the state sequence information. However, the present example embodiment is not limited thereto, and the anomaly factor extraction unit may generate re-generation model candidates based on predetermined state sequence information in advance. In this case, the many-body correlation model re-generation unit may execute an operation of extracting, as a re-generation model, a candidate including the selected secondary representative data item from the re-generation model candidates instead of steps S703 and S203 in the operation illustrated in FIG. 21. In this manner, when the re-generation model candidates are generated based on the predetermined state sequence information in advance, standard contribution can be similarly calculated for each candidate in advance. In this case, the standard contribution acquisition unit should execute an operation of acquiring the calculated standard contribution for the re-generation model extracted from the candidates in step S711 instead of step S712 in the operation illustrated in FIG. 20.

The present example embodiment has been described by way of example where the anomaly factor candidates are extracted by using the re-generation model. When no anomaly factor candidate is extracted by using the re-generation model, in the present example embodiment, the anomaly factor candidates may be extracted by using the analysis model.

In addition, when no anomaly factor candidate is extracted by using the re-generation model, in the present example embodiment, the following information may be notified to the operator or the like. The information to be notified may be, for example, a data item included in the superior many-body correlation model in which model breakdown has occurred among the analysis models. The information to be notified may be data item included in the re-generation superior many-body correlation model in which model breakdown has occurred among the re-generation models. The information to be notified may be both of these data items. In this time, in the present example embodiment, a message that anomaly factors have not been suitably narrowed down is preferably notified together.

When no anomaly factor candidate is extracted by using the re-generation model, in the present example embodiment, for example, a message that there is no anomaly factor candidate may be notified to the operator or the like.

When no anomaly factor candidate is extracted by using the re-generation model, in the present example embodiment, a new secondary representative data item may be selected. For example, in this case, in the present example embodiment, a data item more suitable as a secondary representative data item may be selected among data items not commonly included in the regression equations included in many-body correlation model group of an analysis model. Then, the present example embodiment generates a new re-generation model including a new secondary representative data item may be generated, and calculates an anomaly statistical value. Further, in the present example embodiment, such process may be repeated until anomaly factor candidates appear, and the anomaly factor candidates acquired as a result may be notified to the operator or the like.

The present example embodiment has been described by way of example where the abovementioned breakdown score is calculated as the certainty that the data item is considered to be affected by an anomaly. In addition, in the present example embodiment, an index based on another definition may be calculated as the certainty that the data item is considered to be affected by an anomaly. For example, such certainty can be calculated based on the model breakdown information of the analysis model including a model including one or two data items.

In abovementioned each of the example embodiments of the present invention, the method for notifying the operator or the like of only the anomaly factor candidates or the anomaly factor candidates together with the scores has been described. Further, in the present example embodiment, in addition to such information, a breakdown score of the secondary representative data item may be notified to the operator or the like so as to be clearly understood as the breakdown score of the secondary representative data item. By checking the breakdown score, the operator can check whether a condition preferred for the secondary representative data item is satisfied.

The present example embodiment has been described by way of example where the configuration of extracting the anomaly factor candidates based on the re-generation model is applied to the fifth example embodiment of the present invention. In addition, the configuration of extracting the anomaly factor candidates based on the re-generation model in the present example embodiment can be applied to the sixth example embodiment of the present invention. In this case, the many-body correlation model re-generation unit should select a secondary representative data item in each data item group, and combines a re-generation superior many-body correlation model group for each data item group to make it a re-generation model.

Eighth Example Embodiment

Next, an eighth example embodiment of the present invention will be described in detail referring to the drawings. Throughout the drawings referred to in the present example embodiment, components identical to and steps operating similar to those of the first to seventh example embodiments are assigned same reference signs, and detailed descriptions thereof are omitted in the present example embodiment.

Figure 22:
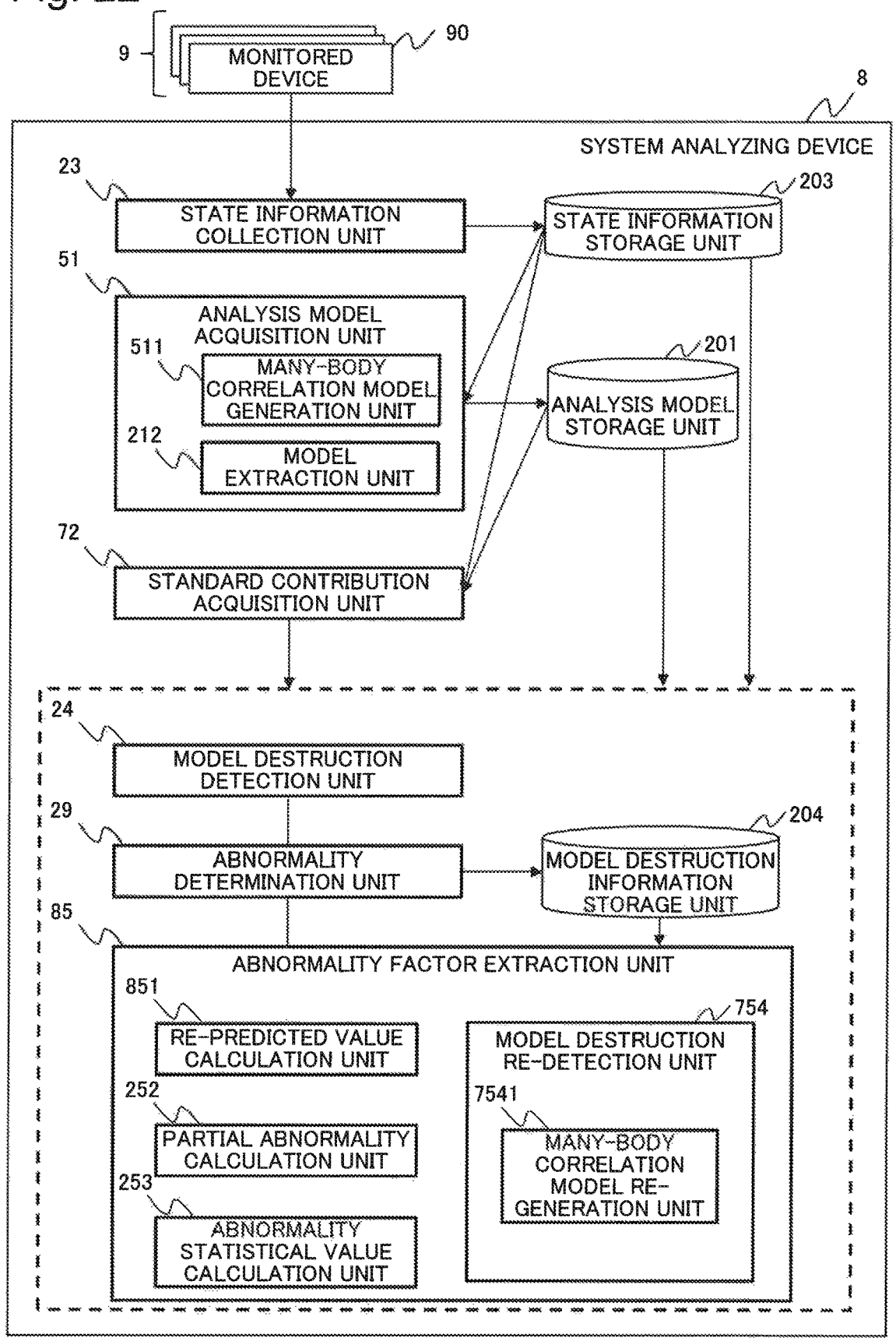
FIG. 22 is a functional block diagram of a system analyzing device according to an eighth example embodiment of the present invention.

A functional block configuration of a system analyzing device 8 according to the eighth example embodiment of the present invention is illustrated in FIG. 22. In FIG. 22, the system analyzing device 8 is different from the system analyzing device 7 according to the seventh example embodiment of the present invention in the point in which an anomaly factor extraction unit 85 instead of the anomaly factor extraction unit 75 is included. The anomaly factor extraction unit 85 is different from the anomaly factor extraction unit 75 in the point in which a re-predicted value calculation unit 851 instead of the re-predicted value calculation unit 751 is included. The system analyzing device 8 is connected to the monitored system 9. In the present example embodiment, details on the monitored system 9 are omitted as it is similar in configuration to the monitored system 9 according to the first example embodiment of the present invention. In FIG. 22, the direction of an arrow connecting rectangles indicating the functional blocks is an example, not limiting the direction of a signal between the functional blocks. The system analyzing device 8 and each functional block can include the same hardware components as those of first example embodiment of the present invention described above referring to FIG. 2. The hardware configurations of the analyzing device 8 and each functional block are not limited to the abovementioned configurations.

The anomaly factor extraction unit 85 is configured to operate when the anomaly determination unit 29 determines that a state of the monitored system 9 is anomalous. As described above, when the anomaly determination unit 29 registers model breakdown information in the model breakdown information storage unit 204, the anomaly factor extraction unit 85 is configured to operate when new model breakdown information is added to the model breakdown information storage unit 204. Specifically, the anomaly factor extraction unit 85 calculates, for each of a plurality of pieces of model breakdown information at the same time, anomaly statistical values for respective data items by using the model breakdown re-detection unit 754, the re-predicted value calculation unit 851 described below, the partial anomaly calculation unit 252, and the anomaly statistical value calculation unit 253.

Here, a plurality of the pieces of model breakdown information at the same time is information indicating model breakdowns detected at the same time for a plurality of many-body correlation model groups different in configuration based on the state information of the monitored system 9. For example, a plurality of the pieces of model breakdown information at the same time may be model breakdown information on an analysis model and model breakdown information on a re-generation model. As described in the seventh example embodiment of the present invention, the model breakdown information on the re-generation model is generated at a model breakdown occurrence time of the model breakdown information on the analysis model. Accordingly, these pieces of model breakdown information are equivalent to a plurality of the pieces of model breakdown information at the same time.

The anomaly factor extraction unit 85 calculates final anomaly statistical values for respective data items based on anomaly statistical values for respective data items calculated based on the pieces of model breakdown information.

Details on a configuration of each functional block included in the anomaly factor extraction unit 85 will be described below. The anomaly factor extraction unit 85 extracts data items which become anomaly factor candidates of the monitored system 9 in descending order of the final anomaly statistical values for respective data items. For example, the anomaly factor extraction unit 85 may extract data items having final anomaly statistical values equal to or higher than a predetermined threshold as data items which become anomaly factor candidates. For example, the anomaly factor extraction unit 85 may extract a predetermined number of data items in descending order of the final anomaly statistical values as anomaly factor candidates. For the threshold of the final anomaly statistical values and the number of data items when the data items which become anomaly factor candidates are extracted, an operator can set arbitrary numerical values.

A specific example of the process of calculating the final anomaly statistical values for respective data items based on a plurality of the pieces of model breakdown information at the same time will be described. For example, the anomaly factor extraction unit 85 sets, for data items having anomaly statistical values equal to or higher than the threshold in all the pieces of model breakdown information, statistical values of anomaly statistical values of data items in all the pieces of model breakdown information as final anomaly statistical values of the data items. The anomaly factor extraction unit 85 sets, for data items not having anomaly statistical values equal to or higher than the threshold in at least some of the pieces of model breakdown information, smallest values possibly taken by anomaly statistical values as final anomaly statistical values of the data items. In this instance, when the anomaly statistical values of the data items are not calculated based on some of the pieces of model breakdown information, the anomaly factor extraction unit 85 allocates the smallest values possibly taken by the anomaly statistical values to the anomaly statistical values of the data items, and then executes the abovementioned process. As the statistical values of the anomaly statistical values for calculating the final anomaly statistical values, any statistical value may be used as long as data items considered more anomalous have higher anomaly statistical values based on the anomaly statistical values for respective data items at each of a plurality of the pieces of model breakdown information. For example, as the statistical values of the anomaly statistical values, one of a sum total, a largest value, a smallest value, an average value, and a median value may be used.

Another specific example of the process of calculating the final anomaly statistical values for respective data items based on a plurality of the pieces of model breakdown information at the same time will be described. This specific example can be used when models about which a plurality of pieces of model breakdown information at the same time is generated are generated to include a representative data item as the fifth to seventh example embodiment of the present invention. For the purpose of unified description, it is assumed that the data items are classified, and a representative data is selected for each data item group. A case in which the data items are not classified correspond to a case in which the number of data item groups is one. Here, it is assumed that N (N is integer) representative data items are selected for each data item group. In other words, for example, it is assumed that the many-body correlation model re-generation unit 7541 selects, for each data item group, data items from a secondary representative data item to an N-th representative data item among data items other than a representative data item (primary representative data item) used for generating the analysis model. Then, it is assumed that the many-body correlation model re-generation unit 7541 generates, for each data item group, N−1 sets of re-generation superior many-body correlation model groups as each of representative data items from the secondary representative data item to the N-th representative data item. Then, it is assumed that the model breakdown re-detection unit 754 generates, in each of N−1 sets of re-generation superior many-body correlation model groups for each data item group, model breakdown information at the same time as the model breakdown occurrence time in the analysis model. It is assumed that the model breakdown detection unit 24 has generated model breakdown information for a superior many-body correlation model group in which the primary representative data item has been generated as a representative data item for each data item group. Thus, N pieces of model breakdown information at the same time are generated. Here, model breakdown information for the superior many-body correlation model group in which the primary representative data item has been generated as the representative data item for each data item group is referred to as "model breakdown information based on primary representative data item". Model breakdown information for the re-generation superior many-body correlation model group in which the n-th representative data item has been generated as the representative data item for each data item group is referred to as "model breakdown information based on n-th representative data item". However, n is an integer from equal to or larger than 2 to equal to or less than N. In this instance, the anomaly factor extraction unit 85 may calculate final anomaly statistical values for respective data items as follows. For example, the anomaly factor extraction unit 85 compares an anomaly statistical value of an n-th data item in model breakdown information based on an n-th representative data item of a certain data item group with an anomaly statistical value of the n-th representative data item in the model breakdown information based on a primary representative data item of the data item group. Then, the anomaly factor extraction unit 85 sets a smallest value among the anomaly statistical values as a final anomaly statistical value of the n-th representative data item of the data item group. An example of this process will be specifically described for a case where the number of data item groups is one, data items up to a secondary representative data item are selected, and model breakdown information based on a primary representative data item and model breakdown information based on the secondary representative data item are generated. In this case, the anomaly factor extraction unit 85 compares an anomaly statistical value of the secondary representative data item in model breakdown information based on the primary representative data item with an anomaly statistical value of the secondary representative data item in model breakdown information based on the secondary representative data item. Then, the anomaly factor extraction unit 85 sets smaller one of these anomaly statistical values as a final anomaly statistical value of the secondary representative data item. Similarly, the anomaly factor extraction unit 85 may calculate a final anomaly statistical value by using such process for each data item.

Next, details on a configuration of the re-predicted value calculation unit 851 included in the anomaly factor extraction unit 85 will be described.

The re-predicted value calculation unit 851 calculates re-predicted values for respective data items for each of a plurality of the pieces of model breakdown information at the same time. For example, as described above, it is supposed that as a plurality of the pieces of model breakdown information at the same time, model breakdown information on the analysis model and model breakdown information on the re-generation model are applied. In this case, similarly to the re-predicted value calculation unit 251 according to the second example embodiment of the present invention, the re-predicted value calculation unit 851 calculates a re-predicted value for the model breakdown information of the analysis model newly registered in the model breakdown information storage unit 204. Further, similarly to the re-predicted value calculation unit 751 according to the seventh example embodiment of the present invention, the re-predicted value calculation unit 851 calculates a re-predicted value for the model breakdown information of the re-generation model relating to the same model breakdown occurrence time as that of the model breakdown information of the analysis model.

An operation of the system analyzing device 8 thus configured will be described referring to the drawings. An outline of the operation of the system analyzing device 8 is similar to that of the operation of a system analyzing device 7 according to the seventh example embodiment of the present invention described above referring to FIG. 20. However, details on the anomaly factor extraction operation in step S713 are different.

Figure 23:
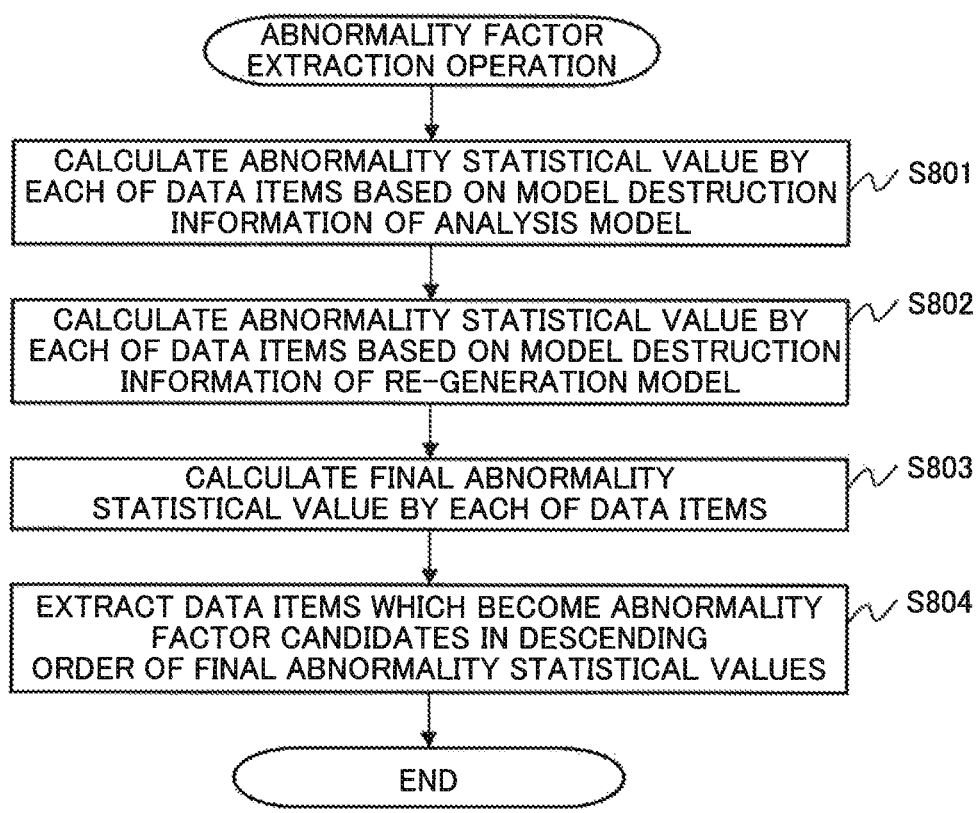
FIG. 23 is a flowchart illustrating an anomaly factor extraction operation of the system analyzing device according to the eighth example embodiment of the present invention in detail.

The anomaly factor extraction operation according to the present example embodiment is illustrated in FIG. 23.

First, the anomaly factor extraction unit 85 calculates anomaly statistical values for respective data items based on the model breakdown information of the analysis model newly registered in the model breakdown information storage unit 204 (step S801). The details of this step are executed by the re-predicted value calculation unit 851, the partial anomaly calculation unit 252, and the anomaly statistical value calculation unit 253 roughly similarly to steps S301 to S309 illustrated in FIG. 8.

Then, the anomaly factor extraction unit 85 calculates anomaly statistical values for respective data items based on the model breakdown information of the re-generation model generated with relating to the same model breakdown time as that of the analysis model newly registered in the model breakdown information storage unit 204 (step S802). The details of this step are executed by the re-predicted value calculation unit 851, the partial anomaly calculation unit 252, and the anomaly statistical value calculation unit 253 regarding the re-generation model roughly similarly to steps S301 to S309 illustrated in FIG. 8.

Then, the anomaly factor extraction unit 85 calculates final anomaly statistical values for respective data items based on the anomaly statistical values for respective data items calculated in steps S801 and S802 (step S803).

Then, the anomaly factor extraction unit 85 extracts and notifies of data items which become anomaly factor candidates based on the final anomaly statistical values of the data items (step S804). For example, as described above, the anomaly factor extraction unit 85 may extract data items having final anomaly statistical values higher than a threshold, and notifies of the extracted data items as anomaly factor candidates. In addition, for example, the anomaly factor extraction unit 85 may extract and notify of a predetermined number of data items in descending order of final anomaly statistical values as anomaly factor candidates.

With the above, the anomaly factor extraction unit 85 ends the anomaly factor extraction operation.

The present example embodiment has been described by way of example where the configuration of extracting the final anomaly factor candidates based on a plurality of the pieces of model breakdown information is applied to the seventh example embodiment of the present invention. However, the present example embodiment is not limited thereto, and the configuration of the present example embodiment extracting the final anomaly factor candidates based on a plurality of the pieces of model breakdown information may be applied to the sixth example embodiment of the present invention. In this case, the many-body correlation model re-generation unit selects a representation data item after the secondary representative data item for each data item group. Then, the many-body correlation model re-generation unit should generate a re-generation model in the present example embodiment by combining a plurality of re-generation superior many-body correlation model groups generated for each of the representative data items after the secondary representative data items for each data item group. However, depending on process of calculating final anomaly statistical values, each re-generation superior many-body correlation model group is preferably generated so as to enable discrimination of a data item which has been used as a representative data item.

Next, the effect of the eighth example embodiment of the present invention will be described.

The system analyzing device according to the eighth example embodiment of the present invention can more accurately extract, by smaller calculation resources, information useful for identifying an anomaly factor even when a change in a sensor value caused by an anomaly is small, and the change appears in a plurality of sensors.

The reason is described as follows. In the present example embodiment, in addition to a configuration roughly similar to that of the seventh example embodiment of the present invention, the anomaly factor extraction unit extracts the final anomaly factor candidates based on a plurality of the pieces of model breakdown information for the superior many-body correlation model groups in which the representative data items are different. Therefore, in the present example embodiment, multifaceted anomalies can be detected by using a plurality of the pieces of model breakdown information at the same time. Not only that, in the present example embodiment, a plurality of the pieces of model breakdown information are calculated from the superior many-body correlation model groups and the re-generation superior many-body correlation model groups so as to increase accuracy of the extraction result of the anomaly factors based on the model breakdown information. Therefore, according to the present example embodiment, the extraction result of the anomaly factors acquired by combining a plurality of the pieces of model breakdown information may be more accurate. Thus, the present example embodiment provides the abovementioned effect.

The present example embodiment has been described by way of example where the model breakdown information on the analysis model and the model breakdown information on the re-generation model are used as a plurality of the pieces of model breakdown information at the same time, but not limited to this. For example, as a plurality of the pieces of model breakdown information at the same time, in addition to these pieces of model breakdown information, model breakdown information of the superior many-body correlation model groups in which the representative data item or the secondary representative data items are different may be added. For example, specifically, the many-body correlation model re-generation unit may select, from data items not selected as representative data items or secondary representative data items, a data item more suitable than the already selected secondary representative data items as a new secondary representative data item. Then, the many-body correlation model re-generation unit may generate a new re-generation model that includes the new secondary representative data item. Hereby, the model breakdown re-detection unit may generate model breakdown information on the new re-generation model. By repeating such process a predetermined number of times, in the present example embodiment, at least three pieces of model breakdown information can be generated at the same time. The number of repeating times of this process may be arbitrarily set by the operator. However, when a breakdown score of the newly selected secondary representative data item is equal to that of the first-selected secondary representative data item, accuracy of an extraction result of anomaly factors based on the newly selected secondary representative data item is reduced. From this standpoint, the number of repeating times of the abovementioned process is preferably limited within a range in which the breakdown score of the newly selected secondary representative data item is roughly equal to that of the first-selected secondary representative data item. As a representative score of the secondary representative data item is higher, the accuracy of the extraction result of the anomaly factors may be higher. Thus, when there is a large difference between a representative score of the newly selected secondary representative data item and a representative score of the first-selected secondary representative data item, the generation of the model breakdown information by using the newly selected secondary representative data item is preferably canceled.

The second and third example embodiments of the present invention have been described mainly by way of case where the standard contribution is calculated by using the state sequence information of the predetermined period used for generating the analysis model. In this case, the standard contribution acquisition unit generates the analysis model in step S103, and then calculates the standard contribution in step S104 in FIG. 6. However, the present example embodiment is not limited thereto, and the standard contribution acquisition unit may calculate standard contribution for each many-body correlation model in which model breakdown has occurred after detecting the model breakdown. For example, as described above, the standard contribution can be calculated, for a data item relating to an objective variable of the many-body correlation model in which model breakdown has occurred, by using state sequence information of a period having a value satisfying a predetermined condition at a value of state information that has caused the model breakdown. Alternatively, as described above, the standard contribution can be calculated by using state sequence information of a predetermined period before (e.g., immediately before) an occurrence time of the model breakdown. In such a case, the standard contribution acquisition unit according to each of the example embodiments should execute, instead of the standard contribution calculation in step S104 illustrated in FIG. 6, the standard contribution calculation process before the re-predicted value calculation process in step S301 in the repeating process for each many-body correlation model illustrated in FIG. 8.

The second to eighth example embodiments of the present invention have been described by way of case where the superiority of the regression equation of the superior many-body correlation model is calculated based on the state information used for constructing the model. However, the present example embodiment is not limited thereto, and the superiority of the regression equation of the superior many-body correlation model may be calculated based on state information not used for constructing the model. For example, in each of the example embodiments, the analysis model acquisition unit or the model breakdown re-detection unit may calculate the superiority F of each regression equation based on the state information not used for constructing the model. As another example, the analysis model acquisition unit or the model breakdown re-detection unit may generate model breakdown information of the many-body correlation model based on the state information not used for constructing the model, and calculate the superiority of each regression equation based on the model breakdown information. When the superiority of each regression equation is calculated based on the model breakdown information, for example, 1−(frequency of the regression equation becoming model breakdown)/(number of indexes of state information used for generating model breakdown information) can be set as the superiority of the regression equation. An idea about the number of indexes of the state information is specifically described in the description of the calculation method of the superiority F. In addition, the analysis model acquisition unit or the model breakdown re-detection unit may extract the superior many-body correlation model based on the superiority of each regression equation calculated based on the state information used for constructing the model and the superiority of each regression equation calculated based on the state information not used for constructing the model. An example where the superior many-body correlation model is extracted by using a plurality of superiorities will be described. Here, it is assumed that two superiorities are used. It is assumed that the first is superiority F, and the second is 1−(frequency of the regression equation becoming model breakdown)/(number of indexes of state information used for generating model breakdown information). In this case, the analysis model acquisition unit or the model breakdown re-detection unit may set models in which the two superiorities exceed thresholds respectively set in advance for the superiorities as superior many-body correlation models. These thresholds can be arbitrarily set by the operator.

The fourth to eighth example embodiments of the present invention have been described mainly by way of case where the standard contribution is calculated by using the state sequence information of the predetermined period used for generating the analysis model. In this case, the standard contribution acquisition unit generates the analysis model in step S103, and then calculates the standard contribution in step S104 in FIG. 6. However, the present example embodiment is not limited thereto, and the standard contribution acquisition unit may calculate standard contribution for each many-body correlation model in which model breakdown has occurred after detecting the model breakdown. For example, as described above, the standard contribution can be calculated, for a data item relating to an objective variable of the many-body correlation model in which model breakdown has occurred, by using state sequence information of a period having a value satisfying a predetermined condition at a value of state information that has caused the model breakdown. Alternatively, as described above, the standard contribution can be calculated by using state sequence information of a predetermined period before (e.g., immediately before) the occurrence time of the model breakdown. In such a case, the standard contribution acquisition unit according to each of the example embodiments should execute, instead of the standard contribution calculation in step S104 illustrated in FIG. 6, the standard contribution calculation process before the re-predicted value calculation process in step S301 in the repeating process for each many-body correlation model illustrated in FIG. 8.

Each of the abovementioned example embodiments of the present invention has been described by way of example where the anomaly factor extraction unit notifies of the names of the data items as the information indicating the group of data items which become anomaly factor candidates. Further, the anomaly factor extraction unit may notify of anomaly statistical values for the data items which become anomaly factor candidates. In this case, in the present example embodiment, data items to be preferentially checked can be notified to the operator or the like of notification destination. In addition, the anomaly factor extraction unit accordion to each of the example embodiments may output other pieces of information as information indicating the group of data items which become anomaly factor candidates.

Each of the abovementioned example embodiments of the present invention has been described by way of example where the monitored system is the power generation plant. However, the present example embodiment is not limited thereto, and the monitored system can be any other system as long as the system can generate at least one many-body correlation model based on information indicating the state thereof, and determine presence or absence of an anomaly based on model breakdown of at least the one many-body correlation model. For example, the monitored system may be an IT (Information Technology) system, a plant system, a structure, a transport device or the like. Even in this case, the system analyzing device according to each of the example embodiments can generate an analysis model with item of data included in information indicating a state of such a monitored system, which serves as a data item, and perform detection of model breakdown and extraction of anomaly factor data items.

Each of the abovementioned example embodiments of the present invention has been described mainly by way of example where each functional block of the system analyzing device is realized by a CPU that executes a computer program stored in a storage device or a ROM. However, the present example embodiment is not limited thereto, and some or all of the functional blocks, or a combination thereof may be realized by dedicated hardware.

In each of the example embodiments of the present invention described above, the functional blocks of the information receiver may be realized by being dispersed to a plurality of devices.

In each of the example embodiments of the present invention described above, the operation of the system analyzing device described above referring to each flowchart may be stored as a computer program for the present invention in a storage device (storage medium) of a computer device. Then, the CPU may read and execute the computer program. In such a case, the present invention is configured with codes of the computer program or the storage medium.

The example embodiments described above can be appropriately combined to be implemented.

While the invention has been particularly shown and described with reference to example embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2014-246936, filed on Dec. 5, 2014 and Japanese patent application No. 2015-028450, filed on Feb. 17, 2015, the disclosure of which is incorporated herein in its entirety by reference.

REFERENCE SINGS LIST 1, 2, 3, 4, 5, 6, 7, 8 system analyzing device
9 monitored system
90 monitored device
11, 21, 31, 51, 61 analysis model acquisition unit
12, 22, 72 standard contribution acquisition unit
13, 23 state information collection unit
14, 24 model breakdown detection unit
15, 25, 35, 45, 75, 85 anomaly factor extraction unit
29 anomaly determination unit
151, 251, 751, 851 re-predicted value calculation unit
152, 252, 452 partial anomaly calculation unit
153, 253 anomaly statistical value calculation unit
211, 511, 611 many-body correlation model generation unit
212 model extraction unit
313, 613 data item classification unit
201 analysis model storage unit
203 state information storage unit
204 model breakdown information storage unit
9a many-body correlation model group
9b superior model condition
9c superior many-body correlation model group
1001 CPU
1002 memory
1003 output device
1004 input device
1005 network interface

What is claimed is:

1. A system analyzing device comprising:
at least one memory configure to store programs; and
at least one processor configured to execute the programs, to perform:
collecting a plurality of data items of sensor data of a monitored system from a plurality of sensors;
calculating a predicted value by using a correlation model and at least one of the other collected sensor data; and
acquiring a standard contribution by using the collected sensor data and the correlation model,
wherein the standard contribution represents a ratio of contribution of each data items of the at least one of the other collected sensor data to the predicted value,
wherein the predictive value permits detection of anomalies within the monitored system even when a change in the data items caused by the anomalies is small and the change appears in the data items collected from more than one of the sensors, to avoid system shutdown or an accident resulting from the anomalies.

2. The system analyzing device according to claim 1, wherein the
least one processor further configured to execute the programs to perform:
detecting a breakdown of the correlation model based on whether a difference between the predicted value and the collected sensor data exceeds a predetermined range;
calculating, in response to the detection of the breakdown, a re-predicted value of the one of the collected sensor data based on the collected sensor data and the standard contribution; and
calculating a partial anomaly indicating anomaly for respective sensor data for the correlation model based on presence or absence of a breakdown of the correlation model determined by using re-predicted value.

3. The system analyzing device according to claim 2, wherein the least one processor further configured to execute the programs to perform:
extracting anomaly factor candidates of data items from the collected data, based on the detection of the breakdown; and
outputting names of data items of the extracted candidates to a display device.

4. The system analyzing device according to claim 1, wherein the least one processor further configured to execute the programs to perform:
calculating an anomaly statistical value by totaling the partial anomalies for each sensor data; and
extracting and outputting a sensor data that becomes an anomaly factor candidate of the monitored system based on the anomaly statistical value.

5. The system analyzing device according to claim 4, wherein the least one processor further determining whether the monitored system is anomalous based on a detection result of the model breakdown when the monitored system is determined as having anomalous extracting and outputting sensor data that becomes an anomaly factor candidate.

6. The system analyzing device according to claim 5, wherein the at least one processor further configured to execute the programs to perform:
selecting, based on a time sequence of the state information, one arbitrary data items of sensor data as the objective variable and at least two data items of arbitrary sensor data as explanatory variables from among the sensor data constituting the state information, formulates a regression equation of the correlation model including at least three data items of sensor data for each combination of the selected objective variable and the selected explanatory variables, calculates a permissible range of prediction error of the regression equation, and the correlation model including the regression equation formulated and the permissible range of prediction error; and
extracting, from a group of the correlation models generated by the correlation model generation unit, a group of superior correlation models that are correlation models satisfying a predetermined superiority condition, and generates the analysis model.

7. The system analyzing device according to claim 4, wherein the least one processor further configured to execute the programs to perform:
changing a way of allocating the partial anomaly to each of the sensor data included in the correlation models between a case where all the re-predicted values of the correlation models cause model breakdown (first model breakdown occurrence status) and a case where at least one of the re-predicted values of the correlation models causes model breakdown while at least one of the re-predicted values does not cause model breakdown (second model breakdown occurrence status).

8. The system analyzing device according to claim 7, wherein the least one processor further configured to execute the programs to perform:
allocating, in the correlation model being in the first model destruction occurrence status, a numerical value of the partial anomaly in such a way that the partial anomaly of the sensor data of the objective variable is higher than the partial anomaly of the sensor data of the explanatory variable, and
allocating, in the correlation model set in the second model destruction occurrence status, a numerical value of the partial anomalies in such a way that the partial anomaly of the sensor data of the explanatory variable in which the re-predicted value causes the model breakdown is higher than the partial anomalies of the sensor data of the objective variable and the sensor data of the explanatory variable in which the re-predicted value does not cause the model breakdown.

9. The system analyzing device according to claim 7, wherein the least one processor further configured to execute the programs to perform
allocating, in the correlation model being in the first model destruction occurrence status, a numerical value of the partial anomaly in such a way that the partial anomaly of the sensor data of the objective variable is higher than the partial anomaly of the sensor data of the explanatory variable, and
allocating, in a correlation model set in the second model destruction occurrence status, a numerical value of the partial anomaly in such a way that the partial anomaly of the sensor data of the explanatory variable in which the re-predicted value causes the model breakdown is equal to or higher than the partial anomalies of the sensor data of the objective variable and the sensor data of the explanatory variable in which the re-predicted value does not cause the model breakdown, and lower than the partial anomaly allocated to the sensor data of the objective variable in the first model breakdown occurrence status.

10. The system analyzing device according to claim 4, wherein
the partial anomaly calculation unit allocates one of set binary values to the partial anomaly of each of the sensor data.

11. The system analyzing device according to claim 4, wherein the least one processor further configured to execute the programs to perform
selecting a representative sensor data among the sensor data, and generating as the analysis model at least one correlation model including the representative sensor data and at least two data items of sensor data other than the representative sensor data as the analysis model.

12. The system analyzing device according to claim 11, wherein the least one processor further configured to execute the programs to perform:
generating at least one sensor data group by classifying the sensor data;
selecting, for each of the sensor data groups, the representative sensor data,
generating a superior correlation model including the representative sensor data selected and at least two data items of sensor data other than the representative sensor data in the sensor data group; and
generating the analysis mode by combining the superior correlation models generated for respective sensor data groups.

13. The system analyzing device according to claim 11, wherein the
least one processor further configured to execute the programs to perform:
a secondary representative
sensor data among the sensor data excluding the representative sensor data, and generating a regeneration model including at least one re-generation correlation model that includes the secondary representative sensor data and at least two data items of sensor data excluding the secondary representative sensor data;

detecting, at a time same as an occurrence time of the model destruction, whether model breakdown has occurred in the re-generation model;

calculating, for each of the re-generation correlation models in which model breakdown has occurred, a re-predicted value of the objective variable of a regression equation of the correlation model for each of the sensor data included as explanatory variables in the regression equation of the re-generation correlation model based on the state information and the standard contribution of sensor data; and calculating, based on presence or absence of model breakdown with each of the re-predicted values calculated, the partial anomaly for respective sensor data for each of the re-generation correlation models, wherein the predictive value permits detection of anomalies within the monitored system even when a change in the data items caused by the anomalies is small and the change appears in the data items collected from more than one of the sensors, to avoid system shutdown or an accident resulting from the anomalies.

14. The system analyzing device according to claim 13, wherein the at least one processor further configured to execute the programs to perform:

generating at least one sensor data group by classifying the sensor data;

selecting, for each of the sensor data groups, the secondary representative sensor data among sensor data excluding the representative sensor data relating to the sensor data group, generating a re-generation correlation model group including at least one re-generation correlation model that includes the secondary representative sensor data and at least two data items of sensor data other than the secondary representative sensor data in the sensor data group; and generating the re-generation model by combining the re-generation correlation model groups generated for the respective sensor data groups.

15. The system analyzing device according to claim 4, wherein the at least one processor further configured to execute the program to perform:

calculating, for a plurality of correlation model groups different in configuration based on the state information, the anomaly statistical values for each sensor data based on information on the model breakdown occurred at the same time;

calculating a final anomaly statistical value for each sensor data by using the anomaly statistical values for each sensor data for the plurality of correlation model groups; and extracting and outputting the sensor data that becomes an anomaly factor candidates of the monitored system based on the final anomaly statistical value.

16. The system analyzing device according to claim 4, wherein the at least one processor further configured to execute the programs to perform:

generating at least one sensor data group by classifying the sensor data; and extracting the sensor data which becomes the anomaly factor candidate for each of the sensor data groups.

17. The system analyzing device according to claim 16, wherein the at least one processor further configured to execute the programs to perform:

generating the sensor data group in such a way that sensor data included as the objective variables or explanatory variables in the regression equation of at least one correlation model constituting the analysis model belong to a same sensor data group.

18. The system analyzing device according to claim 4, wherein the at least one processor further configured to execute the programs to perform:

acquiring, as the analysis model, an analysis model in which two data items of sensor data are included as explanatory variables in the regression equation of each of the correlation models.

19. The system analyzing device according to claim 4, wherein the at least one processor further configured to execute the programs to perform:

calculating, for each of the sensor data included as explanatory variables in the regression equation of each of the correlation models, the standard contribution by dividing a component concerning the sensor data by all components excluding a constant term.

20. A system analyzing method for causing a computer device comprising:

collecting a plurality of data items of sensor data of a monitored system;

calculating a predicted value by using a correlation model and at least one of the other collected sensor data; and acquiring a standard contribution by using the collected sensor data and the correlation model, wherein the standard contribution represents a ratio of contribution of each data items of the at least one of the other collected sensor data to the predicted value, wherein the predictive value permits detection of anomalies within the monitored system even when a change in the data items caused by the anomalies is small and the change appears in the data items collected from more than one of the sensors, to avoid system shutdown or an accident resulting from the anomalies.

21. A non-transitory computer-readable storage medium embodying a system analysis program, the program causing a computer to perform a method, the method comprising:

collecting a plurality of data items of sensor data of a monitored system;

calculating a predicted value by using a correlation model and at least one of the other collected sensor data; and acquiring a standard contribution by using the collected sensor data and the correlation model, wherein the standard contribution represents a ratio of contribution of each data items of the at least one of the other collected sensor data to the predicted value, wherein the predictive value permits detection of anomalies within the monitored system even when a change in the data items caused by the anomalies is small and the change appears in the data items collected from more than one of the sensors, to avoid system shutdown or an accident resulting from the anomalies.

* * * * *